US006819218B2

(12) United States Patent
Mabuchi et al.

(10) Patent No.: US 6,819,218 B2
(45) Date of Patent: Nov. 16, 2004

(54) MAINTENANCE/INSPECTION SUPPORT APPARATUS AND ENTRY/EXIT MANAGEMENT APPARATUS

(75) Inventors: Toshiaki Mabuchi, Tokyo (JP); Hirokazu Hirayama, Tokyo (JP); Kyo Takagi, Tokyo (JP); Naoko Noto, Tokyo (JP); Ryo Yoshitake, Tokyo (JP); Yasuhiro Takemoto, Kanagawa-ken (JP); Masayuki Kobayashi, Tokyo (JP); Yoshiyuki Tsuchida, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 141 days.

(21) Appl. No.: 10/189,020

(22) Filed: Jul. 5, 2002

(65) Prior Publication Data

US 2002/0167393 A1 Nov. 14, 2002

Related U.S. Application Data

(63) Continuation of application No. 09/192,322, filed on Nov. 16, 1998, now Pat. No. 6,417,760.

(30) Foreign Application Priority Data

Nov. 17, 1997 (JP) .......... 9-314899
Oct. 6, 1998 (JP) .......... 10-283806

(51) Int. Cl.[7] .......... G05B 19/00

(52) U.S. Cl. .......... 340/5.3; 340/5.2; 340/5.23; 340/5.26; 340/5.5; 340/5.6; 340/5.66; 340/5.54; 340/10.41; 340/10.51; 235/382; 235/382.5; 702/182; 702/184; 702/183

(58) Field of Search .......... 340/5.2, 5.3, 5.23, 340/5.26, 5.5, 5.6, 5.66, 5.54, 10.41, 10.51; 235/382, 382.5; 702/182, 183, 184

(56) References Cited

U.S. PATENT DOCUMENTS 3,701,100 A * 10/1972 Yarbrough .......... 340/5.5
RE29,057 E * 11/1976 Enikeieff et al. .......... 340/5.26
4,218,738 A * 8/1980 Matyas et al. .......... 340/5.54
5,113,184 A * 5/1992 Katayama .......... 340/10.51
5,615,622 A * 4/1997 Moses et al. .......... 109/2
5,740,369 A * 4/1998 Yokozawa et al. .......... 709/217
5,745,049 A * 4/1998 Akiyama et al. .......... 340/870.17

FOREIGN PATENT DOCUMENTS

DE 195 09 836 9/1995
DE 44 27 880 2/1996

OTHER PUBLICATIONS

W. Hayn, et al., Automatisierungstechnische Praxis, vol. 38, pp. 33–38, “Neue Instandhaltungskonzepte–instandhaltung Als Externe Technische Dienstleistung,” Feb. 1996.

J. Inglesias, Automatisierungstechnische Praxis, vol. 39, pp. 73–76, “Instandhaltungsplanung Leichtgemacht,” Nov. 1997.

* cited by examiner

*Primary Examiner*—Ario Etienne
*Assistant Examiner*—Yves Dalencourt
(74) *Attorney, Agent, or Firm*—Oblon, Spivak, McClelland, Maier & Neustadt, P.C.

(57) ABSTRACT

A maintenance/inspection support apparatus including an inspection information storage section storing inspection information of a plurality of equipments serving as maintenance/inspection targets, an inspection information write section for writing, in a noncontact manner, the inspection information stored in the inspection information storage section on a plurality of information recording media corresponding to the plurality of equipments, an inspection information read section for reading, in a noncontact manner, the inspection information written on the information recording media by the inspection information write section, and a display section for displaying the inspection information read by the inspection information read section.

3 Claims, 43 Drawing Sheets

MAINTENANCE/INSPECTION SUPPORT APPARATUS AND ENTRY/EXIT MANAGEMENT APPARATUS

BACKGROUND OF THE INVENTION

The present invention relates to a maintenance/inspection support apparatus used in maintenance/inspection of equipments installed in industrial plants such as power plants, chemical plants, and ironworks, automobile plants, and dockyards, and used in factory test/inspection support for equipments.

The present invention also relates to a patrol support apparatus such as an entry/exit management apparatus included as the one used in the above maintenance/inspection support apparatus to prevent intrusion of an outsider to the site, building, and room of an office, factory, school, hotel, amusement park, and medical facilities, thereby achieving safety management.

In the industrial plants such as power and chemical plants, a large number of equipments constituting a plant must be periodically maintained and inspected in order to safely and stably operate the plant. A variety of maintenance/inspection support apparatuses have been developed as ones for preventing operator's errors and reducing the operator's load.

FIG. 1 is a block diagram of a conventional maintenance/inspection support apparatus.

Referring to FIG. 1, an operation tag information file 91 stores information related to operation tags necessary in maintenance and inspection. An operation tag output unit 92 extracts the information stored in the operation tag information file 91. As a result, a necessary operation tag is printed.

Since a large number of operation tags are generally handled in the maintenance/inspection apparatus, an operation tag is often prepared as follows. Information is not handwritten but is printed on a seal type paper sheet using a printer or the like in order to minimize the labor. The print is then adhered to an operation inhibition tag, thereby preparing the operation tag.

The operation of the operation tag output unit 92 will be described with reference to a flow chart in FIG. 2.

Operation tag information is loaded from the operation tag information file 91, which stores, in advance, operation tag information necessary in maintenance and inspection (step 901).

FIG. 3 is a view showing memory information stored in the operation tag information file 91. As shown in FIG. 3, the operation tag information file 91 has a memory area A corresponding to each operation tag. Each memory area A stores an equipment number (n), name of equipment (n), name of inspection work (n), name of person in charge of work (n), work period (n), and the like corresponding to each operation tag.

The equipment number represents the equipment management number. The name of equipment represents the name of equipment such as a valve, pump, or the like. The name of inspection work represents the name of inspection/repairing for the work. The name of person in charge of work represents the names of business enterprise and person in charge, which undertake the work and have management responsibility. The work period is an expected period of the work, i.e., an operation inhibition period.

A printer or the like on the seal type paper sheet, the lower surface of which is coated with glue, prints the contents of an operation tag (step 902).

FIG. 4 is a view showing a printed operation tag.

As shown in FIG. 4, the name of equipment, equipment number (tag number) serving as an equipment management number (index number), name of inspection work, and operation inhibition period are displayed on the operation inhibition tag (operation tag). This prevents workers from erroneously operating an equipment under maintenance and inspection.

The printed operation tag contents are adhered to the operation tag, which is then hung on an on-site equipment. This provides operation inhibition information and information necessary for maintenance and inspection to workers.

To maintain and inspect a large number of equipments in a plant or the like, entry/exit of workers to/from the work site must also be managed. An apparatus generally often used as an entry/exit management apparatus is available as a means for managing entry/exit of workers.

For example, to safely manage entry/exit of workers while preventing outsiders from entering into or leaving the site, building, or room in an office, factory, school, hotel, amusement park, medical facilities, entry/exit management must be performed for a large number of in/out persons and vehicles.

Various entry/exit management apparatuses have been developed as apparatuses for supporting complex entry/exit management jobs, preventing workers and guards from operation errors, and reducing the loads on guards.

FIG. 5 is a view showing a conventional entry/exit management apparatus.

Referring to FIG. 1, an ID card 201 is issued in units of in/out persons or groups. Each in or out person must always carry the ID card.

FIG. 6 shows the ID card 201. A portion a shows the name of company to which a given worker as the owner of the ID card belongs and the name of department/section to which the given worker belongs. A portion b shows the employee number and name of the given worker. A portion c shows the valid date. A portion d shows the portrait of the given worker. A portion e magnetically records electronic information of the portions a, b, and c. The magnetic card need not be used. A card with a bar code or an IC card may be used.

The conventional entry/exit management apparatus has a hardware arrangement, as shown in FIG. 7.

As shown in FIG. 7, the entry/exit management apparatus comprises an ID card reading device 202, an entry/exit management computer 200, and a printer device 207. A portion f is a scan operation portion into which the magnetic card portion of the ID card is inserted. A portion g is a time display portion. Portions h and i are switches for selecting entry or exit.

In this arrangement, the operation of the conventional entry/exit management apparatus will be described with reference to the flow chart in FIG. 8.

An in/out person manually presses the portion h or i of the ID card reading device 202 to select entry or exit (S901). The in person then inserts the magnetic card portion of the ID card 201 into the scan operation portion f and slides it along the scan operation portion f (S902). An entry/exit recording unit 203 reads an employee number or the like for specifying an in person written in advance in the IC card 91 (S903) and receives time information from a timepiece module or the like (S904). The entry/exit recording unit 203 records the employee number together with the time information in an entry/exit record file 204 (S905).

The contents of the entry/exit record file 204 are displayed on a display device 206 or output to the printer device 207 by a display/output unit 205 (S906 and S907). The in/out person checks whether an in/out person forgets filling input columns (S908). If YES in step S908, the in/out person prepares input error correction requests (paper sheets), and the third party inputs information of the input error correction request using an input unit 208 such as a keyboard and mouse. The contents of the entry/exit record file 204 are corrected by the input error correction unit 209 (S909).

When entry/exit is inevitably required due to a meeting or work with an outsider such as a business associate having no ID card, an in person is instructed to fill an entry/exit admission application (paper sheet) at a guard station in charge of guard of entry/exit and to stamp the application with an approval seal in order to check whether the in person has visited the applied place. The application with the approval seal is visually checked at the guard station at the time of exit.

As described above, the conventional maintenance/inspection support apparatus can automatically print the operation tag 93 by the operation tag output unit 92. However, the information, which can be filled in the operation tag 93, is limited in this conventional maintenance/inspection support apparatus. Sufficient information cannot be provided to workers.

Since a large number of equipments are present on the site, the operation tag 93 may be hung on a wrong on-site equipment, and wrong information may be provided.

Every time maintenance and inspection are performed, the operation tag 93 must be prepared and hung on an on-site equipment, resulting in poor work efficiency.

An information medium is a work tag (paper) and does not present electronic information. When a work tag is located at a location where workers cannot easily see, or work tags overlap each other, a wrong work may be performed.

The conventional entry/exit management apparatus can record and correct the in/out persons and entry/exit times by the entry/exit recording unit 203 and the input error correction unit 209.

In this entry/exit management apparatus, the in/out person must manually select entry or exit at the time of entry/exit and must insert and slide the ID card 201 in the ID card reading device 202.

Since this operation is performed by a human system (manual operation) of the in/out person, input errors such as an entry/exit selection error and an unfilled input column readily occur. The errors are notified by the in/out persons themselves, and each error must be corrected every notification.

When entry/exit is inevitably required due to a meeting or work with an outsider such as a business associate having no ID card, an in person is instructed to fill an entry/exit admission application (paper sheet) at a guard station in charge of guard of entry/exit and to stamp the application with an approval seal in order to check whether the in person has visited the applied place. The application with the approval seal is visually checked at the guard station at the time of exit. In this case, an oversight may occur to pose a safety problem and greatly degrade the work efficiency.

BRIEF SUMMARY OF THE INVENTION

The present invention has been made in consideration of the above situation, and has as its object to provide a maintenance/inspection support apparatus which can provide sufficient and accurate inspection information to a worker, and omit a work of preparing an operation tag for each maintenance/inspection operation and hanging the operation tag on an on-site equipment, thereby improving work efficiency.

It is another object of the present invention to provide an entry/exit management apparatus which can omit operation of causing an in/out person to manually select entry/exit at the time of entry/exit and insert and slide an ID card in an ID card reading device, thereby preventing input errors such as unfilled input columns and operation errors in selecting entry/exit, and can omit a data correction work which was conventionally required upon occurrence of an input error.

It is still another object of the present invention to provide an entry/exit management apparatus which can assure reliable security by electronically checking an application with an approval seal when an outsider such as a business associate having no ID card fills the entry/exit admission application (paper sheet) at a guard station in charge of guard of entry/exit and stamps the application with the approval seal in order to check whether the in person has visited the applied place, and the application with the approval seal is conventionally visually checked at the guard station at the time of exit, thereby preventing visual check errors.

In order to achieve the above objects, the first aspect is a maintenance/inspection support apparatus comprising:

- inspection information storage means storing inspection information of a plurality of equipments serving as maintenance/inspection targets;
- inspection information write means for writing, in a noncontact manner, the inspection information stored in the inspection information storage means on a plurality of information recording media corresponding to the plurality of equipments;
- inspection information read means for reading, in a noncontact manner, the inspection information written on the information recording media by the inspection information write means; and
- display means for displaying the inspection information read by the inspection information read means.

The second aspect according to the first aspect is a maintenance/inspection support apparatus further comprising inspection information updating means for performing at least one of updating and addition of the inspection information written on the information recording media.

The third aspect is a maintenance/inspection support apparatus comprising:

- worker information storage means storing information of a plurality of workers;
- write means for writing, in a noncontact manner, worker information of each worker on a worker information recording medium from the worker information stored in the worker information storage means;
- equipment information recording media respectively arranged for a plurality of equipments serving as maintenance/inspection targets to store inspection information of each equipment having an equipment code for identifying each equipment;
- information read means for reading worker information written on the worker information recording medium and inspection information stored on the equipment information recording medium;
- determination means for determining on the basis of the worker information and inspection information read by the information read means whether a worker is an authorized worker for a target equipment; and alarm output means for outputting an alarm when the determination means determines that the worker is not an authorized worker.

The fourth aspect is a maintenance/inspection support apparatus comprising:

an worker information recording medium storing information about a worker;

a gate information recording medium arranged at an entrance of an area serving as a maintenance/inspection target to store area information about the area;

information read means for reading worker information stored on the worker information recording medium and the area information stored on the gate information recording medium;

determination means for determining on the basis of the worker information and area information read by the information read means whether a worker is an authorized worker to enter into the area; and alarm output means for outputting an alarm when the determination means determines that the worker is not an authorized person to enter into the area.

The fifth aspect is a maintenance/inspection support apparatus comprising:

a worker information recording medium storing worker information;

write means arranged at an entrance/exit of an area to be maintained/inspected to write time information representing entry/exit time on the worker information recording medium;

read means for reading the time information written on the worker information recording medium by the entry/exit time write means; and display means for displaying the time information read by the read means.

The sixth aspect according to the fifth aspect is a maintenance/inspection support apparatus further comprising:

determination means for determining on the basis of the time information read by the read means, the worker information, and a work permission time for the area whether a work time of the worker in the area exceeds a predetermined work time; and means for outputting an alarm when the determination means determines that the work time of the worker exceeds the predetermined work time.

The seventh aspect is a maintenance/inspection support time comprising:

worker information recording medium storing map information of an area to be inspected and inspection route information for an inspection work;

equipment information recording media respectively arranged for a plurality of equipments serving as maintenance/inspection targets to store an equipment code for identifying each equipment and inspection information containing an installation location information of each equipment;

information read means for reading the map information and inspection route information recorded on the worker information recording medium and the inspection information stored on the equipment information recording medium;

current position display means for displaying a current position from the map information and equipment installation location information read by the information read means; and navigation means for displaying a next inspection position destination on the basis of the map information, inspection route information, and equipment installation location information read by the information read means.

The eighth aspect according to the first aspect is a maintenance/inspection support apparatus further comprising:

collection means for collecting process information about an equipment serving as a maintenance/inspection target; and process information write means for writing the process information collected by the collection means on the information recording medium.

The ninth aspect is a maintenance/inspection support apparatus comprising:

equipment information recording media respectively arranged for a plurality of equipments serving as maintenance/inspection targets to store inspection cycle information of each equipment and inspection information containing inspection record information for each equipment;

information read means for reading inspection cycle information and inspection record information from one of the equipment information recording media which corresponds to an equipment to be inspected;

determination means for determining on the basis of the inspection cycle information and inspection record information read by the information reading means, and current time information whether a difference between the current time and latest inspection time of the inspection record information exceeds the inspection cycle; and notification means for notifying an inspection of the equipment to be inspected when the determination means determines that the difference exceeds the inspection cycle.

The 10th aspect according to the first aspect is a maintenance/inspection support apparatus further comprising:

collection means for collecting process information about an equipment serving as a maintenance/inspection target; and process information write means for writing the process information collected by the collection means on the information recording medium.

The 11th aspect is an entry/exit management apparatus comprising:

an information recording medium storing in/out person information having first information representing an in/out person and second information representing entry/exit time of the in/out person;

first read means for reading, in a noncontact manner, the in/out person information stored on the information recording medium;

first determination means for determining exit when latest second information of the in/out person information read by the first read means represents entry time, and entry when the latest second information represents exit time; and first recording means for recording the entry time on the information recording medium when the first determination means determines the entry.

The 12th aspect according to the 11th aspect is an entry/exit management apparatus further comprising:

first adding means for, when the first determination means determines exit, adding exit time information to the first information read by the first read means, and when the first determination means determines entry, adding entry time information to the first information read by the first read means; and first storage means for storing the first information to which the exit time information is added by the first adding means and the first information to which the entry time information is added by the first adding means.

The 13th aspect according to the 11th aspect is an entry/exit management apparatus further comprising:

second storage means for storing attribute information of a permitted in or out person;

second determination means for determining on the basis of the first information read by the first read means and the information stored in the second storage means whether an in/out person is permitted to enter/leave;

alarm output means for outputting an alarm when the second determination means determines that the in/out person is not permitted to enter/leave.

The 14th aspect according to the 11th aspect is an entry/exit management apparatus further comprising:

second storage means storing information representing an area where in/out person can enter/leave;

second determination means for determining on the basis of the first information read by the first read means and the area information stored in the second storage means whether an area is the area where the in/out person can enter/leave; and alarm output means for outputting an alarm when the second determination means determines that the area is not the area where the in/out person can enter/leave.

The 15th aspect according to the 11th aspect is an entry/exit management apparatus further comprising:

second storage means storing information representing a work which can be performed by an in/out person;

second determination means for determining on the basis of the first information read by the first read means and information stored in the second storage means and representing the work which can be performed by the in/out person whether a work is the work which can be performed by the in/out person; and alarm output means for outputting an alarm when the second determination means determines that the work is not the work which can be performed by the in/out person.

The 16th aspect according to the 11th aspect is an entry/exit management apparatus further comprising:

second storage means storing information representing a period permitted to an in/out person;

second determination means for determining on the basis of the first information read by the first read means and the information stored in the second storage means and representing the period permitted to the in/out person whether a period is the period permitted to the in/out person; and alarm output means for outputting an alarm when the second determination means determines that the period is not the period permitted to the in/out person.

The 17th aspect according to the 11th aspect is an entry/exit management apparatus further comprising:

second storage means storing information representing a qualification of an in/out person;

second determination means for determining on the basis of the first information read by the first read means and the information stored in the second storage means whether the in/out person has the qualification; and alarm output means for outputting an alarm when the second determination means determines that the in/out person does not have the qualification.

The 18th aspect according to the 11th aspect is an entry/exit management apparatus further comprising:

second storage means storing information representing time permitted to an in/out person;

second determination means for determining on the basis of the first information read by the first read means and the information stored in the second storage means whether time is the time permitted to the in/out person; and alarm output means for outputting an alarm when the second determination means determines that the time is not the time permitted to the in/out person.

The 19th aspect according to the 11th aspect is an entry/exit management apparatus further comprising:

second storage means storing information representing a route permitted to an in/out person;

second determination means for determining on the basis of the first information read by the first read means and the information stored in the second storage means whether a route is the route permitted to the in/out person; and alarm output means for outputting an alarm when the second determination means determines that the route is not the route permitted to the in/out person.

The 20th aspect according to the 11th aspect is an entry/exit management apparatus further comprising:

a vehicle information recording medium storing third information representing an attribute of a vehicle and fourth information representing entry/exit time of the vehicle;

second read means for reading, in a noncontact manner, in/out vehicle information stored on the vehicle information recording medium;

second determination means for, when latest fourth information of the in/out vehicle information read by the second read means represents entry time, determining exit, and when the latest fourth information represents exit time, determining entry;

second recording means for recording the entry time on the vehicle information recording medium when the second determination means determines the entry; and second adding means for, when the second determination means determines exit, adding the exit time information to the third information read by the read means, and when the second determination means determines entry, adding the entry time information to the third information read by the read means.

The 21st aspect according to the 11th aspect is an entry/exit management apparatus further comprising:

a vehicle information recording medium storing third information representing an article loaded on a vehicle and fourth information representing entry/exit time of the vehicle;

second read means for reading, in a noncontact manner, the in/out vehicle information stored on the vehicle information recording medium;

second determination means for, when latest fourth information of the in/out vehicle information read by the second read means represents exit, determining exit, and when the latest fourth information represents exit, determining entry;

second recording means for recording the entry time on the vehicle information recording medium when the second determination means determines the exit;

second adding means for, when the second determination means determines exit, adding exit time information to the third information read by the read means, and when the second determination means determines entry, adding entry time information to the third information read by the read means;

second storage means for storing attribute information of the article permitted to be loaded on the vehicle;

third determination means for determining on the basis of the third information read by the second read means and the attribute information stored in the second storage means and representing the article to be loaded on the vehicle whether an article is the article permitted to be loaded on the vehicle; and first alarm output means for outputting an alarm when the third determination means determines that the article is not the article permitted to be loaded on the vehicle.

The 22nd aspect according to the 21st aspect is an entry/exit management apparatus further comprising:

third storage means storing fifth information representing a relationship between the article permitted to be loaded on the vehicle and the in/out person permitted to enter/leave;

fourth determination means for determining on the basis of the first information read by the first read means, the third information read by the second read means, and the fifth information stored in the third storage means whether the in/out person corresponds to the article loaded on the vehicle; and second alarm output means for outputting an alarm when the fourth determination means determines that the in/out person does not correspond to the article loaded on the vehicle.

The 23rd aspect according to the 22nd aspect is an entry/exit management apparatus further comprising information write means for writing a determination result of the fourth determination means as violation information on the information recording medium and vehicle information recording medium when the fourth determination means determines that the in/out person does not correspond to the article loaded on the vehicle.

The functions of the above aspects will be described below.

According to the first aspect, the inspection information stored in the inspection information storage means is written in a noncontact manner on each of the plurality of information recording media respectively corresponding to the plurality of equipments by the inspection information write means.

The inspection information written on the information recording medium by the inspection information write means is read by the inspection information read means in a noncontact manner.

The information read by the inspection information read means can be displayed by the display means. Therefore, sufficient and accurate inspection information can be provided to a worker.

Since the work of preparing an operation tag for each maintenance and inspection and hanging it on an on-site equipment can be omitted, work efficiency can be improved.

According to the second aspect, the inspection information written on the information recording medium can be updated by the inspection information updating means. More accurate inspection information can be provided to the worker, and therefore work efficiency can be improved.

According to the third aspect, the determination means can determine on the basis of the worker information read by the information read means and the equipment information stored on the equipment information recording medium and corresponding to the equipment serving as the work target whether the worker is permitted to perform the work on the equipment as the work target, or whether the worker can enter into the area in which the equipment as the work target is installed.

When the determination means determines that the worker is not an authorized worker, the alarm output means outputs an alarm.

More specifically, when a worker enters into an area except an area where his work is permitted, an alarm is output. Therefore, works in industrial plants can be safely performed.

According to the fourth aspect, the determination means determines on the basis of the work information read by the information read means and information about the area to be accessed by a worker whether the worker is an authorized worker to this area.

When the determination means determines that the worker is not the authorized worker to enter this area, the alarm output means outputs an alarm, thereby assuring safety of workers.

According to the fifth aspect, the time information representing the exit time of the worker can be written on the worker information recording medium. Entry/exit of the worker can be managed.

According to the sixth aspect, the entry/exit information of the worker can be read from the worker information recording medium by the entry/exit information read means.

The first determination means determines on the basis of the entry/exit information read by the entry/exit read means, the worker information, and the area information whether the work time of the worker in the area exceeds the predetermined work time.

When the first determination means determines that the work time of the worker exceeds the predetermined time, an alarm is output. When a workable time in the area is limited, the worker is notified of the fact that the work time exceeded the prescribed time. The worker can more safely work.

According to the seventh aspect, the navigation means displays the next inspection position destination on the basis of the map information, inspection route information, and equipment installation location information read by the information read means. The worker can efficiently perform the work.

According to the eighth aspect, in the first or second aspect, the process information write means can write the process information collected by the collection means on the information recording means. Inspection information can be efficiently updated.

According to the ninth aspect, the determination means determines on the basis of the inspection cycle information and inspection record information read by the information read means and the current time whether the difference between the current time and the latest inspection time of the inspection record information exceeds the inspection cycle.

When the determination means determines that the difference exceeds the inspection cycle, the inspection request display means displays the inspection request of the equipment, thereby efficiently performing the work.

According to the 10th aspect, the process information collected by the collection means can be written on the information recording medium arranged in correspondence with an equipment serving as the maintenance/inspection target by the process information write means.

According to the 11th aspect, the in/out person information stored on the information recording medium is read by the first read means. When the latest second information of the in/out person information read by the first read means represents exit, the first determination means determines exit. When the latest second information represents exit, the first determination means determines entry.

When the first determination means determines entry, the first recording means records entry time on the information recording medium. Operation of manually selecting entry or exit at the time of entry or exit and inserting and sliding the ID card in the ID card reading device can be omitted. Input errors such as unfilled input columns and operation errors can be prevented. A data correction work conventionally required upon occurrence of an input error can also be omitted.

An application with an approval seal can be electronically checked to assure reliable security when an outsider such as a business associate having no ID card fills the entry/exit admission application (paper sheet) at a guard station in charge of guard of entry/exit and stamps the application with the approval seal in order to check whether the in person has visited the applied place, and the application with the approval seal is conventionally visually checked at the guard station at the time of exit, thereby preventing visual check errors.

According to the 12th aspect, the first storage means stores the first information to which the exit time information is added by the first adding means and the first information to which the entry time information is added by the first adding means. Therefore, entry/exit can be electronically managed.

According to 13th aspect, the second storage means stores attribute information of the permitted in/out person. The second determination means determines on the basis of the first information read by the first read means and the information stored in the second storage means whether the in/out person is permitted to enter/leave.

When the second determination means determines that the in/out person is not permitted to enter/leave, the alarm output means outputs an alarm, thereby assuring more reliable security.

According to the 14th aspect, the second storage means stores information of the area accessed by the in/out person. The second determination means determines on the basis of the first information read by the first read means and the area information stored in the second storage means whether the area is the area where the in/out person can enter/leave.

When the second determination means determines that the area is not the area where the in/out person can enter/leave, the alarm output means outputs an alarm, thereby assuring more reliable security.

According to the 15th aspect, the second storage means stores information representing a work which can be performed by the in/out person. The second determination means determines on the basis of the first information read by the first read means and the information stored in the second storage means and representing the work which can be performed by the in/out person whether a work is the work which can be performed by the in/out person.

When the second determination means determines that the work is the work which cannot be performed by the in/out person, the alarm output means outputs an alarm, thereby assuring more reliable security.

According to the 16th aspect, the second storage means stores information representing a period permitted to an in/out person. The second determination means determines on the basis of the first information read by the first read means and the information stored in the second storage means and representing the period permitted to the in/out person whether a period is the period permitted to the in/out person.

The alarm output means outputs an alarm when the second determination means determines that the period is not the period permitted to the in/out person, thereby assuring more reliable security.

According to the 17th aspect, the second storage means stores information representing a qualification of an in/out person. The second determination means determines on the basis of the first information read by the first read means and the information stored in the second storage means whether the in/out person has the qualification.

The alarm output means outputs an alarm when the second determination means determines that the in/out person does not have the qualification, thereby assuring more reliable security.

According to the 18th aspect, the second storage means stores information representing time permitted to an in/out person. The second determination means determines the basis of the first information read by the first read means and the information stored in the second storage means whether time is the time permitted to the in/out person.

The alarm output means outputs an alarm when the second determination means determines that the time is not the time permitted to the in/out person, thereby assuring more reliable security.

According to the 19th aspect, the second storage means stores information representing a route permitted to an in/out person. The second determination means determines on the basis of the first information read by the first read means and the information stored in the second storage means whether a route is the route permitted to the in/out person.

The alarm output means outputs an alarm when the second determination means determines that the route is not the route permitted to the in/out person, thereby assuring more reliable security.

According to the 20th aspect, the second determination means determines exit when latest fourth information of the in/out vehicle information read by the second read means represents entry time, and determines entry when the latest fourth information represents exit time.

The second recording means records the entry time on the vehicle information recording medium when the second determination means determines the entry. The second adding means adds the exit time information to the third information read by the read means when the second determination means determines exit, and adds the entry time information to the third information read by the read means when the second determination means determines entry.

The third determination means determines on the basis of the third information read by the second read means and the vehicle attribute information stored in the second storage means whether a vehicle is the vehicle permitted to enter/leave.

The alarm output means outputs an alarm when the third determination means determines that the vehicle is not the vehicle permitted to enter/leave, thereby electronically managing the in/out vehicle information and hence assuring more reliable security.

According to the 21st aspect, the second determination means determines exit when latest fourth information of the in/out vehicle information read by the second read means represents exit, and determines entry when the latest fourth information represents exit.

The second adding means adds exit time information to the third information read by the read means when the second determination means determines exit, and adds entry time information to the third information read by the read means when the second determination means determines entry.

The third determination means determines on the basis of the third information read by the second read means and the attribute information stored in the second storage means and representing the article to be loaded on the vehicle whether an article is the article permitted to be loaded on the vehicle.

The first alarm output means outputs an alarm when the third determination means determines that the article is not the article permitted to be loaded on the vehicle.

According to the 22nd aspect, the fourth determination means determines on the basis of the first information read by the first read means, the third information read by the second read means, and the fifth information stored in the third storage means whether the in/out person corresponds to the article loaded on the vehicle.

The second alarm output means outputs an alarm when the fourth determination means determines that the in/out person does not correspond to the article loaded on the vehicle.

According to the 23rd aspect, the information write means writes a determination result of the fourth determination means as violation information on the information recording medium and vehicle information recording medium when the fourth determination means determines that the in/out person does not correspond to the article loaded on the vehicle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described with reference to the accompanying drawing.

<First Embodiment>

Figure 1:
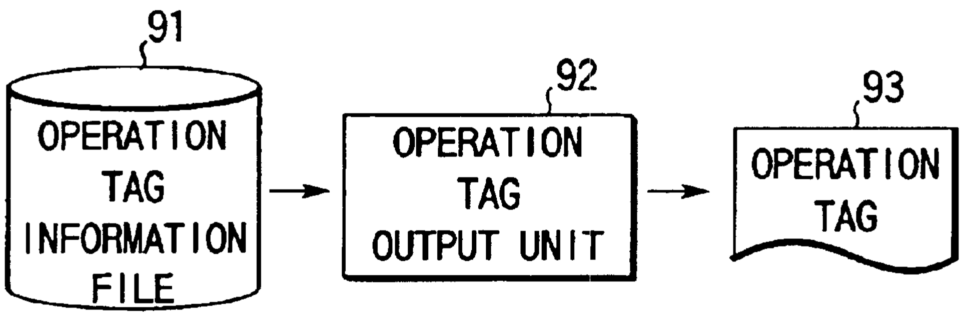
FIG. 1 PRIOR ART
FIG. 1 is a block diagram showing a conventional maintenance/inspection support apparatus.
Figure 2:
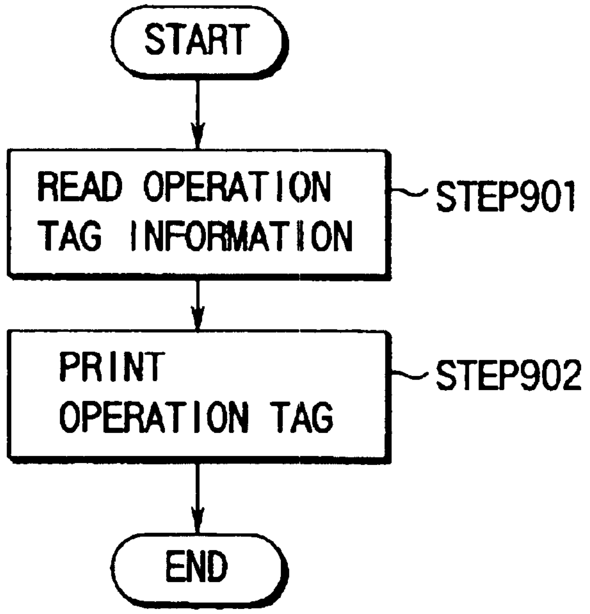
FIG. 2 PRIOR ART
FIG. 2 is a flow chart for explaining the operation of an operation tag output unit in the conventional maintenance/inspection support apparatus.
Figure 3:
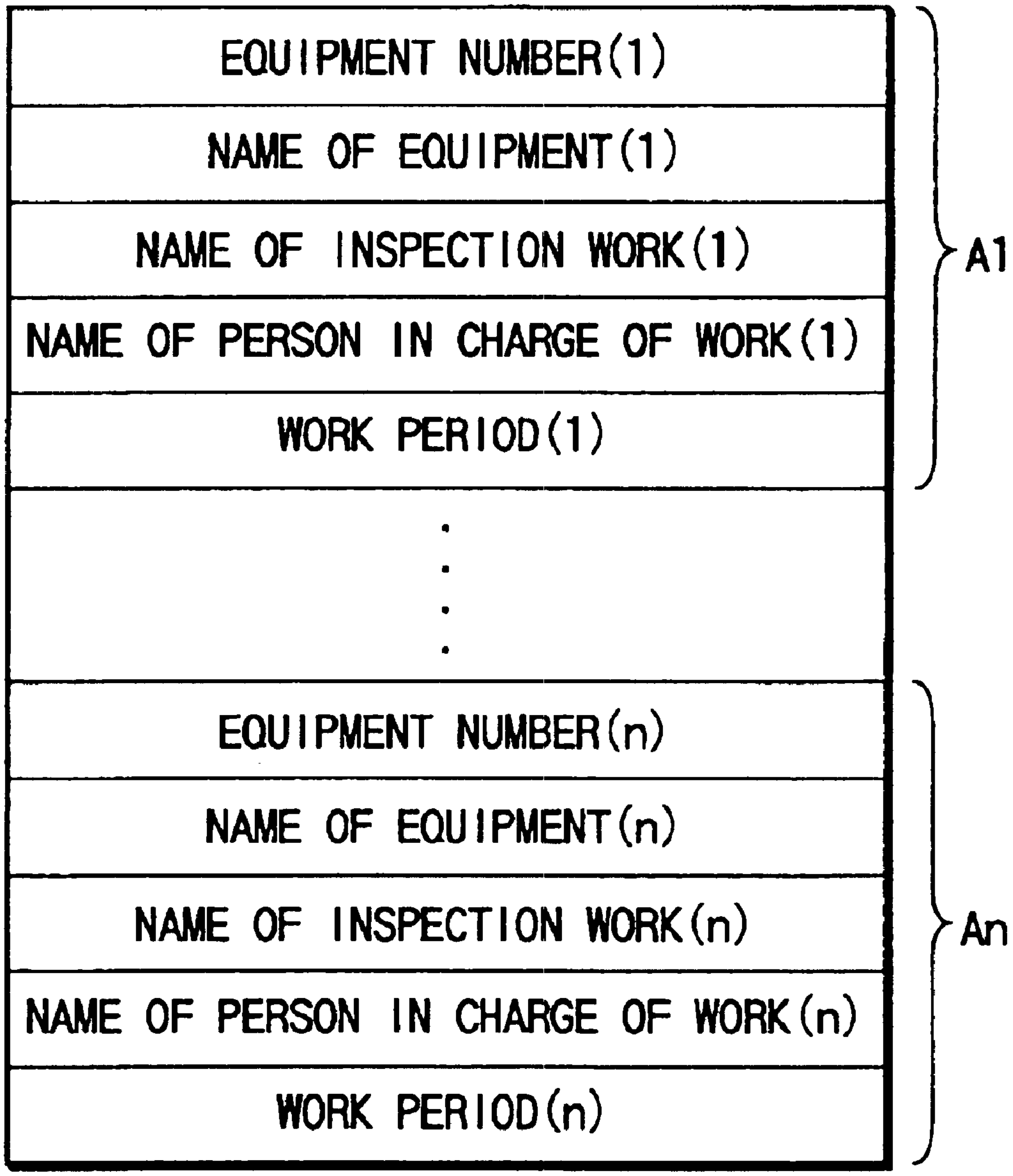
FIG. 3 PRIOR ART
FIG. 3 is a view showing memory information stored in an operation tag information file in the conventional maintenance/inspection support apparatus.
Figure 4:
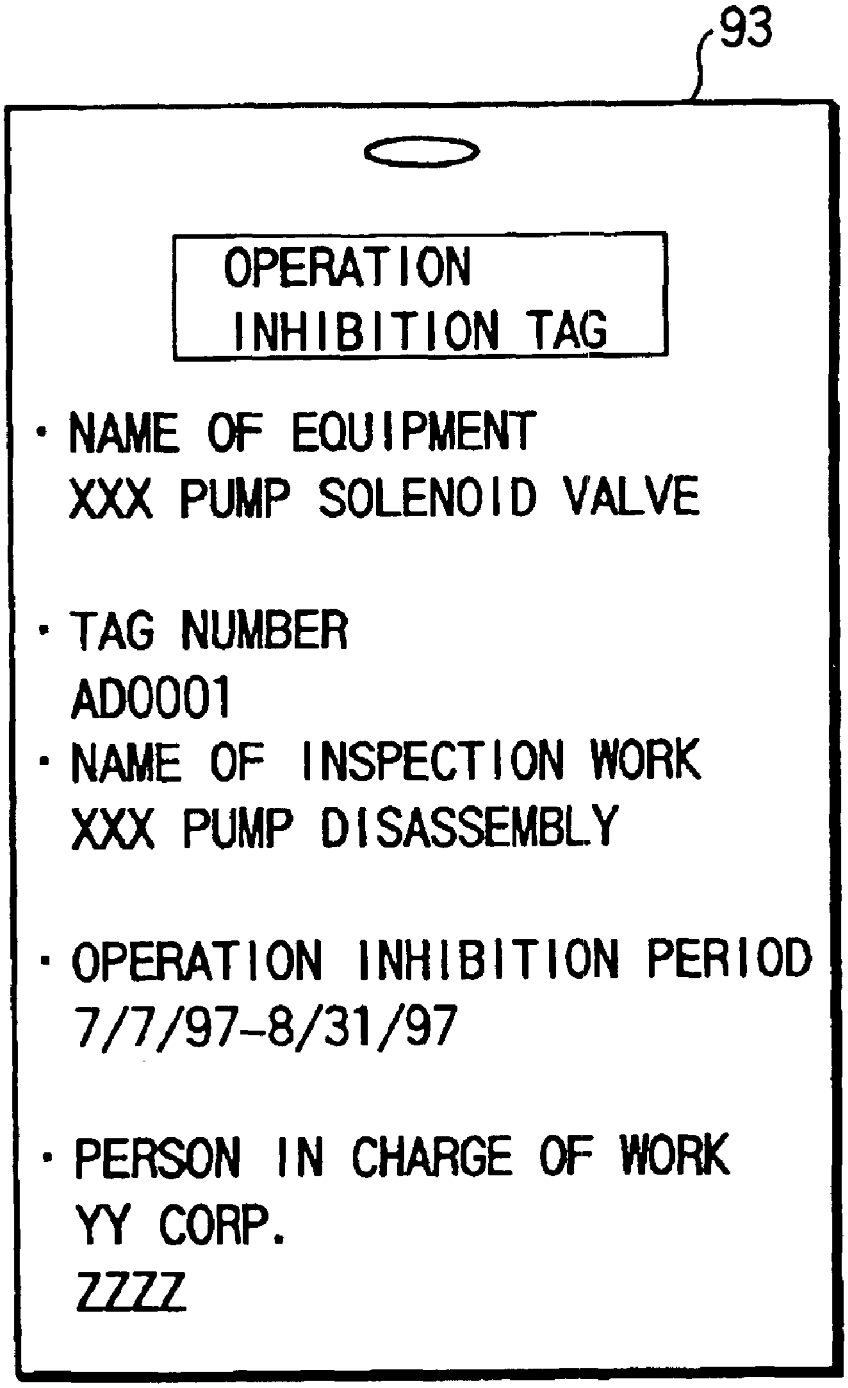
FIG. 4 PRIOR ART
FIG. 4 is a view showing a printed operation tag.
Figure 5:
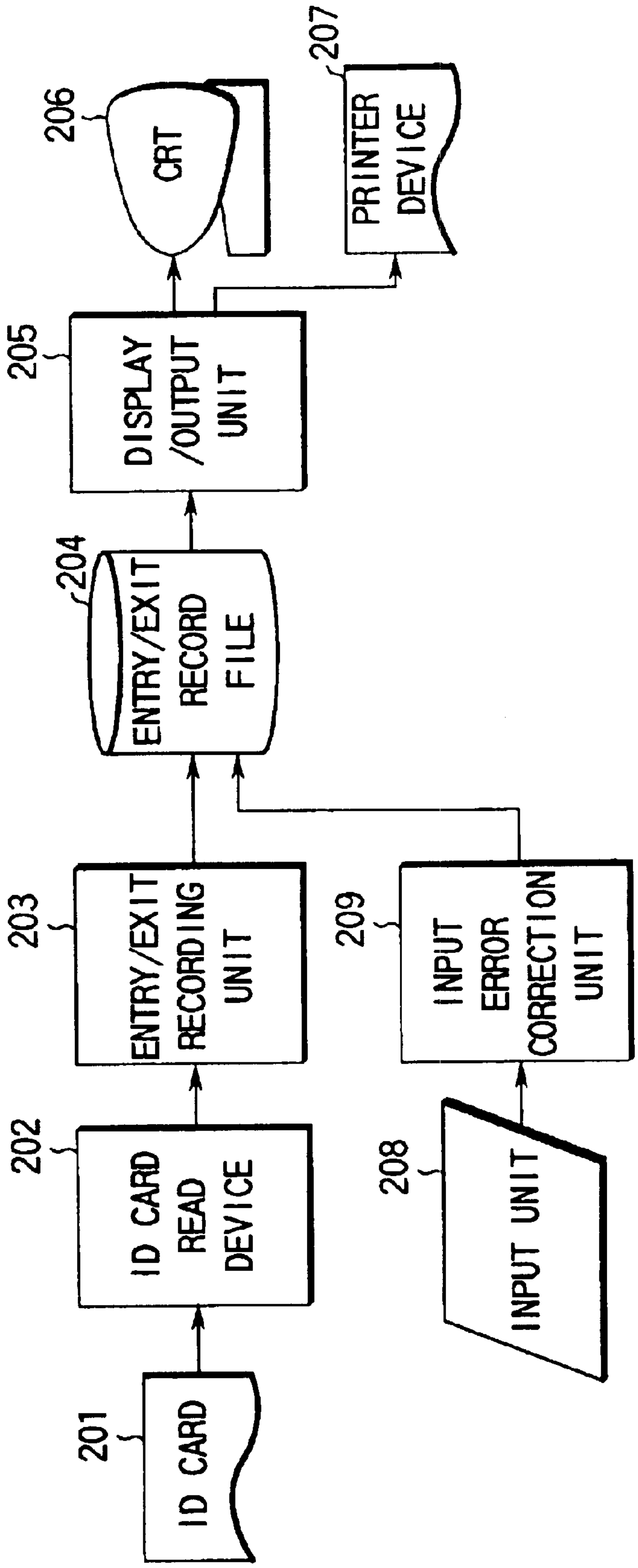
FIG.5 PRIOR ART
FIG. 5 is a block diagram showing a conventional entry/exit management apparatus.
Figure 6:
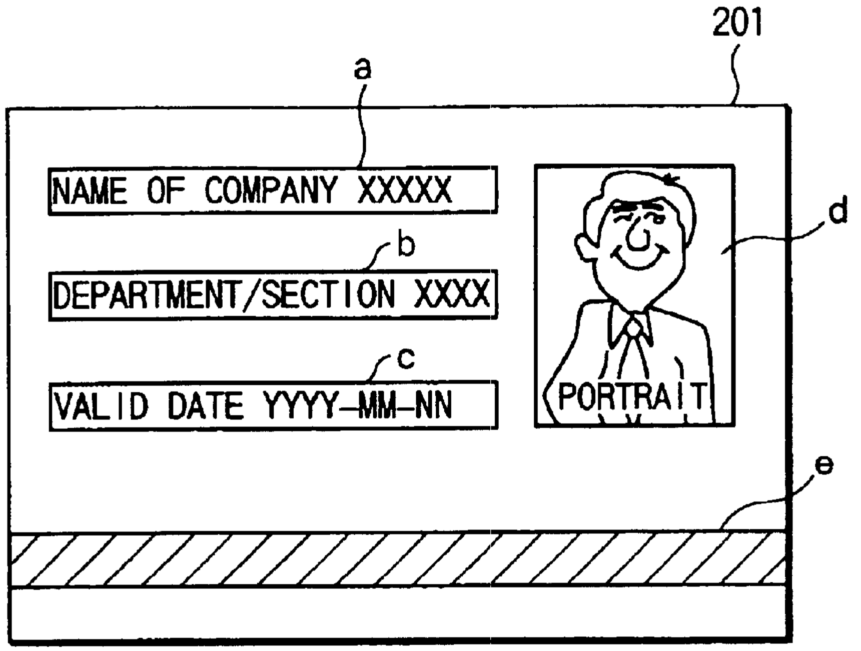
FIG. 6 PRIOR ART
FIG. 6 is a view showing an ID card.
Figure 7:
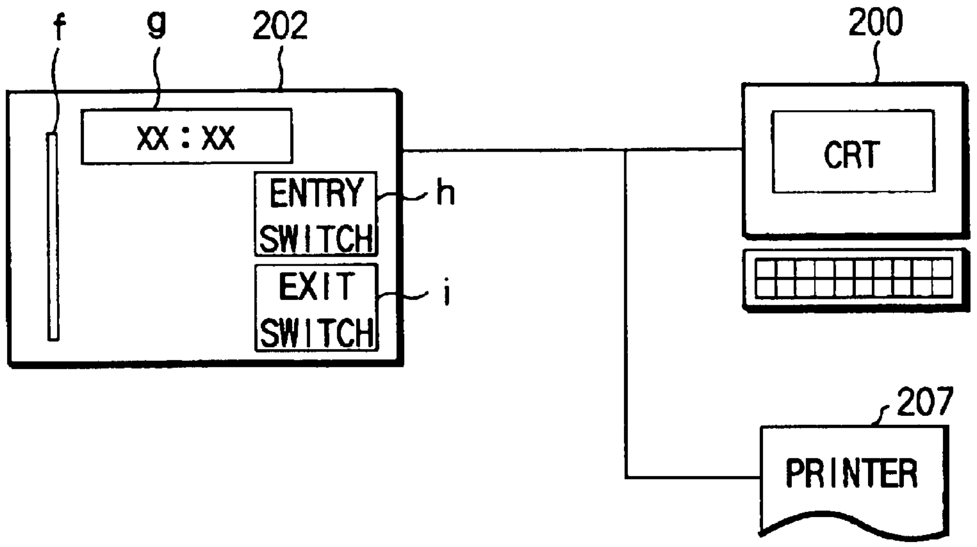
FIG. 7 PRIOR ART
FIG. 7 is a view showing a hardware arrangement of the conventional entry/exit management apparatus.
Figure 8:
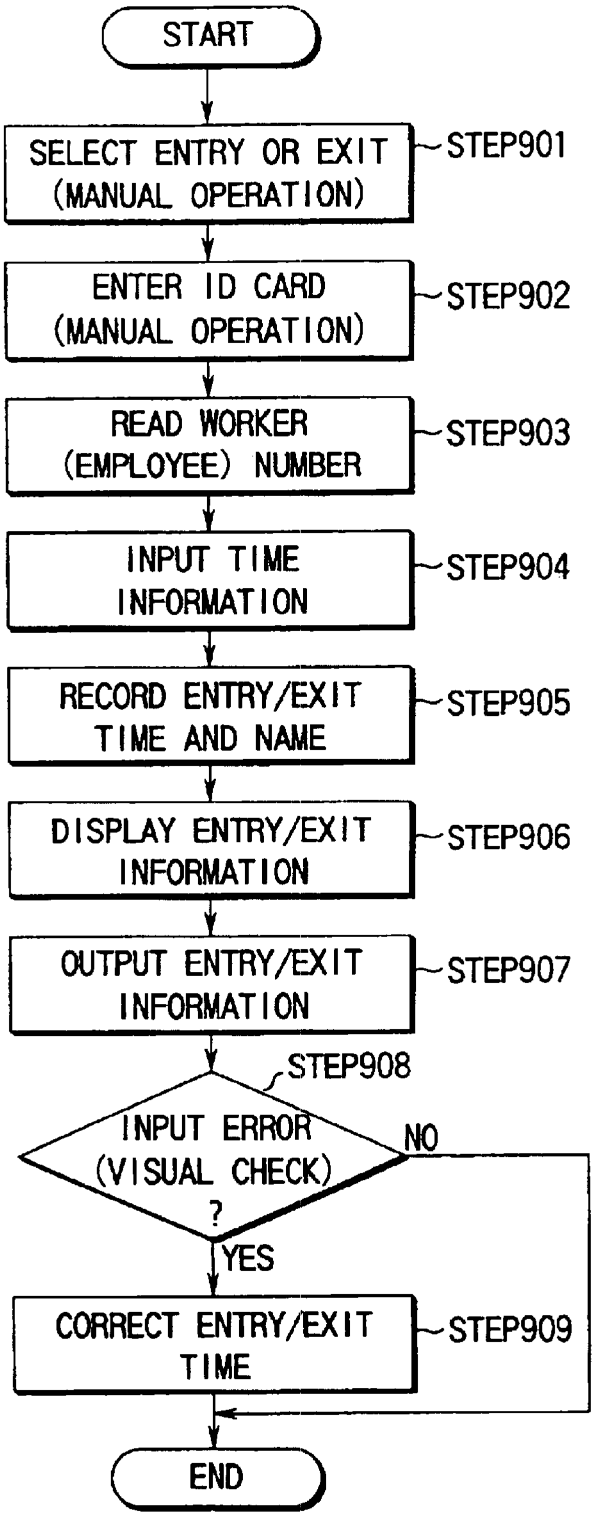
FIG. 8 PRIOR ART
FIG. 8 is a flow chart showing the operation of the conventional entry/exit management apparatus.
Figure 9:
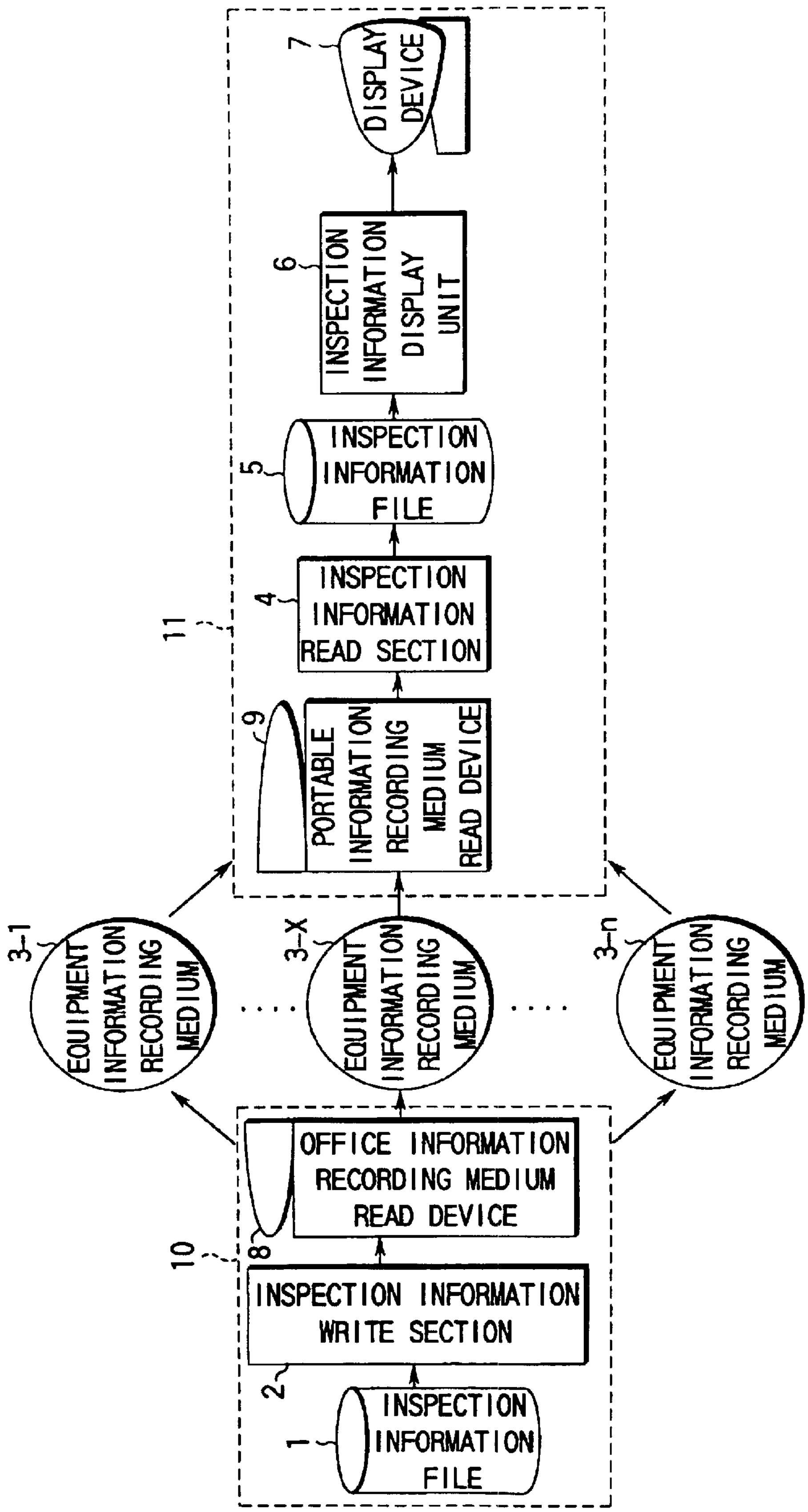
FIG. 9 is a block diagram showing a maintenance/inspection support apparatus according to the first embodiment of the present invention.

FIG. 9 is a block diagram showing a maintenance/inspection support apparatus according to the first embodiment of the present invention.

The maintenance/inspection support apparatus of this embodiment provides sufficient and accurate inspection information to workers and omits a work of preparing an operation tag for each maintenance/inspection operation and hanging it on an on-site equipment, thereby improving work efficiency.

Referring to FIG. 9, the maintenance/inspection support apparatus of this embodiment comprises an inspection information write unit 10 and an inspection information read unit 11. The inspection information write unit 10 and the inspection information read unit 11 are constituted by a portable personal computer or the like, as will be shown in FIG. 10.

The inspection information write unit 10 and the inspection information read unit 11 may be constituted by a desktop computer in an office. In addition, the units 10 and 11 may be constituted by both a portable computer carried on the site in inspection work and an office computer for managing and analyzing data collected in the inspection work. The portable and office computers may be selectively used in accordance with works.

The inspection information write unit 10 comprises an inspection information file 1, an inspection information write section 2, and an office information recording medium write device 8. The inspection information file 1 stores inspection information of a plurality of equipment serving as inspection targets.

Using the office information recording medium write device 8, the inspection information write section 2 stores, in a noncontact manner, the inspection information stored in the inspection information file 1 on a plurality of equipment information recording media 3-1, . . . , 3-x, . . . , 3-n respectively corresponding to a plurality of equipments serving as inspection targets.

The equipment information recording media 3-1, . . . , 3-x, . . . , 3-n are storage media which require no power supply and can read/write inspection information of the equipments serving as inspection targets in a noncontact manner using radio waves or infrared rays.

The office information recording medium write device 8 is constituted by a radio frequency tag (information recording medium) reader, a radio frequency tag antenna, and the like. On the basis of an instruction from the inspection information write section 2, the office information recording medium write device 8 writes inspection information on the equipment information recording media 3-1, . . . , 3-x, . . . , 3-n in a noncontact manner using the radio waves or infrared rays.

The inspection information read unit 11 comprises a portable information recording medium read device 9, an inspection information read section 4, an inspection information file 5, an inspection information display unit 6, and a display device 7.

The portable information recording medium read device 9 is constituted by a radio frequency tag (information recording medium) reader, a radio frequency tag antenna, and the like.

Using the portable information recording medium read device 9, the inspection information read section 4 reads, in a noncontact manner, inspection information of an equipment as a maintenance/inspection target of the inspection information written in the equipment information recording media 3-1, . . . , 3-x, . . . , 3-n written on the equipment information recording media by the inspection information write section 2.

The inspection information file 5 identifies and stores the inspection information from the inspection information read section 4 for each equipment information recording medium.

The inspection information display unit 6 reads out the inspection information stored in the inspection information file 5 and outputs the readout information to the display device 7. The display device 7 displays the inspection information output from the inspection information display unit 6.

The equipment information recording media 3-1, . . . , 3-x, . . . , 3-n are storage media which require no power supply and can read/write the inspection information of the equipment n in a noncontact manner using the radio waves or infrared rays, as described above.

Examples of this information recording medium are a radio frequency tag and an IC card. In particular, the radio frequency tag is a nonvolatile memory called a radio frequency card.

This radio frequency tag requires no internal power supply because it receives power via radio waves. A battery dead state need not be taken into consideration for the radio frequency tag. Information can be repeatedly and simultaneously written/read in/from radio frequency tags almost semipermanently in a noncontact manner (range of several cm to several m).

The general shape of the radio frequency tag is circular having a thickness of about 0.8 mm in which a reception/transmission coil and an IC are incorporated. The shape can be arbitrarily determined in accordance with application purposes, and the radio frequency tag is often used in the form of a card.

In particular, ferroelectric memories (FeRAMs) have recently been developed, and large-capacity, high-access-speed FeRAMs using a low operating voltage of about 3 V have been used in practice.

Figure 10:
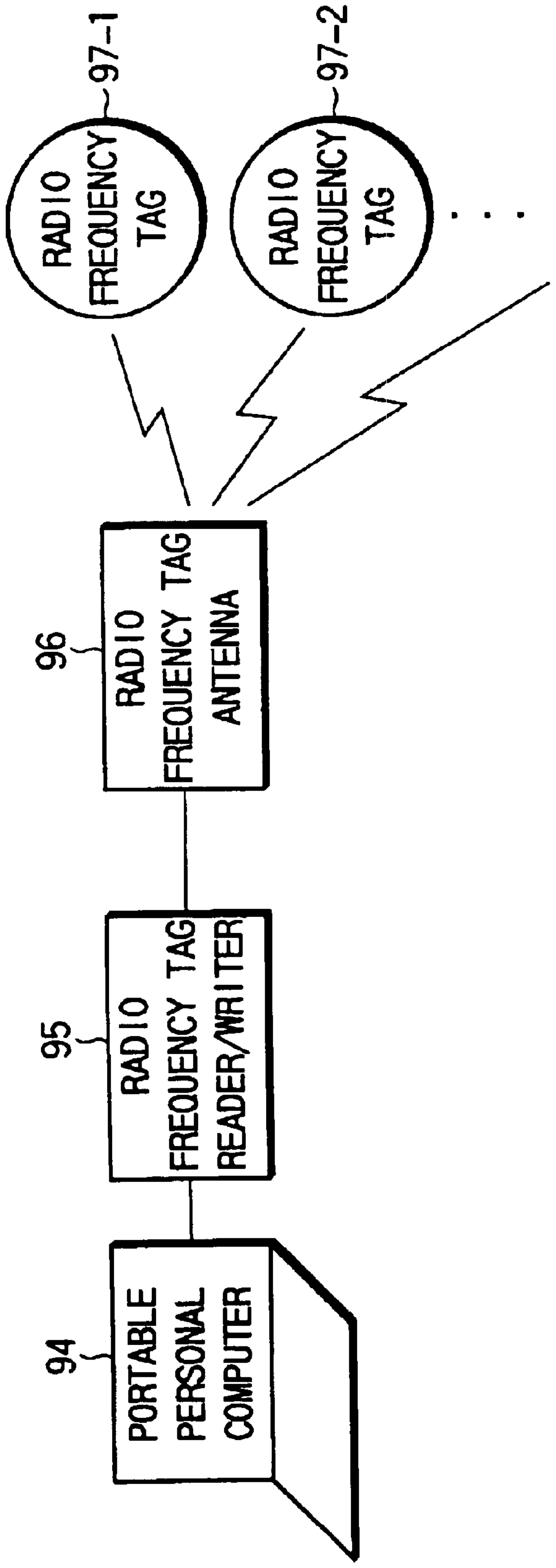
FIG. 10 is a view showing hardware of the maintenance/inspection support apparatus of the first embodiment of the present invention.

FIG. 10 is a view showing hardware of the maintenance/inspection support apparatus according to the first embodiment of the present invention.

Referring to FIG. 10, the maintenance/inspection support apparatus of this embodiment comprises a portable personal computer 94, a radio frequency tag reader/writer 95, a radio frequency tag antenna 96, and radio frequency tags 97-1, . . . , 97-n.

In relation with the block diagram shown in FIG. 9, the portable personal computer 94 corresponds to the inspection information file 1, the inspection information write section 2, the inspection information read section 4, the inspection information file 5, the inspection information display unit 6, and the display device 7.

The radio frequency tag reader/writer 95 and the radio frequency tag antenna 96 correspond to the office information recording medium write device and the portable information recording medium read device 9.

The radio frequency tags 97-1, . . . , 97-n correspond to the equipment information recording media 3-1, . . . , 3-x, . . . , 3-n.

The radio frequency tag reader/writer 95 has a large number of hardware components shared between the office information recording medium write device 8 and the portable information recording medium read device 9. The radio frequency tag reader/writer 95 is an integral unit of the devices 8 and 9 and can perform write/read access to the information recording medium (radio frequency tag) via a radio frequency tag antenna.

Note that the radio frequency tag reader/writer 95, the radio frequency tag antenna 96, and the radio frequency tag 97-n may have arbitrary shapes in accordance with application purposes.

For example, the radio frequency tag reader/writer 95 can be incorporated in the portable personal computer in the form of an interface card, or can be installed on the site and connected to a portable personal computer via a radio frequency LAN.

The radio frequency tag antenna 96 may be fixed or installed on an on-site ceiling or gate or used as a portable antenna mounted on the portable personal computer 94.

Figure 11:
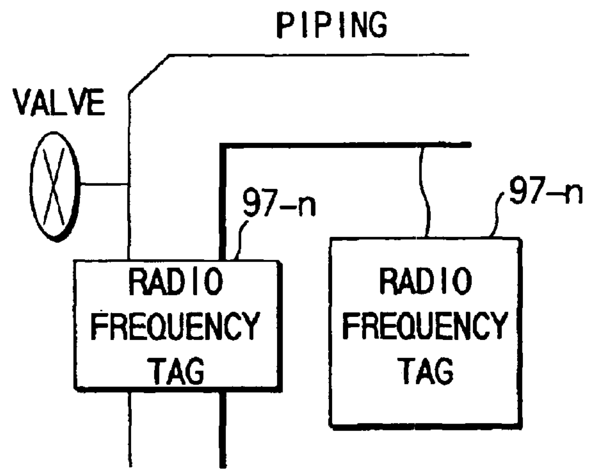
FIG. 11 is a view for explaining a method of attaching an information recording medium in the maintenance/inspection support apparatus of the first embodiment of the present invention.

The information recording medium (radio frequency tag) conventionally has the form of a tag. As shown in FIG. 11, the tag hangs on piping near an operation end (e.g., a valve) or embedded (wound) in the piping to prevent loss. In this manner, the information recording medium is used in the form of a card, which can be readily carried by a worker.

Figure 12:
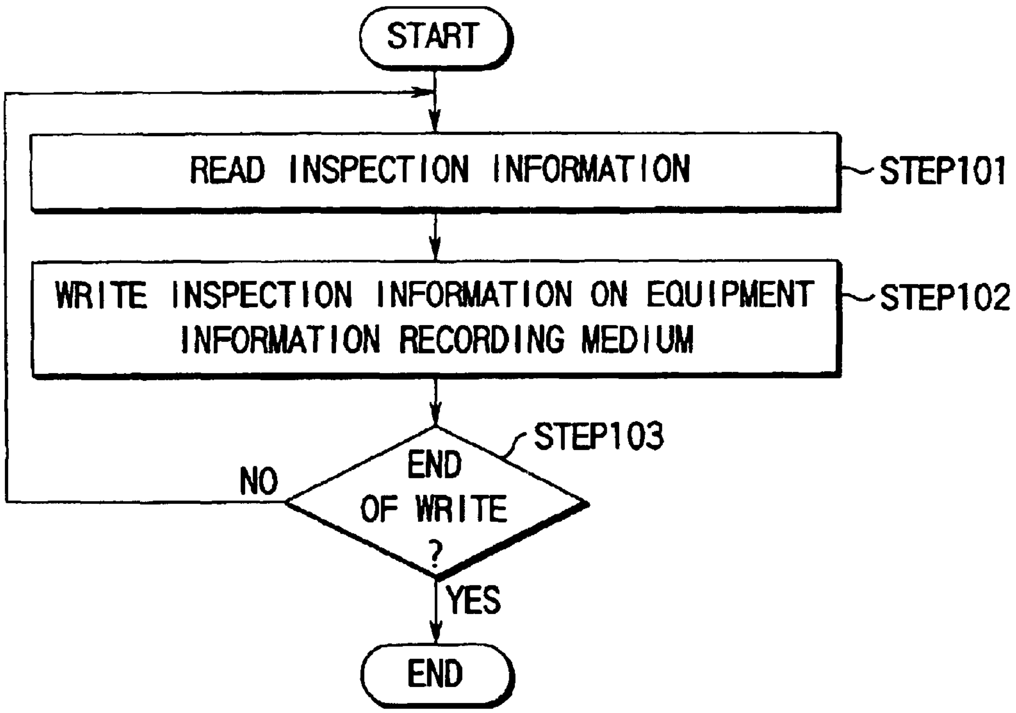
FIG. 12 is a flow chart for explaining the operation of writing inspection information in the maintenance/inspection support apparatus according to the first embodiment of the present invention.
Figure 13:
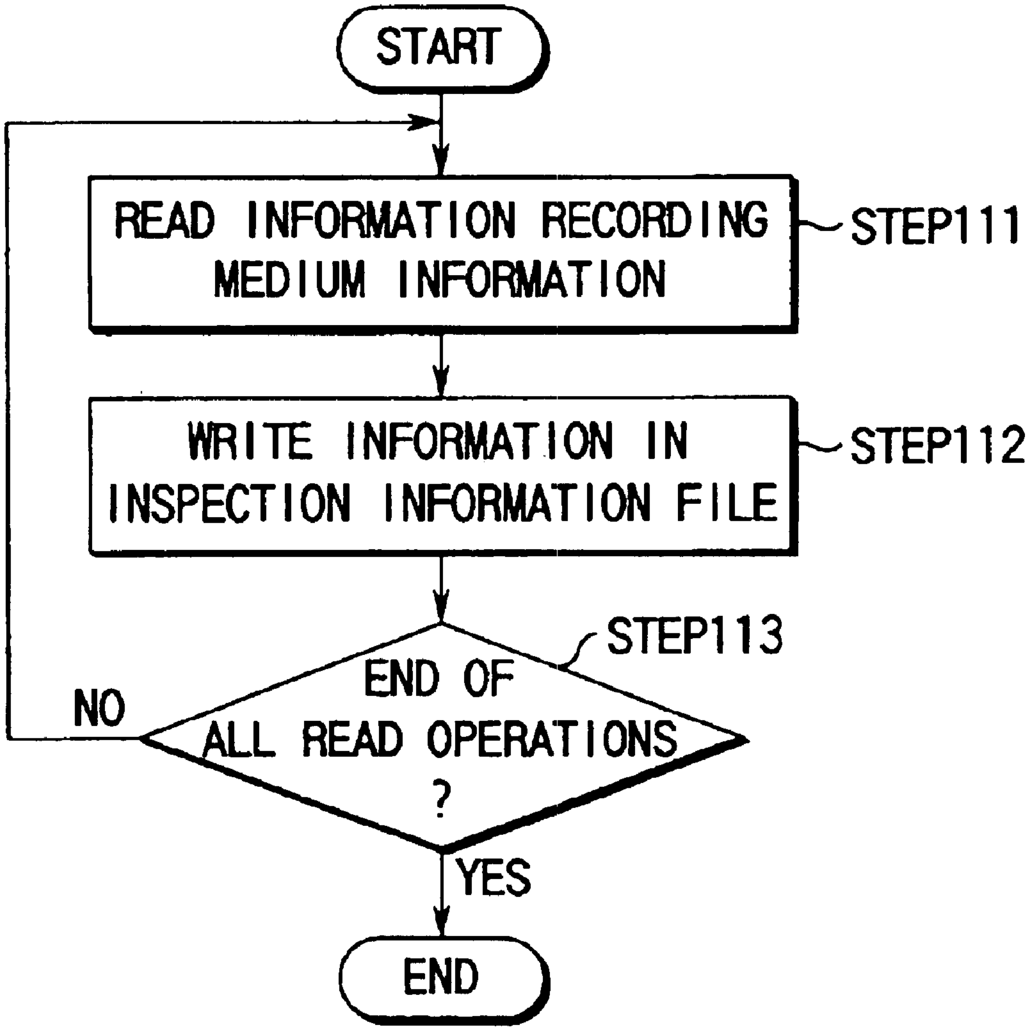
FIG. 13 is a flow chart for explaining the operation of writing inspection information in the maintenance/inspection support apparatus according to the first embodiment of the present invention.

The operation of the maintenance/inspection support apparatus according to this embodiment will be described with reference to the flow charts in FIGS. 12 and 13.

The operation of writing inspection information on an information recording medium will be described first with reference to the flow chart in FIG. 12.

Inspection information of equipments serving as a plurality of inspection targets is read from the inspection information file 1 by the inspection information write section 2 (step 101).

Figure 14:
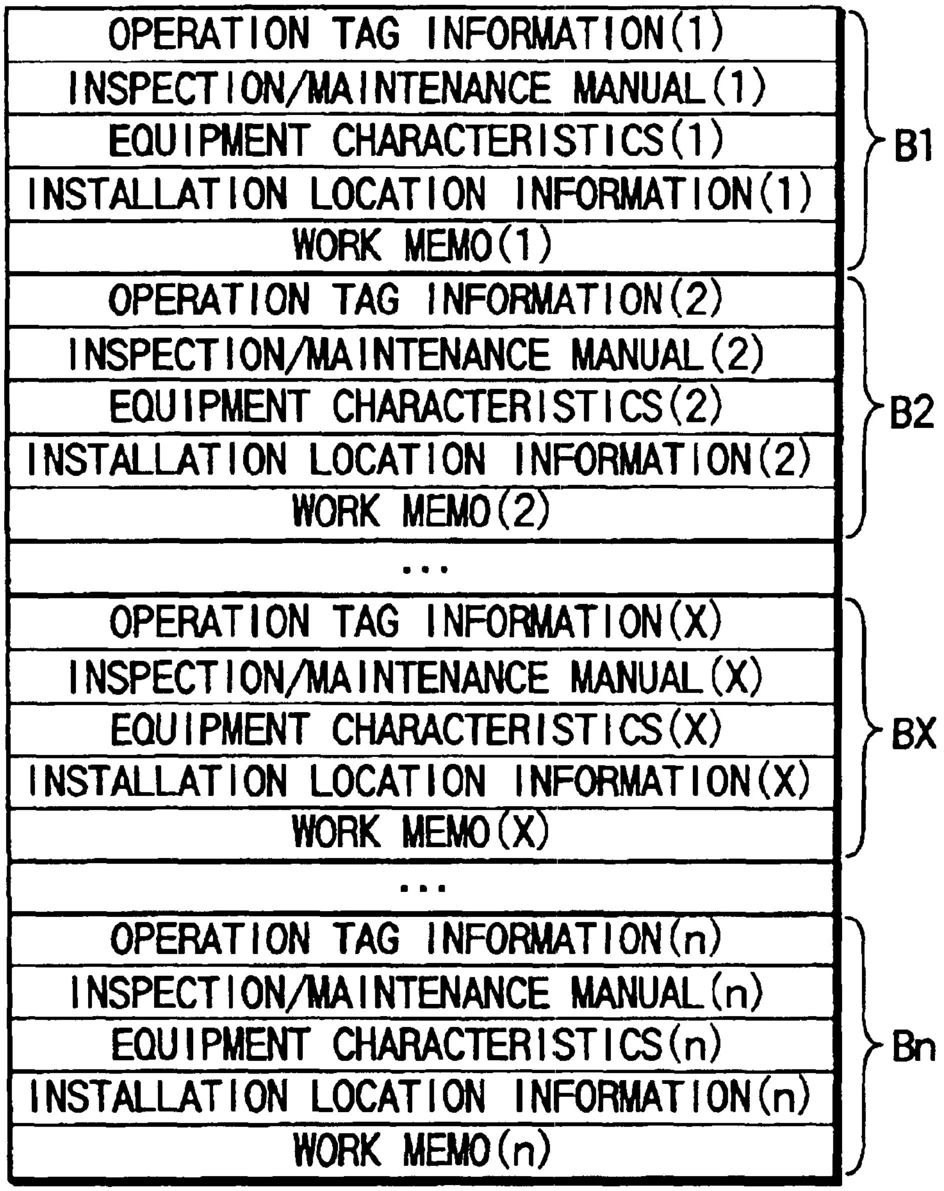
FIG. 14 is a view showing an inspection information file 1 of the maintenance/inspection support apparatus according to the first embodiment of the present invention.

FIG. 14 is a view showing the memory information stored in the inspection information file 1.

The inspection information file 1 has memory areas B corresponding to the respective pieces of inspection information.

Each memory area B stores operation tag information (1, . . . , x, . . . , n), an inspection/maintenance manual (1, . . . , x, . . . , n), equipment characteristics (1, . . . , x, . . . , n), installation location information (1, . . . , x, . . . , n), and a work memo (1, . . . , x, . . . , n), and the like. Although not shown, a PID (input point identification symbol), input point information, and process value are also recorded in each memory area B.

Figure 36:
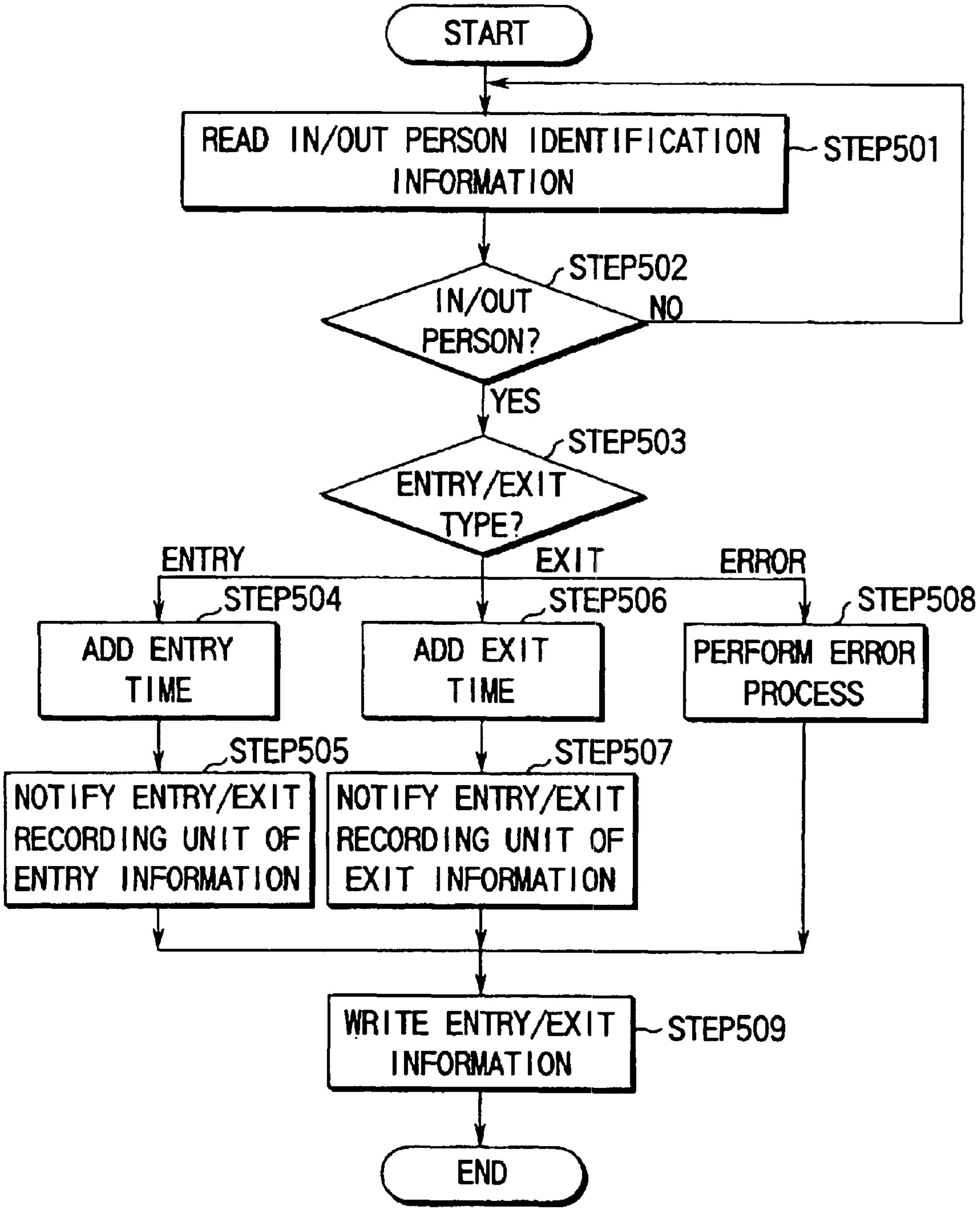
FIG. 36 is a flow chart for explaining the operation of the entry/exit management apparatus.

Referring to FIG. 14, operation tag information (1, . . . , x, . . . , n) is operation tag information shown in FIG. 36. The inspection/maintenance manual (1, . . . , x, . . . , n) is a maintenance/inspection manual required in maintenance/inspection.

The equipment characteristics (1, . . . , x, . . . , n) are various characteristics of an equipment to be maintained and inspected. The installation location information (1, . . . , x, . . . , n) represents the location where the equipment to be maintained and inspected is located. The work memo (1, . . . , x . . . , n) such as taking-over items is required in a work.

The inspection information of each equipment, which is read by the inspection information write section 2 is written on the corresponding equipment information recording medium 3-x using the office information recording medium write device 8 (step 102).

It is determined whether write access to all the equipment information recording media is complete (step 103). If so, the write process is complete.

The inspection information can be simultaneously written on the plurality of information recording media 3-1, . . . , 3-x, . . . , 3-n. Note that the information recording media thus prepared are installed in the plurality of on-site equipments in place of the operation tags.

The inspection information read process in the maintenance/inspection support apparatus according to this embodiment will be described with reference to the flow chart in FIG. 13.

A worker reads the inspection information from the equipment information recording medium 3-x using the portable information recording medium read device 9 carried by him (step 111). The read inspection information is stored in the inspection information file 5 (step 112).

Figure 15:
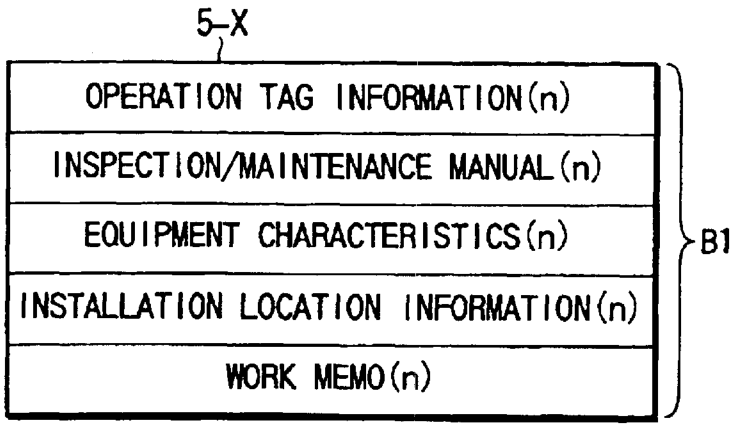
FIG. 15 is a view showing an inspection information file 5 of the maintenance/inspection support apparatus according to the first embodiment of the present invention.

FIG. 15 shows an inspection information file 5-x. As shown in FIG. 15, the inspection information file 5-x having only information Bx of the xth operation tag in the inspection information file 1 in FIG. 14.

It is determined whether all the inspection information is completely read from the equipment information recording medium 3-x (step 113) in consideration that a plurality of on-site equipment information recording media are present in the same work area. If so, the inspection information read process is complete.

The information written in the inspection information file 5-x is output to the display device 7 by the inspection information display unit 6 and displayed on the device 7.

Figure 16:
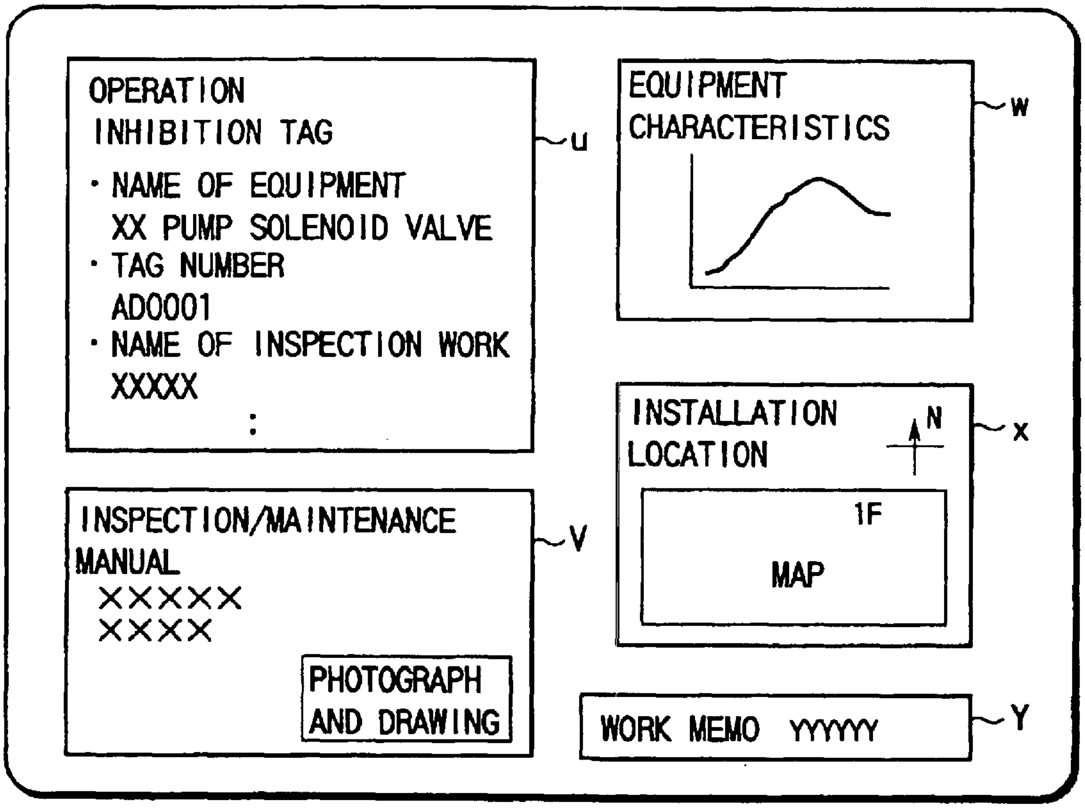
FIG. 16 is a view showing display windows of inspection information in the maintenance/inspection support apparatus according to the first embodiment of the present invention.

FIG. 16 is a view showing the display windows of the inspection information.

Referring to FIG. 16, windows U, V, W, X, and Y represent the conventional operation tag, the inspection operation manual required in maintenance/inspection, the various characteristics of the equipment to be inspected, the map information representing the installation location of the equipment to be inspected, and the work memo such as taking-over items, respectively.

Only one or a desired combination of these windows U to V may be displayed. The windows U to V may be overlapped and displayed.

According to the maintenance/inspection support apparatus of this embodiment, sufficient and accurate inspection information can be provided to workers, and operation of preparing an operation tag for each maintenance/inspection operation and hanging it on an on-site equipment can be omitted, thereby improving work efficiency.

Abundant information (large data capacity) as represented by the windows U to Y about the equipment to be inspected is provided on the side of the equipment to be inspected. In particular, when a large number of equipments to be inspected/maintained are present as in a plant, a large amount of data information about all the equipments need not be stored in a portable computer recording device. As a result, the computer can have a small memory, and maintenance/inspection can be realized using a compact, lightweight, low-cost computer.

Note that a recording unit for encrypting inspection information on the information recording medium to prevent illicit use and a decryption unit for decrypting the inspection information recorded on the information medium may be arranged in the information recording medium write device and the information recording medium read device, respectively.

<Second Embodiment>

Figure 17:
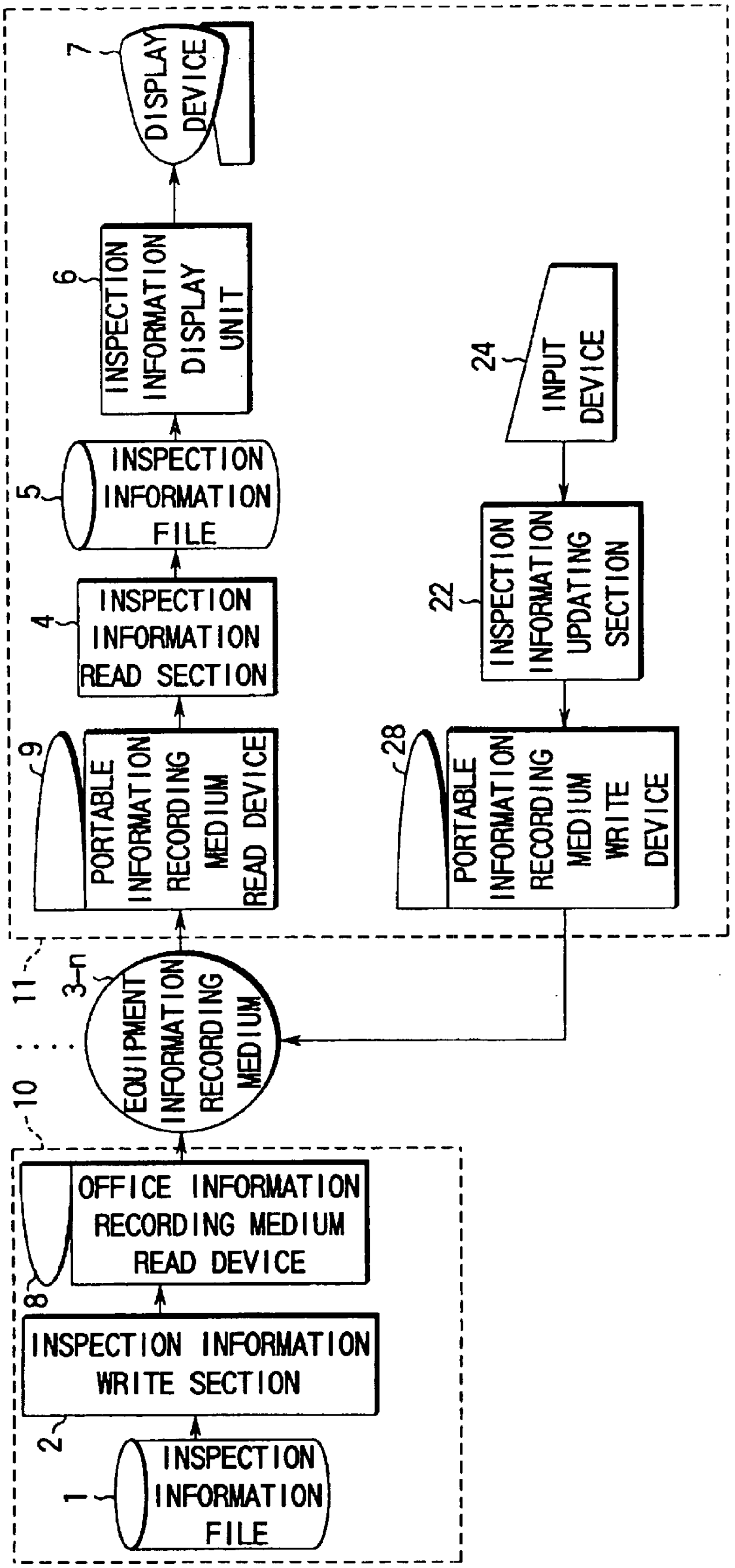
FIG. 17 is a block diagram showing a maintenance/inspection support apparatus according to the second embodiment of the present invention.

FIG. 17 is a block diagram showing a maintenance/inspection support apparatus according to the second embodiment of the present invention. The same reference numerals as in FIG. 9 denote the same parts in FIG. 17, and a detailed description thereof will be omitted. Only different parts will be described below.

More specifically, the maintenance/inspection support apparatus of this embodiment comprises an input device 24, an inspection information updating unit 22, and a portable information recording medium write device 28 in addition to the components of the maintenance/inspection support apparatus of the first embodiment.

The input device 24 comprises a mouse, keyboard, tenkey pad, pen input portable personal computer, or the like and inputs inspection information required for updating the inspection information.

The inspection information updating unit 22 writes and updates the inspection information input from the input device 24 on the equipment information recording media 3-1, . . . , 3-x, . . . , 3-n using the portable information recording medium write device 28.

The portable information recording medium write device 28 writes inspection information to be updated on one or a plurality of equipment information recording media in a noncontact manner. This portable information recording medium write device is functionally equivalent to the office information recording medium write device 8 but is a portable compact device which allows on-site write access to the equipment information recording media 3-1, . . . , 3-x, . . . , 3-n attached to the equipments.

Figure 18:
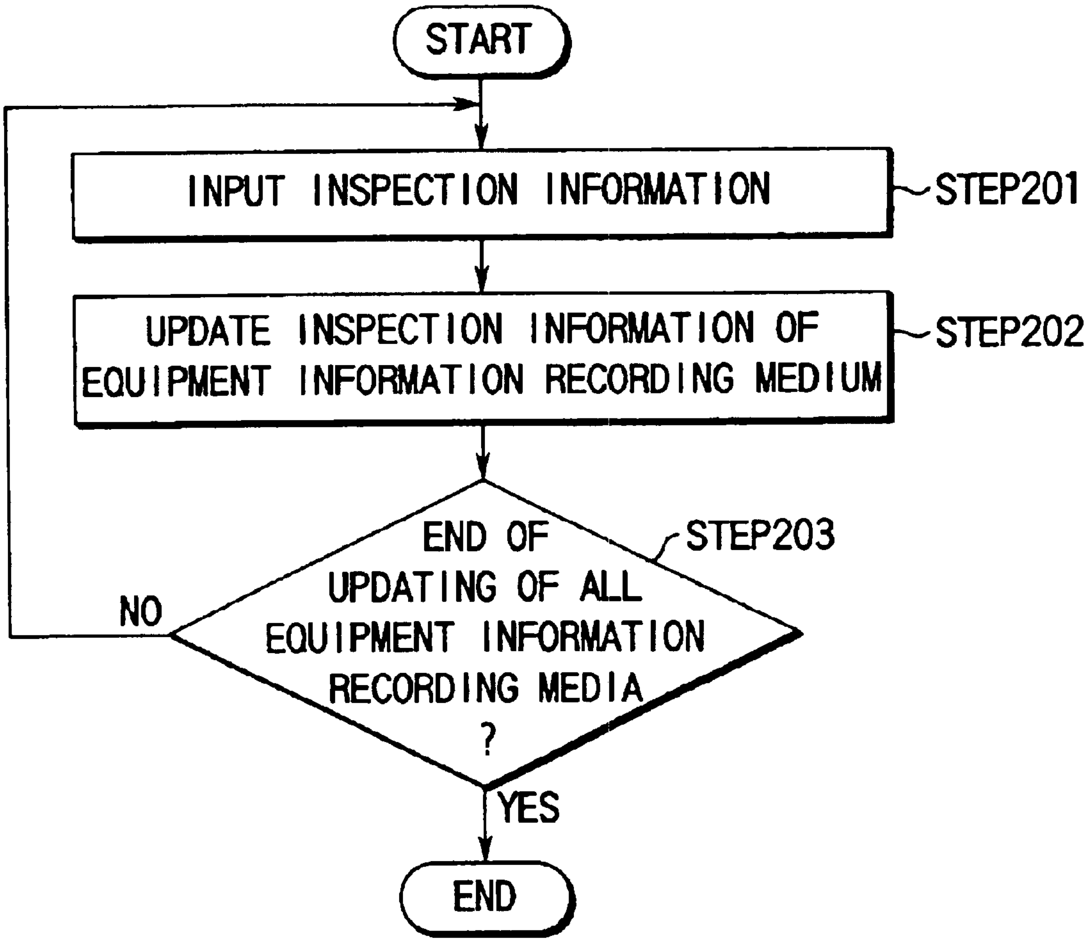
FIG. 18 is a flow chart showing the operation of the maintenance/inspection support apparatus according to the second embodiment of the present invention.

The operation of the maintenance/inspection support apparatus according to this embodiment will be described with reference to the flow chart in FIG. 18.

To update inspection information using the maintenance/inspection support apparatus of this embodiment, inspection information to be updated is input using the input device 24 (step 201). Note that the structure of the inspection information to be updated is identical to that of the information stored in the inspection information file 5-x in FIG. 15.

The inspection information updating unit 22 writes and updates the inspection information from the input device 24 on the equipment information recording media 3-1, . . . , 3-x, . . . , 3-n using the portable information recording medium write device 28 (step S202).

At this time, the inspection information already written on the equipment information recording medium 3-x is compared with the inspection information to be updated by the inspection information updating unit 22. When the operation tag information (identification code) of the inspection information written on the medium 3-x coincides with that of the inspection information to be updated, an update process is performed.

It is determined whether operation for all the equipment information recording media 3-1, 3-x, . . . , 3-n to be updated is complete (step 203). If so, the process is complete.

As described above, the inspection information can be updated in the plurality of equipment information recording media 3-1, . . . , 3-x, . . . , 3-n to be updated in a noncontact manner.

According to this embodiment, in addition to the effect of the maintenance/inspection support apparatus of the first embodiment, the inspection information can be updated, and latest inspection information can be provided to workers.

Operation of removing an information recording medium from an on-site equipment each time, rewriting information on the removed information recording medium in an office, and mounting it again on the on-site equipment need not be performed. In addition, an information recording medium will not be erroneously attached to a wrong on-site equipment.

According to the maintenance/inspection support apparatus of this embodiment, the inspection information to be updated, which is input from the input device such as a mouse, is written on the equipment information recording media 3-1, . . . , 3-x, . . . , 3-n in a noncontact manner to update the changing inspection information. More accurate inspection information can be provided to the workers, and as a result work efficiency can be improved.

<Third Embodiment>

Figure 19:
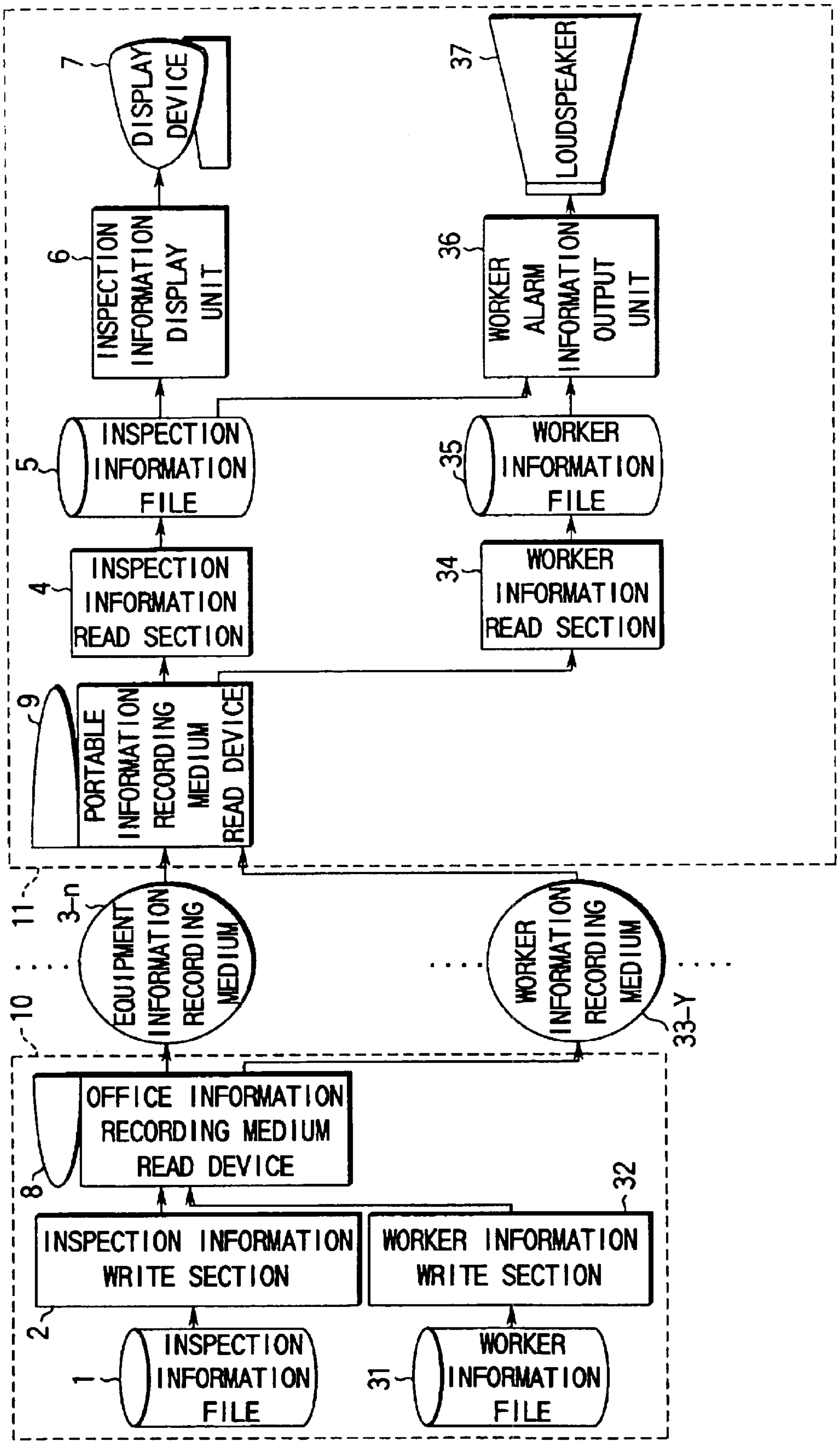
FIG. 19 is a block diagram showing a maintenance/inspection support apparatus according to the third embodiment of the present invention.

FIG. 19 is a block diagram showing a maintenance/inspection support apparatus according to the third embodiment of the present invention. The same reference numerals as in FIG. 9 denote the same parts in FIG. 19, and a detailed description thereof will be omitted. Only different parts will be described below.

The maintenance/inspection support apparatus of this embodiment comprises a worker information file 31, a worker information write section 32, worker information recording media 33-1 to 33-m, a worker information read section 34, a worker information file 35, a worker alarm output unit 36, and a loudspeaker 37 in addition to the components of the maintenance/inspection support apparatus of the first embodiment.

The worker information file 31 stores information of a plurality of workers in advance.

The worker information write section 32 writes the contents of the worker information file 31 on the worker information recording media 33-1 to 33-m using an office information recording medium write device 8.

The worker information recording medium 33-m is a memory media which is carried by a worker m, requires no power supply, and can simultaneous write/read access to the contents of the worker information file in a noncontact manner using radio waves or infrared rays. The worker information read section 34 reads the worker information from the worker information recording medium 33-m using a portable information recording medium read device 9 and stores the read worker information in the worker information file 35. The worker information file 35 is a file which stores the worker information read by the worker information read section 34.

The worker alarm output unit 36 compares target equipment inspection information stored in the inspection information file 5 with the worker information stored in the worker information file 35, determines whether the worker is an authorized worker, and outputs an alarm for the non-authorized worker from the loudspeaker 37.

The loudspeaker 37 is a device for outputting an alarm output from the worker alarm output unit 36 in the form of a sound. The alarm output means may display an alarm on a display device 7 in place of the sound.

Figure 20:
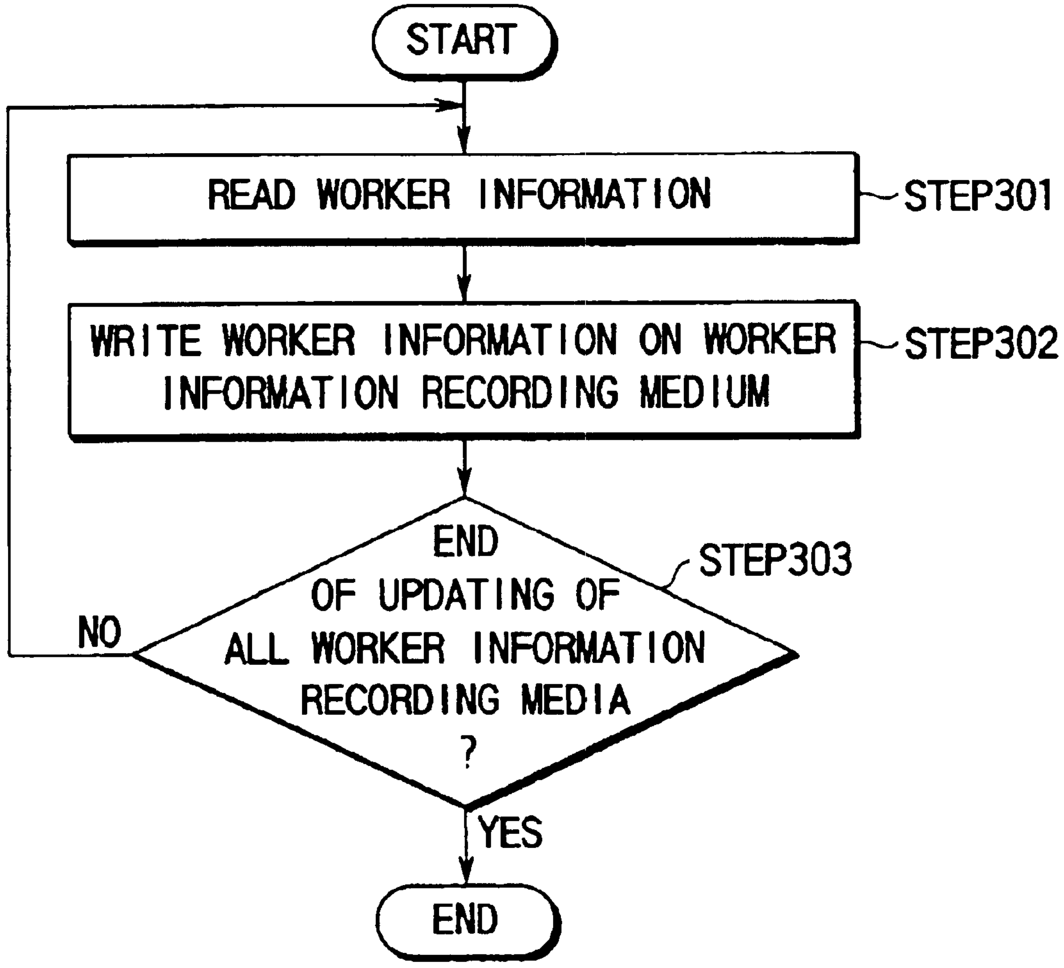
FIG. 20 is a flow chart showing a worker information write process.
Figure 21:
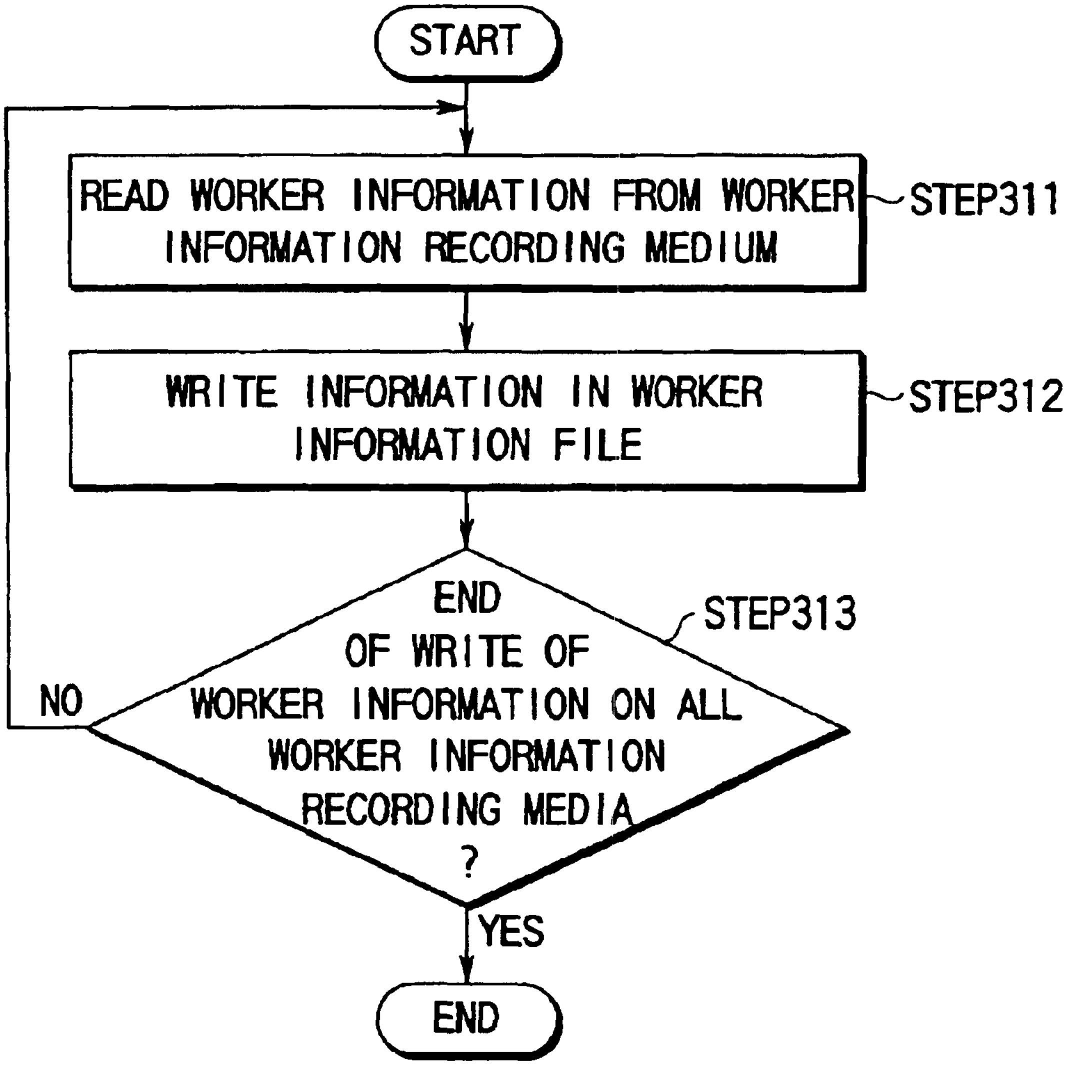
FIG. 21 is a flow chart showing a worker information read process.
Figure 22:
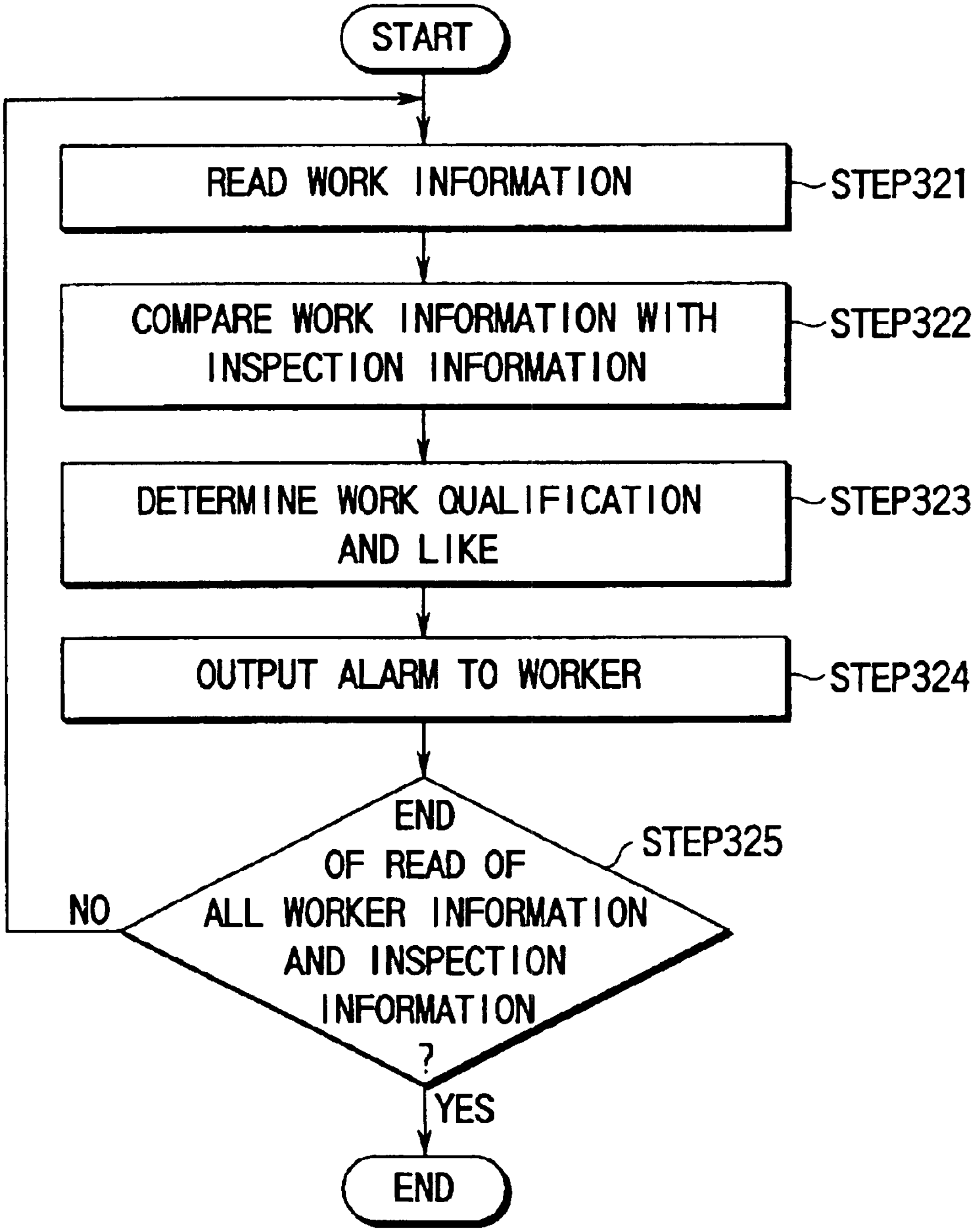
FIG. 22 is a flow chart showing an alarm output process.

The operation of the maintenance/inspection support apparatus according to this embodiment will be described with reference to the flow charts in FIGS. 20 to 22.

To write worker information, the worker information write section 32 reads worker information stored in advance in the worker information file 31 (step 301).

Figure 23:
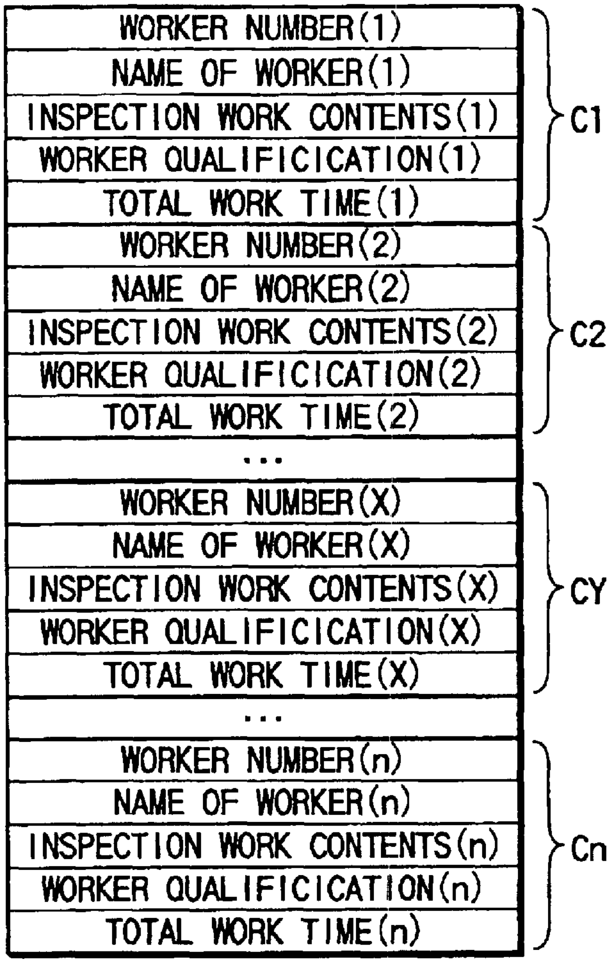
FIG. 23 is a view showing a worker information file.

FIG. 23 is a view showing worker information stored in the worker information file 35.

This file has memory areas C each corresponding each worker information.

Each memory area stores a worker number (1, . . . , Y, . . . , n), name of worker (1, . . . , Y, . . . , n), inspection work contents (1, . . . , Y, . . . , n), work qualification (1, . . . , Y. . . . , n), total work time (1, . . . , Y, . . . , n), and the like.

The worker number is the number unique to each worker. The name of worker is constituted by the last and first names. The worker qualification is the qualification for the work of a worker and indicates whether the worker is qualified to handle high voltages or dangerous articles. The inspection work contents represent a work to be performed by a worker. The total work time is a total time in which a worker has been engaged.

The worker information write section 32 writes the read worker information on the corresponding worker information recording medium 33-Y using the office information recording medium write device 8 (step 302).

The above process is repeated as the batch process for a plurality of workers until write access to all the worker information recording media 33-1 to 33-m is complete (step 303).

The worker information can be simultaneously written on the plurality of worker information recording media 33-1 to 33-m in a noncontact manner.

Operation for confirming the work qualification of a worker Y having the worker information recording medium 33-Y, a non-authorized worker, or a worker working on a dangerous work exceeding a prescribed work time will be described below.

In this case, the worker information read section 34 reads worker information from the worker information recording medium 33-Y using the portable information recording medium read device 9 (step 311).

The worker information read section 34 stores the read worker information in the worker information file 35 (step 312).

Figure 24:
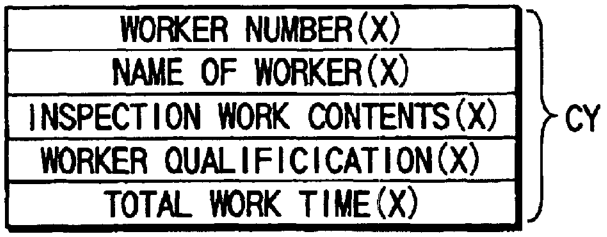
FIG. 24 is a view showing a worker information file 35-m.

FIG. 24 shows the worker information file 35.

As shown in FIG. 24, the worker information file 35 has a structure in which only the memory area CY of the worker information file 31 is extracted.

When a plurality of workers are present in the same area, the above process is repeated until the worker information of all the worker information recording media is read (step 313). The worker information can thus be read from the plurality of worker information recording media 33-1 to 33-m.

The worker alarm output unit 36 reads inspection information from the inspection information file 5 and the worker information from the worker information file 35 (step 321), compares the worker information with the inspection information (step 322), and determines whether the worker has the work qualification or the work time exceeds the prescribed work time (step 323).

When the worker is not a qualified or authorized worker, or when the work time exceeds the prescribed work time, the worker alarm output unit 36 generates an alarm using the loudspeaker 37 (step 324).

When a plurality of equipments or workers are present in the same work area, the above process is repeated until all inspection information and all worker information are read because they must be compared with each other (step 325).

As described above, the presence/absence of work qualification and work permission, or the time exceeding the prescribed work time can be notified with a sound.

According to this embodiment, in addition to the effects of the first and second embodiments, information for notifying the worker of an alarm for entry into a dangerous area and a work limit time when the worker works in a location where an industrial plant reserves dangerous articles. When a worker has a work qualification and the work permission area is set in accordance with the work contents and qualification, information for notifying the worker of an alarm upon access to a restricted area.

According to the maintenance/inspection support apparatus of this embodiment, when a non-qualified worker enters a dangerous or restricted area, or works exceeding a prescribed work time set for a dangerous area, an alarm is generated. Therefore, works in industrial plants can be performed safely.

<Fourth Embodiment>

Figure 25:
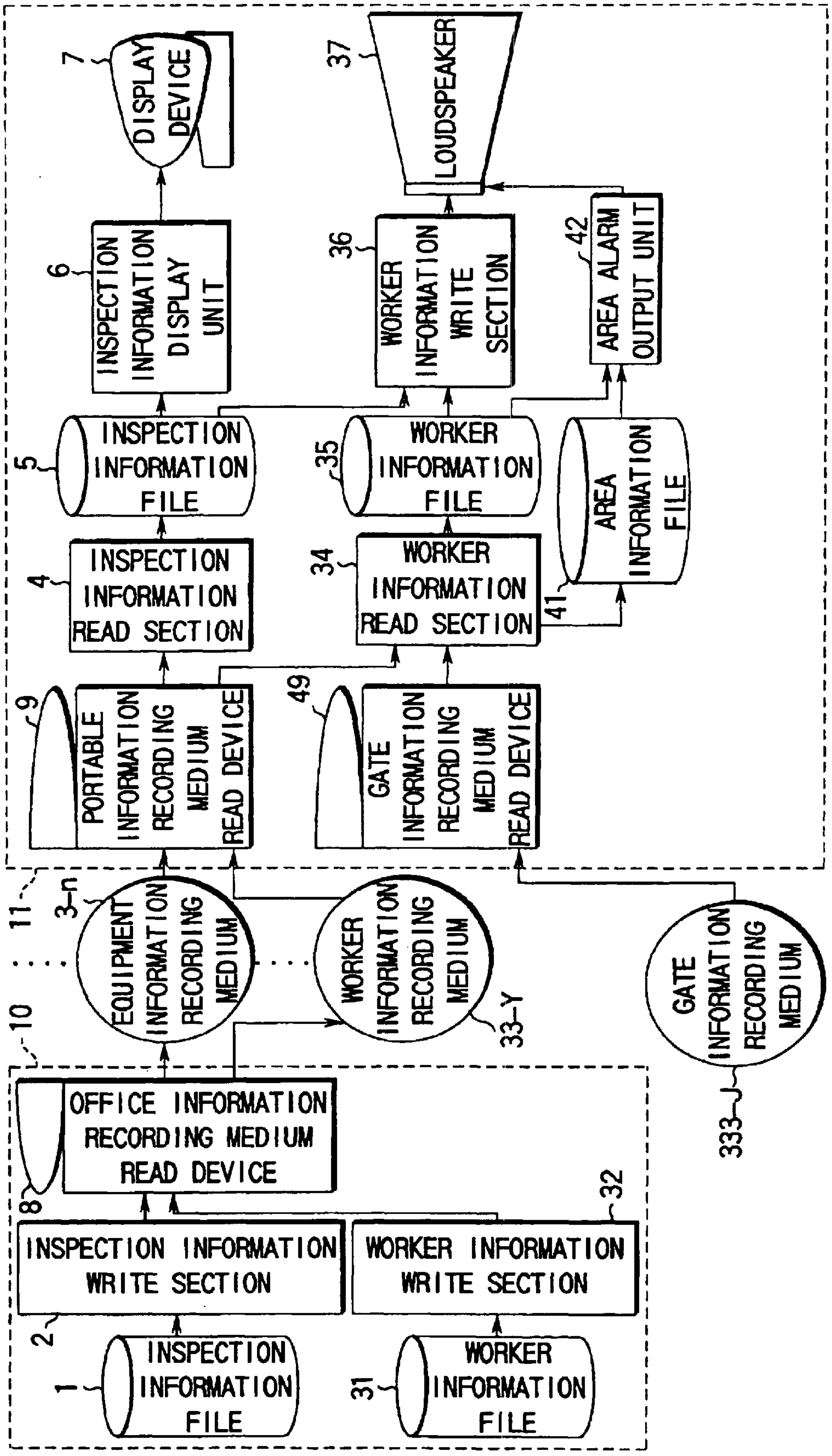
FIG. 25 is a block diagram showing a maintenance/inspection support apparatus according to the fourth embodiment of the present invention.

FIG. 25 is a block diagram showing a maintenance/inspection support apparatus according to the fourth embodiment of the present invention. The same reference numerals as in FIG. 19 denote the same parts in FIG. 25, and a detailed description thereof will be omitted. Only different parts will be described below.

The maintenance/inspection support apparatus of this embodiment comprises an area information file 41, a gate information recording medium read device 49, gate information recording media 333-1 to 333-j, and an area alarm output unit 42 in addition to the components of the maintenance/inspection support apparatus of the third embodiment.

The gate information recording media 333-1 to 333-j are arranged near gates for partitioning areas. Each recording medium stores information representing each area and entry qualification information of a worker in advance. A worker information read section 34 reads area information (or entry qualification information) from the gate information recording media 333-1 to 333-j by the gate information recording medium read device 49 and stores it in the area information file 41.

The worker information read section 34 also reads work permitted/inhibited area information (or qualification information of a worker) from a worker information recording medium 33-Y and stores it in a worker information file 35.

When the worker is inhibited from entering the area, the area alarm output unit 42 outputs an alarm on the basis of the information stored in the area information file 41 and worker information file 35.

Figure 26:
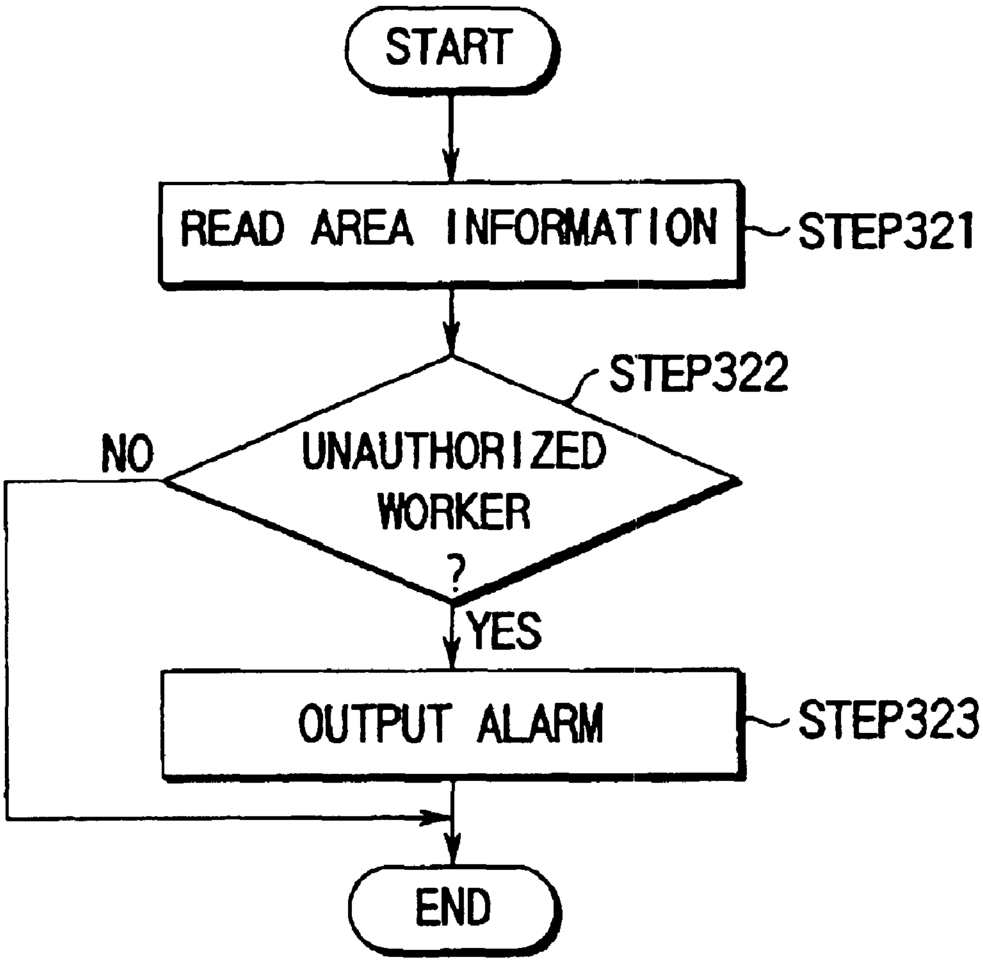
FIG. 26 is a flow chart showing the operation of the maintenance/inspection support apparatus according to the fourth embodiment of the present invention.

The operation of the maintenance/inspection support apparatus of this embodiment will be described with reference to the flow chart in FIG. 26.

When a worker enters into a site, the worker information read section 34 reads the area information of the gate information recording medium 333-j by the gate information recording medium read device 49 and stores it in the area information file 41 (step 321). Note that the worker information has already been loaded in the worker information file 35 from the worker information recording medium.

The area alarm output unit 42 compares the information of the worker information file 35 with that of the area information file 41 to check if the worker is not an authorized worker (step 322). If so, the area alarm output unit 42 causes a loudspeaker 37 to generate an alarm (step 323).

According to this embodiment, in addition to the effects of the maintenance/inspection support apparatus of the third embodiment, entry inhibited information is provided to a worker when the worker comes close to this restricted area in place of reading the equipment installation area stored in the equipment information recording medium upon entering close to the equipment, and generating an alarm representing the restricted area.

According to the maintenance/inspection support apparatus of this embodiment, entry inhibition information is generated to a worker when a worker passes through each of the gates for partitioning areas, thereby assuring safety of the worker. Note that the portable information recording medium read device 9 and the gate information recording medium read device 49 may be shared by one device.

<Fifth Embodiment>

Figure 27:
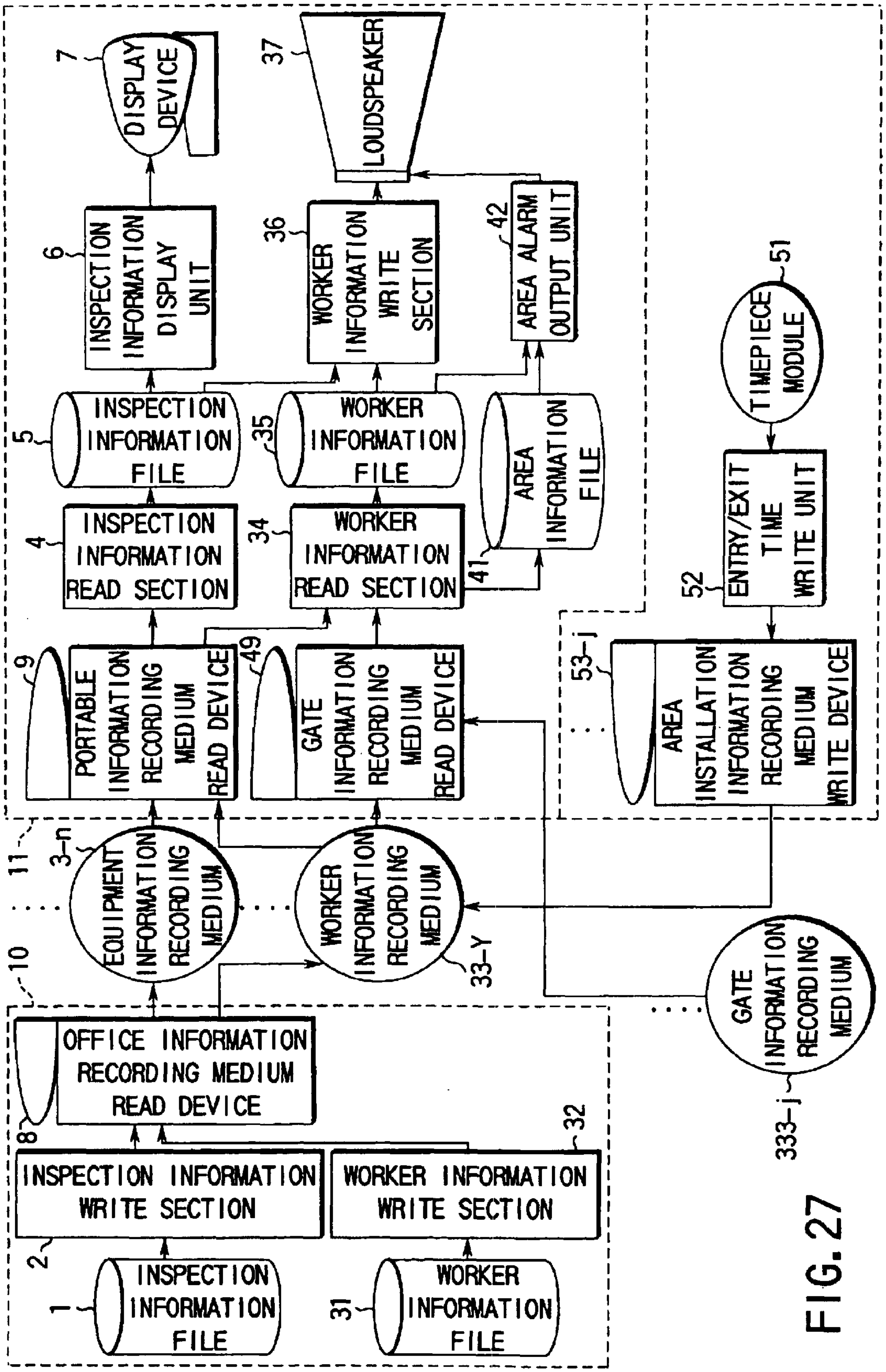
FIG. 27 is a block diagram showing a maintenance/inspection support apparatus according to the fifth embodiment of the present invention.

FIG. 27 is a block diagram showing a maintenance/inspection support apparatus according to the fifth embodiment of the present invention. The same reference numerals as in FIG. 25 denote the same parts in FIG. 27, and a detailed description thereof will be omitted. Only different parts will be described below.

The maintenance/inspection support apparatus of this embodiment comprises a means for writing information such as entry/exit time or the like is arranged at the entrance/exit of a maintenance/inspection work area in addition to the components of the maintenance/inspection support apparatus of the fourth embodiment. More specifically, as shown in FIG. 27, this apparatus includes an entry/exit time write unit 52 for writing time information from a timepiece module 51 on a worker information recording medium 33-Y carried by a worker Y using an area installation information recording medium write device 53-j.

Figure 28:
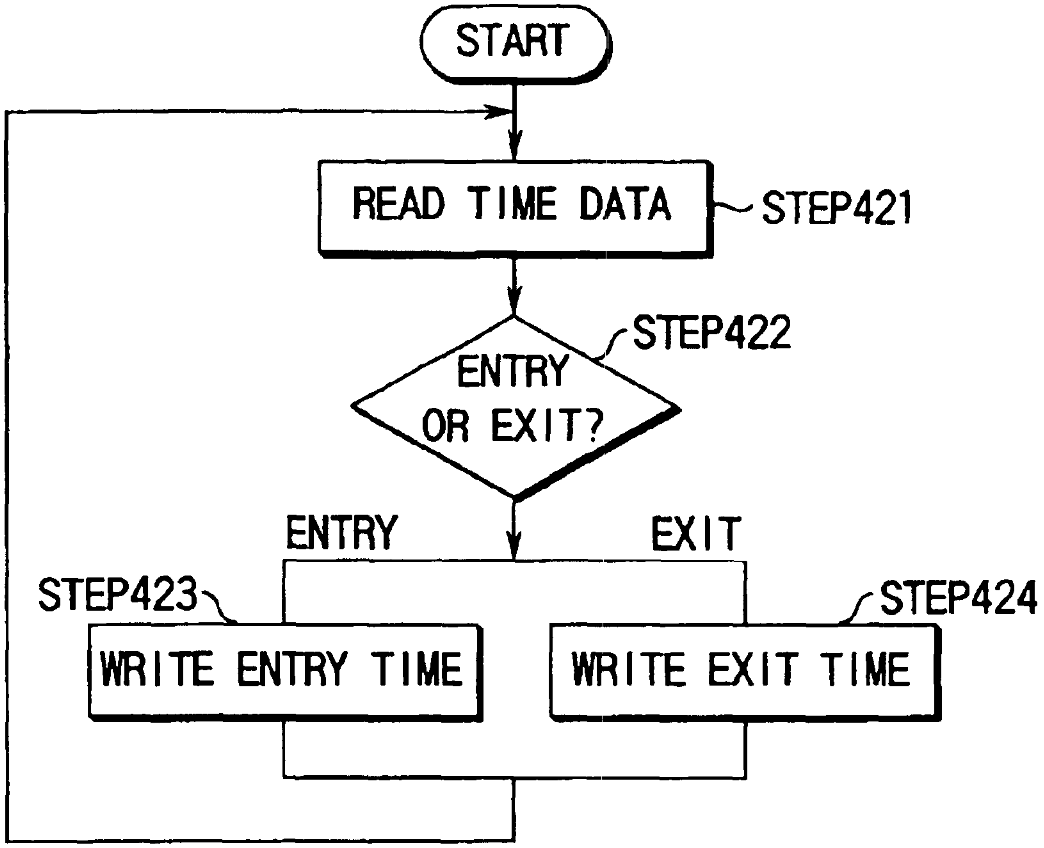
FIG. 28 is a flow chart showing the operation of the maintenance/inspection support apparatus according to the fifth embodiment of the present invention.

The operation of the maintenance/inspection support apparatus of this embodiment will be described with reference to the flow chart in FIG. 28.

When a worker passes through an on-site entrance/exit, the entry/exit time write unit 52 reads time information from the timepiece module 51 (step 421) to determine whether the worker enters into or exits from the site (step 422).

For entry, the time information read from the timepiece module 51 by the area installation information recording medium write device 53-j is written as entry time on the worker information recording medium 33-Y (step 423).

For exit, the time information read from the timepiece module 51 by the area installation information recording medium write device 53-j is written as entry time on the worker information recording medium 33-Y (step 424). The written time information is read by a portable information recording medium read device 9 and stored in an inspection information file 5. The time information is then displayed on a display device 7 by an inspection information display unit 6.

By adding the timepiece module 51, the entry/exit time write unit 52, and the area installation information medium write device 53-j as described above, a maintenance/inspection support apparatus for recording the entry/exit time of workers on the worker information recording media can be provided.

Note that when the area installation information recording medium write devices 53-j are arranged in a plurality of areas, the entry/exit times (area work times) of workers can be precisely managed. Entry and exit area installation information recording medium write devices 53-j may be arranged.

According to the maintenance/inspection support apparatus of this embodiment, the entry/exit of workers can be managed in addition to the effect of the fourth embodiment.

<Sixth Embodiment>

Figure 29:
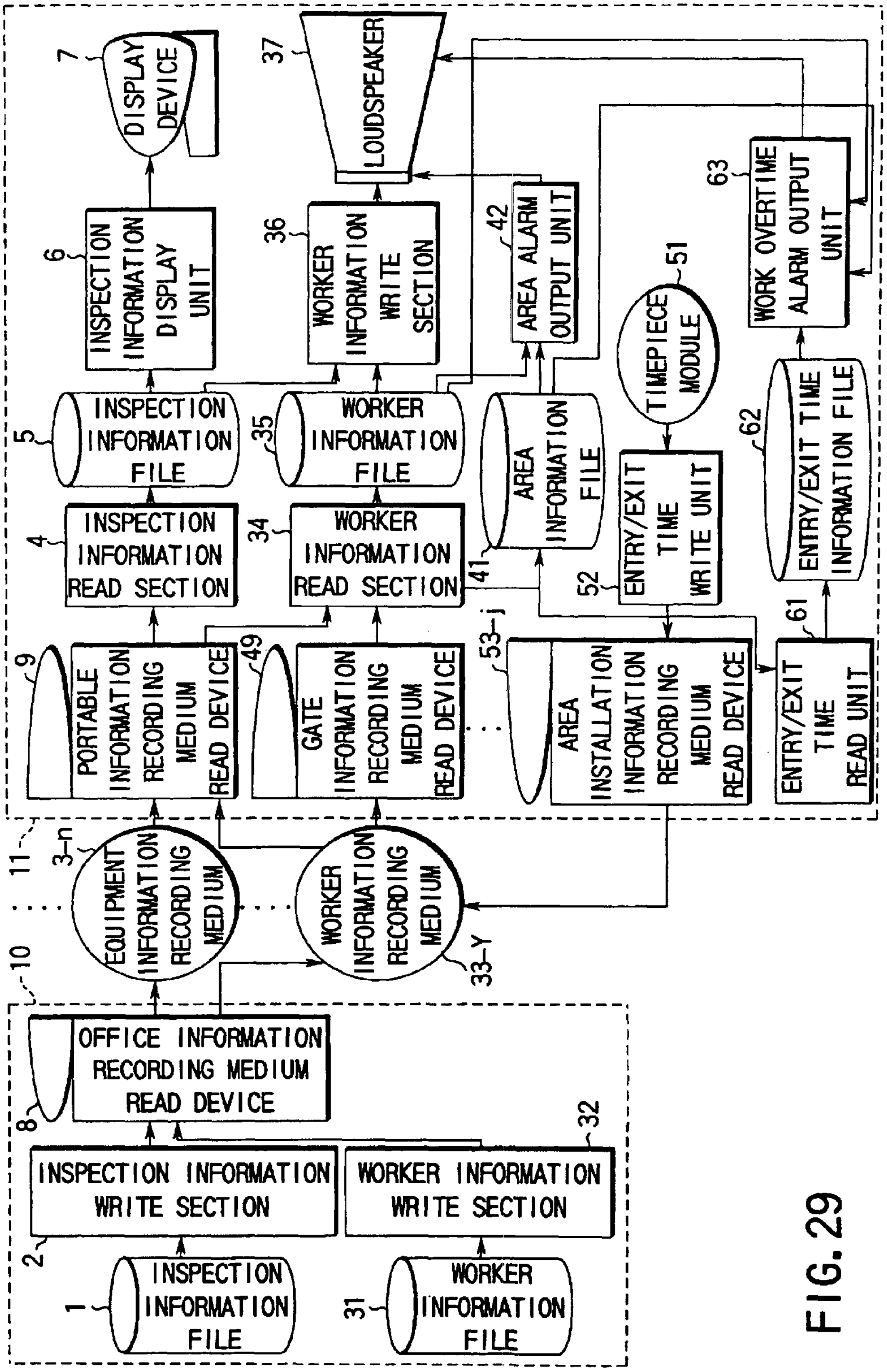
FIG. 29 is a block diagram showing a maintenance/inspection support apparatus according to the sixth embodiment of the present invention.

FIG. 29 is a block diagram showing a maintenance/inspection support apparatus according to the sixth embodiment of the present invention. The same reference numerals as in FIG. 27 denote the same parts in FIG. 29, and a detailed description thereof will be omitted. Only different parts will be described below.

As shown in FIG. 29, the maintenance/inspection support apparatus of this embodiment comprises an entry/exit time read unit 61, an entry/exit time information file 62, and a work overtime alarm output unit 63 in addition to the components of the maintenance/inspection support apparatus of the fifth embodiment.

The entry/exit time read unit 61 selects entry/exit time information from the recorded contents of a worker information recording medium 33 and stores it in the entry/exit time information file 62. The entry/exit time information file 62 stores the entry/exit time information of workers.

The work overtime alarm output unit 63 generates an overtime alarm to the worker when the work time of the worker in the work time limit area exceeds the limit time.

The operation of the maintenance/inspection support apparatus of this embodiment will be described below.

The entry/exit time read unit 61 selects entry/exit time information from the recorded contents of a worker information recording medium 33-m when the worker enters into the work time limit area.

The selected entry/exit time information is stored in the entry/exit time information file 62, thereby storing entry/exit time in units of workers.

The work overtime alarm output unit 63 always monitors the contents of the entry/exit time information file 62. When the entry time information is stored in the entry/exit time information file 62, the work overtime alarm output unit 63 reads the work permission time in the work time limit area from the area information file 41. At the same time, the work overtime alarm output unit 63 determines on the basis of the worker information from a worker information file 35 and the area information from an area information file 41 whether the work time of a worker m in the work time limit area exceeds the prescribed work time.

If it is determined that the work time of the worker m in the work time limit area exceeds the prescribed work time, an overtime alarm is generated to the worker.

According to the maintenance/inspection support apparatus of this embodiment, if a workable time is limited like in a radiation management area although this area is the regular work area, the worker or a supervisor need not check the time so as not to continuously operate the work exceeding the prescribed work time. More specifically, when a workable time is limited in a work area, the worker is notified of the overtime, thereby allowing a safety work.

<Seventh Embodiment>

Figure 30:
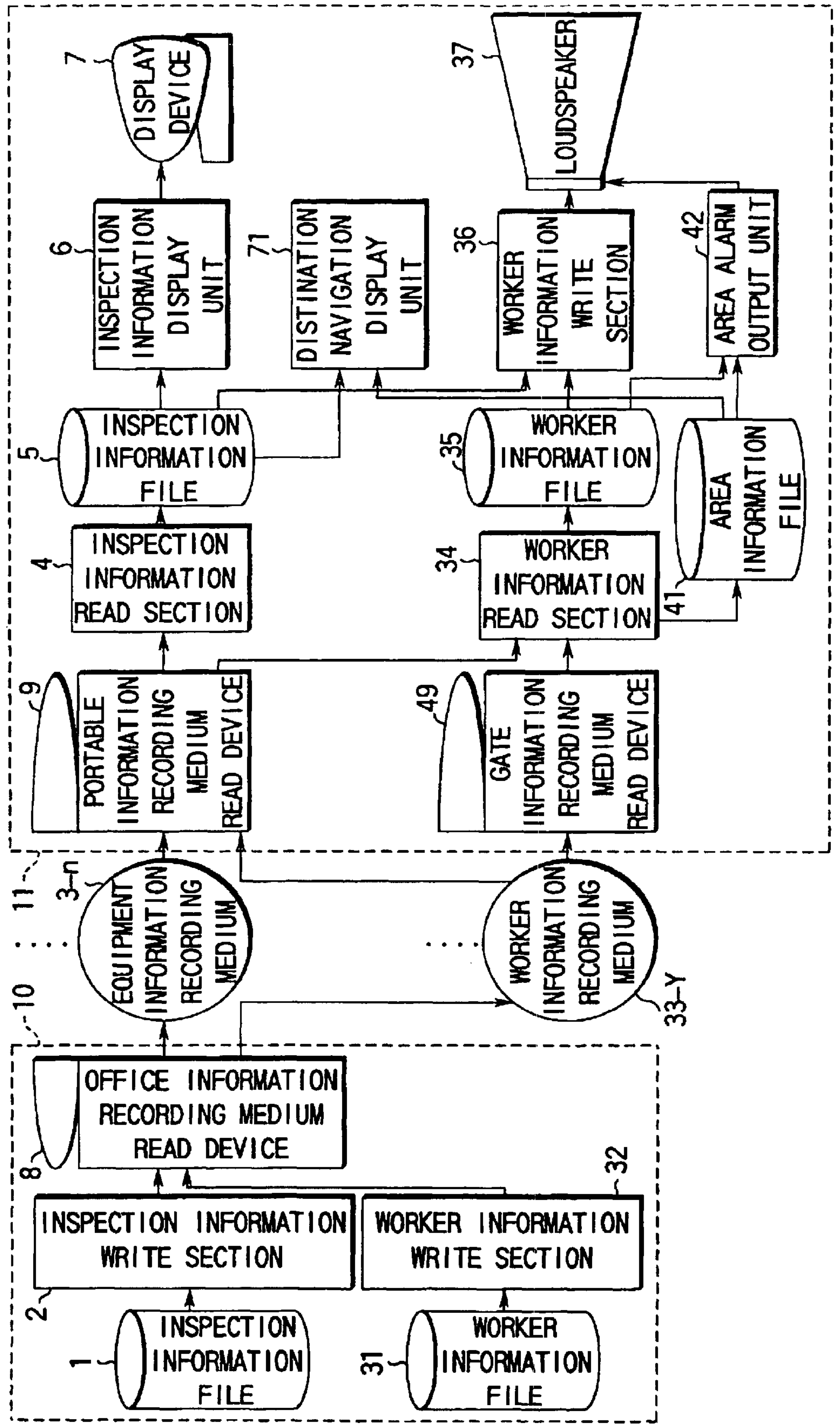
FIG. 30 is a block diagram showing a maintenance/inspection support apparatus according to the seventh embodiment of the present invention.

FIG. 30 is a block diagram showing a maintenance/inspection support apparatus according to the seventh embodiment of the present invention. The same reference numerals as in FIG. 25 denote the same parts in FIG. 30, and a detailed description thereof will be omitted. Only different parts will be described below.

The maintenance/inspection support apparatus of this embodiment additionally comprises a destination navigator display unit 71. The destination navigator display unit 71 compares inspection information (equipment installation area information) of an inspection information file 5 with area information (map information and inspection route information of a plant or the like) stored in an area information file 41. The destination navigator display unit 71 allows a display device 7 to display the on-site map and the current position to instruct a destination direction.

Worker information recording media 33-1, . . . , 33-Y . . . , 33-n store the map information of an area to be inspected and the inspection route information for performing an inspection work.

The area map information and inspection route information recorded on the worker information recording media 33-1, . . . , 33-Y, . . . , 33-n are read by a worker information read section 34 and a gate information recording medium read device 49 and stored in the area information file 41.

An equipment code for identifying equipment information and equipment inspection information containing the equipment installation location information, which are recorded on an equipment information recording medium 3-n attached to the equipment to be inspected, are read by an inspection information read section 4 using a portable information recording medium read device 9 and stored in the inspection information file 5.

The destination navigator display unit 71 displays the current position of the worker on the display device 7 on the basis of the map information stored in the area information file 41 and the equipment installation location information stored in the inspection information file 5.

The destination navigator display unit 71 also displays the next inspection location destination on the display device 7 on the basis of the map information stored in the area information file 41, and the inspection route information and equipment installation location information stored in the inspection information file 5.

More specifically, the destination navigator display unit 71 displays the on-site map and the current position and then the next work area, direction, and route to the worker at the time of inspection on the basis of the inspection information of the inspection information file 5 and the area information in the area information file 41.

According to the maintenance/inspection support apparatus of this embodiment, as described above, a sufficient and accurate inspection route is provided to the worker. When the worker continues works while sequentially changing the work locations, the next work location can be predetermined at the end of work at one location. The worker need not carry a map, and work efficiency can be improved.

<Eighth Embodiment>

Figure 31:
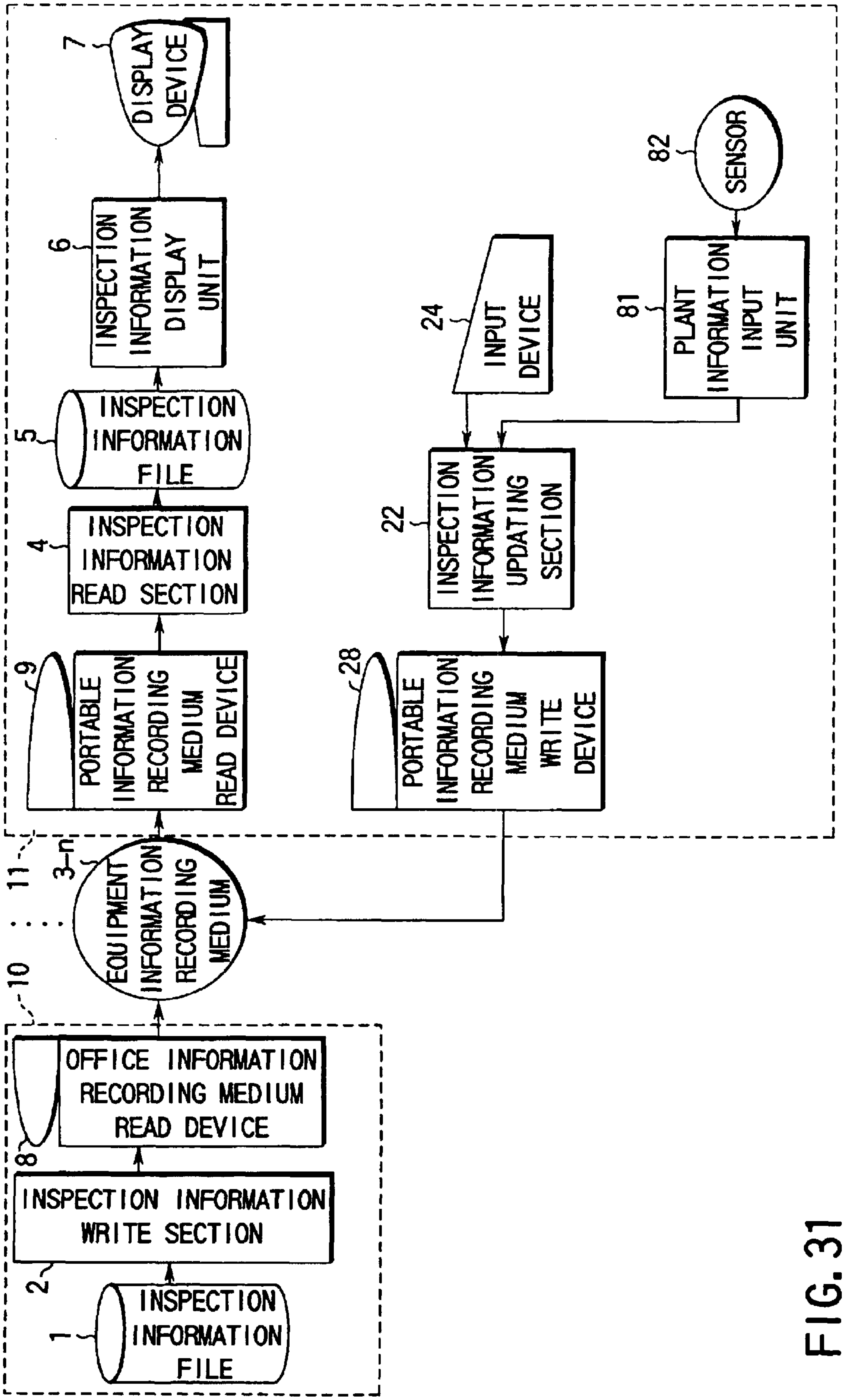
FIG. 31 is a block diagram showing a maintenance/inspection support apparatus according to the eighth embodiment of the present invention.

FIG. 31 is a block diagram showing a maintenance/inspection support apparatus according to the eighth embodiment of the present invention. The same reference numerals as in FIG. 17 denote the same parts in FIG. 31, and a detailed description thereof will be omitted. Only different parts will be described below.

Referring to FIG. 31, the maintenance/inspection support apparatus of this embodiment additionally comprises a plant information input unit 81 and a sensor 82.

The sensor 82 measures process information such as the temperatures and pressures of a plant in which equipments are installed.

The plant information input unit 81 collects the process information obtained by the sensor 82 and supplies the latest process information to an inspection information updating unit 22.

The operation of the maintenance/inspection support apparatus of this embodiment will be described below.

The plant information input unit 81 periodically collects process information from the sensor 82. The plant information input unit 81 always monitors whether the collected process information is different from the previously collected process information.

If the collected process information is different from the previously collected process information, the collected process information is supplied to the inspection information updating unit 22. The inspection information updating unit 22 then writes the collected process information on an equipment information recording medium 3-n using a portable information recording medium write device 28.

Note that the process information is not only obtained from the sensor 82, but also obtained via a LAN or the like from a data logger computer for monitoring and managing the process information.

As described above, according to the maintenance/inspection support apparatus of this embodiment, a user himself need not input inspection information, so that inspection information can be more efficiently and accurately updated. As a result, work reliability can be improved.

The maintenance and inspection of the equipment under operation will not be performed to improve work reliability because the current process information is provided.

In this embodiment, the portable information recording medium write device 28 need not be portable but can be fixed on the equipment side. When a plurality of equipments are to be installed in a relatively narrow space, these equipments may share the portable information recording medium write device 28.

The function of always monitoring the process information need not be provided. Process information periodically collected may be updated recorded every time the information is collected. When the updated and recorded process information is received by a computer, process information can be collected without using data collection lines.

<Ninth Embodiment>

Figure 32:
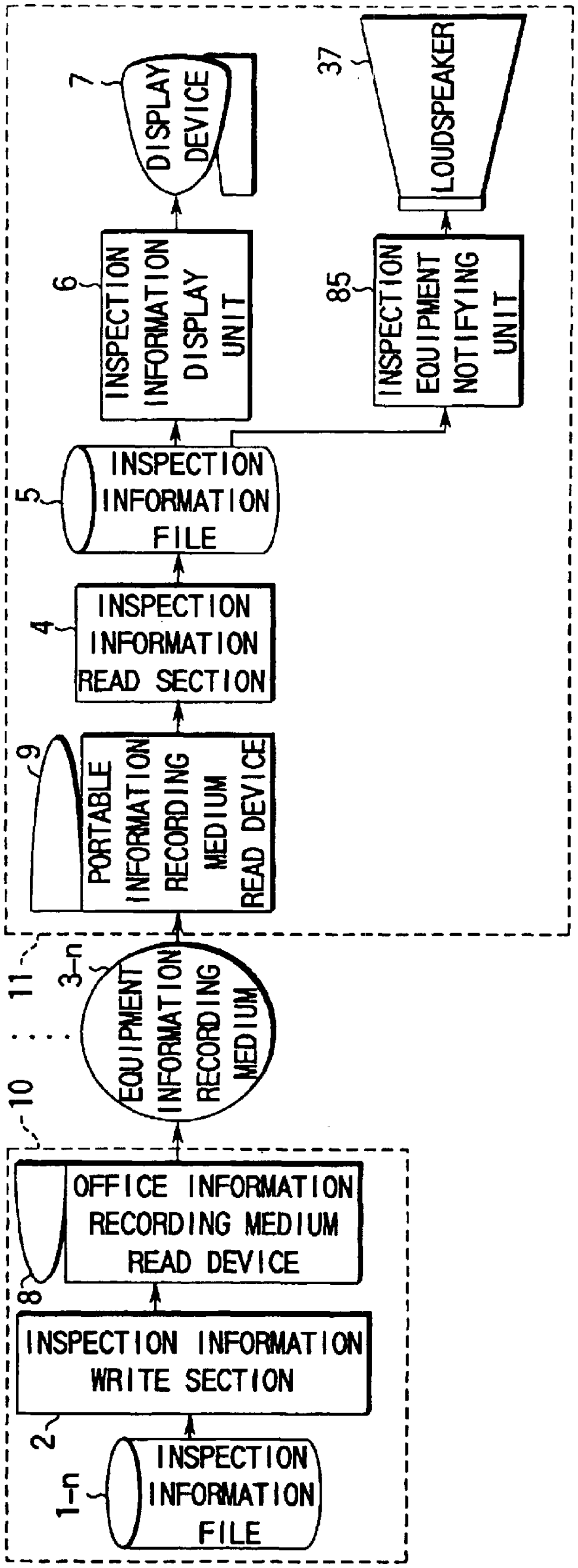
FIG. 32 is a block diagram showing a maintenance/inspection support apparatus according to the ninth embodiment of the present invention.

FIG. 32 is a block diagram of a maintenance/inspection support apparatus according to the ninth embodiment of the present invention. The same reference numerals as in FIG. 9 denote the same parts in FIG. 32, and a detailed description thereof will be omitted. Only different parts will be described below.

As shown in FIG. 32, the maintenance/inspection support apparatus of this embodiment comprises an inspection equipment notifying unit 85 and a notification device as a loudspeaker 37 in addition to the components of the maintenance/inspection support apparatus shown in FIG. 9.

According to the maintenance/inspection support apparatus of this embodiment, the inspection equipment notifying unit 85 refers to the inspection cycle and inspection record of each equipment which are stored in advance in an inspection information file 5. The inspection equipment notifying unit 85 determines this equipment as an inspection scheduled equipment when the date and time at the time of one-site patrol exceed the scheduled inspection date and time. The scheduled inspection date and time are the date and time obtained by adding the inspection cycle to the previous inspection date and time.

When the inspection equipment notifying unit 85 determines the scheduled inspection, the loudspeaker 37 generates an alarm to the worker so as to practice inspection of the equipment determined to be scheduled for inspection.

As described above, since the equipment to be inspected causes alarm generation, the worker need not confirm the inspection equipment by referring to the inspection information of the equipment to be inspected. The worker will not forget inspecting an equipment to be inspected or inspect an equipment not to be inspected.

As a result, a maintenance/inspection support apparatus, which can improve work efficiency and work reliability, can be provided.

<10th Embodiment>

Figure 33:
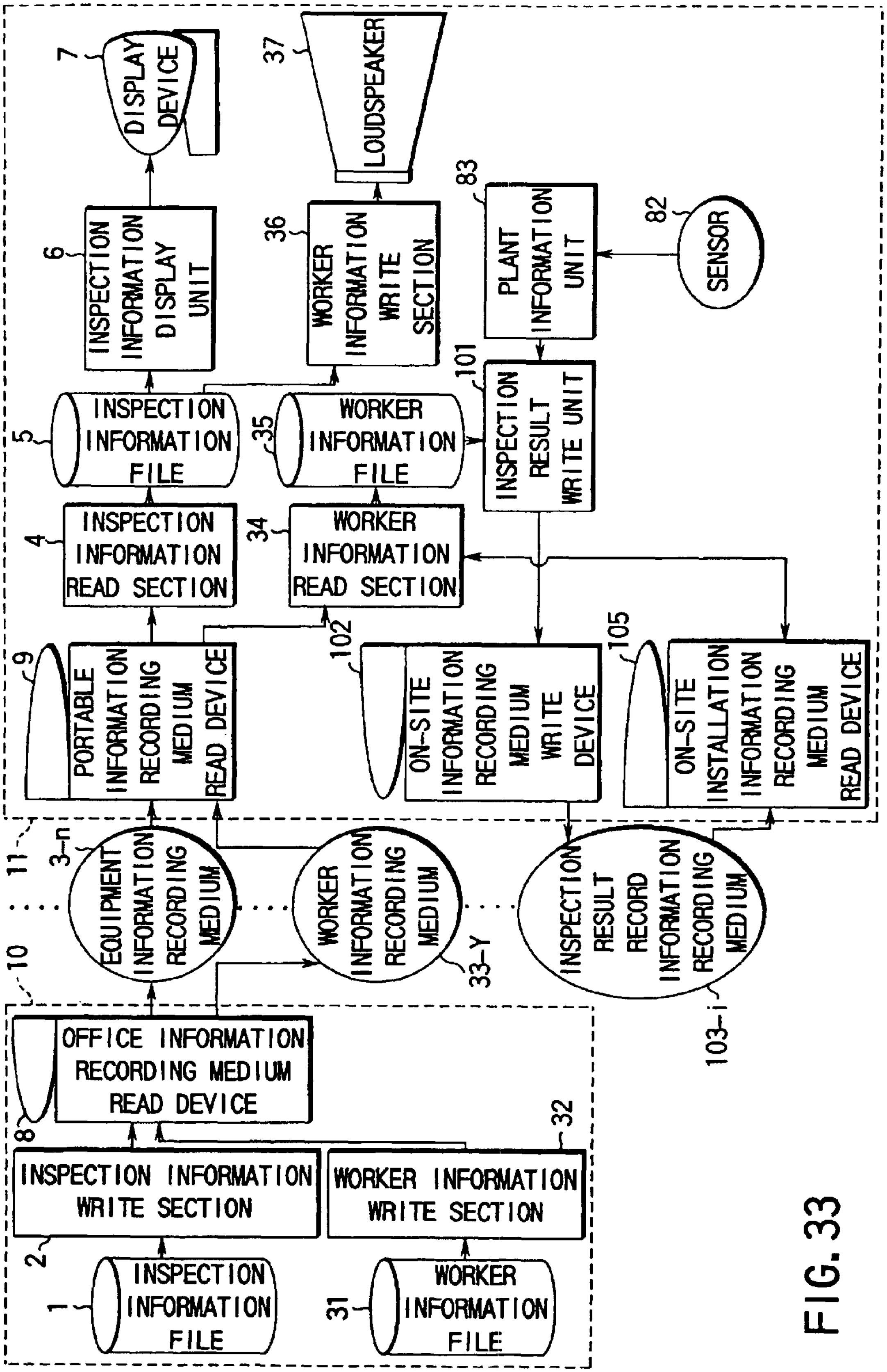
FIG. 33 is a block diagram showing a maintenance/inspection support apparatus according to the 10th embodiment of the present invention.

FIG. 33 is a block diagram showing a maintenance/inspection support apparatus according to the 10th embodiment of the present invention. The same reference numerals as in FIGS. 19 and 31 denote the same parts in FIG. 33, and a detailed description thereof will be omitted. Only different parts will be described below.

The maintenance/inspection support apparatus of this embodiment additionally comprises an on-site installation information medium read device 105, a sensor 82, a plant information unit 83, an inspection result write unit 101, an on-site installation information recording medium write device 102 in addition to the components of the maintenance/inspection support apparatus of the third embodiment.

An inspection result record information recording medium 103-i is arranged on an on-site equipment. The worker takes it to an office at the time of inspection patrol and used to collect inspection results such as the recorded process data at the office.

The on-site installation information recording medium read device 105 is always installed on the site and used by a worker information read section 34, thereby reading the inspection result information recorded on the inspection result record information recording medium 103-i.

The inspection result write unit 101 writes the inspection result on the inspection result resulting information recording medium 103-i using the on-site installation information recording medium write device 102 in a noncontact manner.

With the above arrangement, the inspection result write unit 101 writes, in a noncontact manner, the plant information periodically collected by the plant information unit 83 and the worker information stored in a worker information file 35-m on the inspection result record information recording medium 103-i using the on-site information recording medium write device 102.

The inspection result record information recording medium 103-i is collected from each one-site equipment at the time of on-site patrol and taken to the office. The data from the media 103-i are simultaneously read using a portable information recording medium read device 9 at the office, thereby collecting the data. Therefore, a report or the like can be readily made at the office.

The inspection recording information recording media 103-i in the form of a card are numbered to prevent the worker from forgetting removing them. At this time, the worker need not pay attention to the inspection results, but to whether he has collected all the cards with reference to the card numbers, thereby reducing the load from the worker. When two inspection recording information recording media 103-i are prepared for each equipment, efficiency can be further improved, and work errors can be prevented.

Since only short-time operation of replacing the old inspection recording information recording media 103-i with new ones is required, the load on the worker in the inspection work in the dangerous area can be reduced.

In this maintenance/inspection support apparatus, the worker need not bring any portable information recording medium read device to the site at the time of inspection. Inspection efficiency does not deteriorate even when a power supply for the portable information recording medium read device cannot be assured or conveyance of an equipment like in a radiation management area is limited.

The worker can be free from always carrying the portable information recording medium read device although it is not heavy. The worker need not operate such a device at the time of inspection, and the large load on the worker can be reduced.

There can be provided a maintenance/inspection support apparatus which allows the worker not to carry the portable information recording medium read device in the severe inspection environment, and can omit cumbersome operation to reduce the load on the worker, prevent operation errors, and improve work efficiency and work reliability.

The above embodiment has exemplified the application to maintenance and inspection in a power plant or the like. The present invention, however, is not limited to this application field, but is applicable to an industrial plant such as a chemical plant and an ironwork, and a maintenance/inspection system for automobiles and ships.

The above embodiments can be variously combined in accordance with the system scale and applications of the maintenance/inspection apparatuses, thereby constructing a more flexible system.

For example, the plurality of on-site installation information recording medium write devices 102 and the plurality of on-site information recording medium read devices 105 are installed on the site. When a read/write distance range is exceeded, they serve as relay stations, or pieces of information of the respective information recording media can be summed.

<11th Embodiment>

Figure 34:
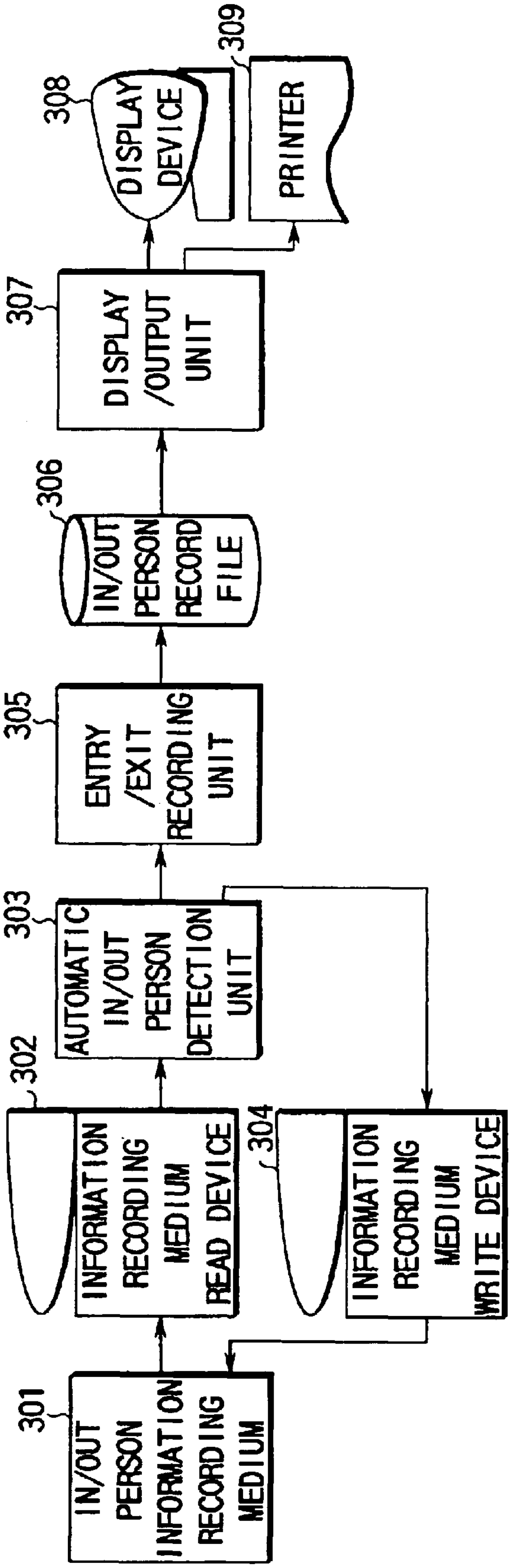
FIG. 34 is a block diagram showing an entry/exit management apparatus according to the 11th embodiment of the present invention.

FIG. 34 is a block diagram showing an entry/exit management apparatus according to the 11th embodiment of the present invention.

An in/out person information recording medium 301 is a memory medium which requires no power supply and can read/write access to entry/exit information of an in and out persons in a noncontact manner using radio waves or infrared rays. Examples of this recording medium is a radio frequency tag and an IC card.

Figure 35:
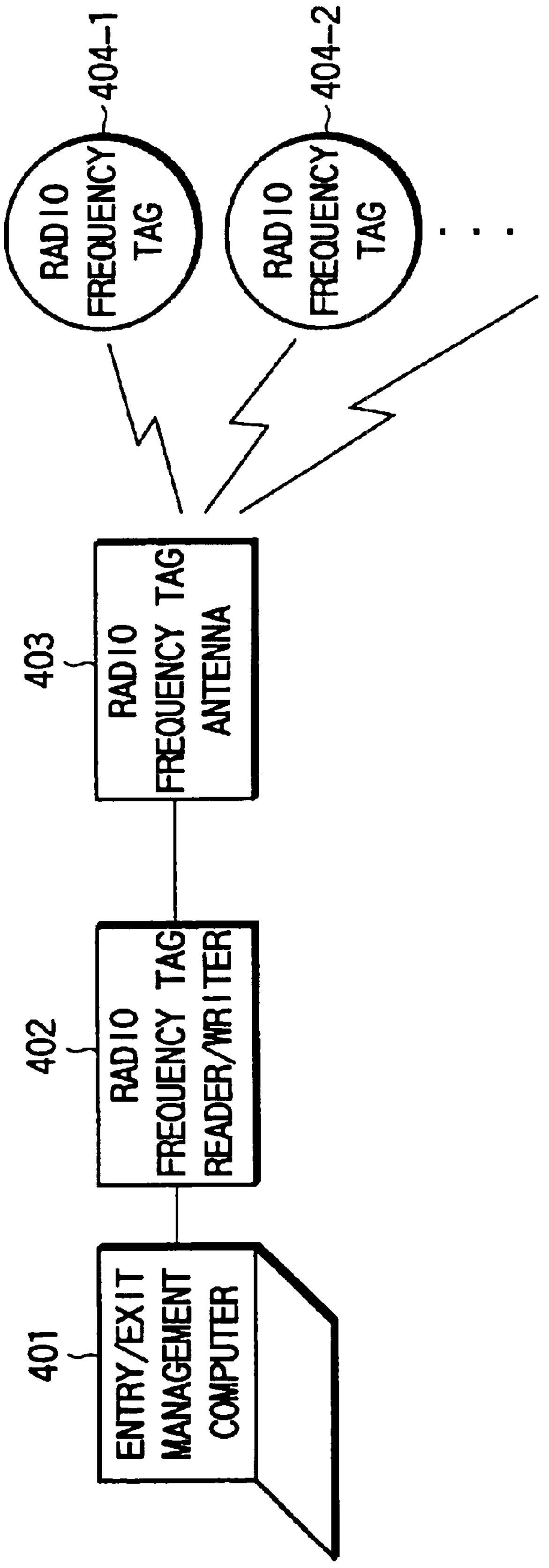
FIG. 35 is a view showing hardware of an entry/exit management apparatus using radio frequency tags.

FIG. 35 is a view showing hardware of an entry/exit management apparatus using radio frequency tags.

As shown in FIG. 35, the entry/exit management apparatus comprises an entry/exit management computer 401, a radio frequency tag reader/writer 402, a radio frequency tag antenna 403, and radio frequency tags (in/out person information recording media) 404.

The radio frequency tag reader/writer 402 has a large number of hardware components shared by an information recording medium write device 304 and an information recording medium read device 302 and constitutes the devices 304 and 302 as an integral unit. The radio frequency tag reader/writer 402 performs read/write access to the information recording media (radio frequency tags) via the radio frequency tag antenna 403. Note that the radio frequency tag reader/writer 402, the radio frequency tag antenna 403, and the radio frequency tags 404 can have arbitrary shapes in accordance with application purposes.

For example, the radio frequency tag reader/writer 402 can be incorporated in the portable personal computer in the form of an interface card, or can be installed on the site and connected to a portable personal computer via a radio frequency LAN.

The radio frequency tag antenna 403 may be fixed or installed on an on-site ceiling or gate or used as a portable antenna mounted on the entry/exit management computer 401. The information recording medium (radio frequency tag) conventionally has the same shape in the form of a card as in the conventional case.

Referring to FIG. 34, an automatic in/out person detection unit 303 detects entry of an in/out person, and reads entry/exit information from the in/out person information recording medium 301 using the information recording medium read device 302 in a noncontact manner using radio waves or infrared rays. When the entry/exit information has an entry record, the automatic in/out person detection unit 303 determines exit. When the entry/exit information has an exit record, the unit 303 determines entry.

The automatic in/out person detection unit 303 adds entry/exit type information and entry/exit time information to the in/out person information from the in/out person information recording medium 301 and supplies the result information to an entry/exit recording unit 305. The entry/exit recording unit 305 stores, in an in/out person record file 306, the in/out person information added with the entry/exit type information and supplied from the automatic in/out person detection unit 303.

The automatic in/out person detection unit 303 updates the entry/exit information of the in/out person information recording medium 301 using the information recording medium write device 304.

A display/output unit 307 outputs the in/out person information added with the entry/exit type information and stored in the in/out person record file 306 to a display device 308 and a printer 309.

The operation of the entry/exit management apparatus of this embodiment will be described with reference to the flow chart in FIG. 36.

When it is detected that an in/out person comes close to a gate, the automatic in/out person detection unit 303 reads entry/exit information from the in/out person information recording medium 301 by the information recording medium read device 302 in a noncontact manner using radio waves or infrared rays (step 501).

Figure 37:
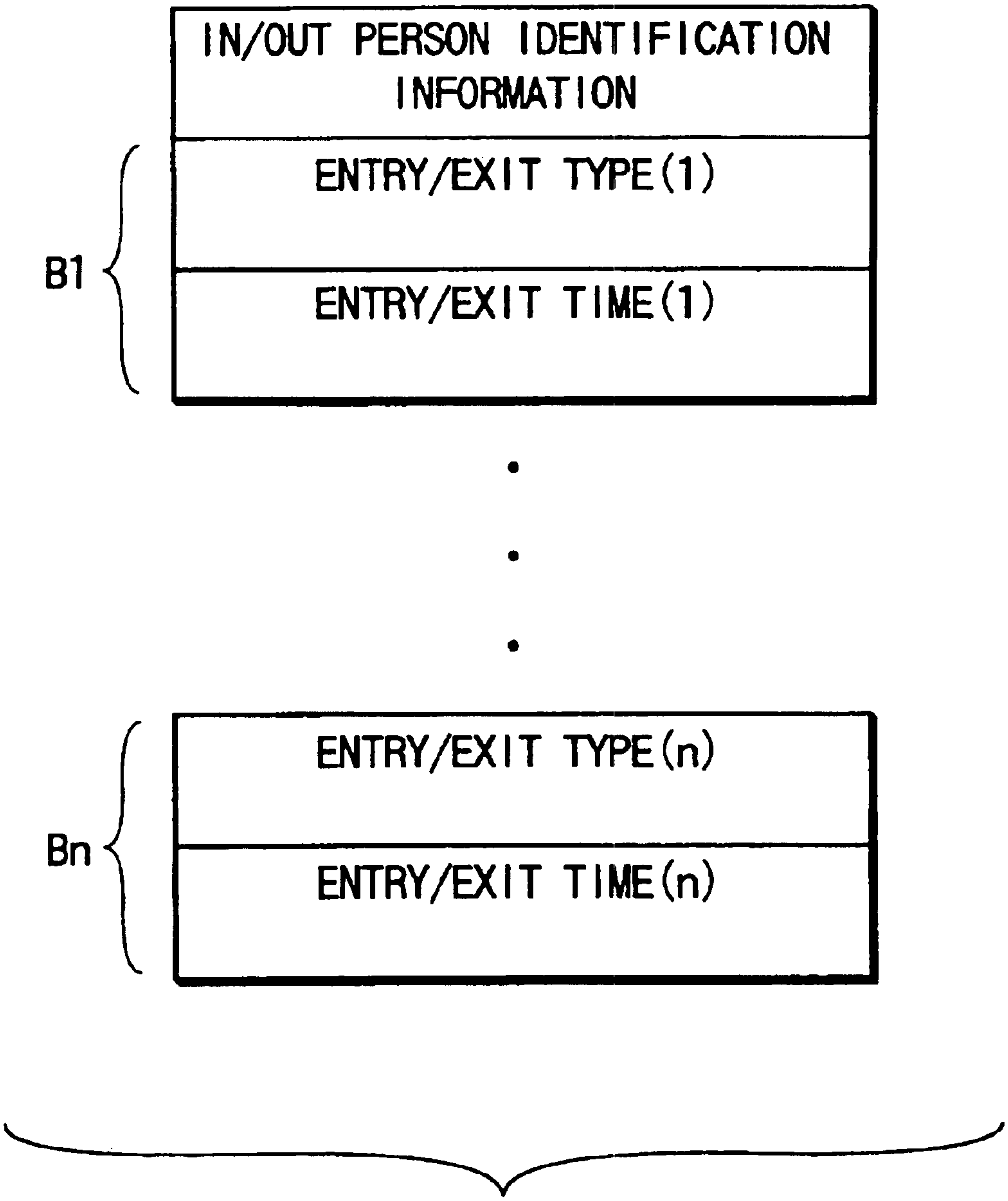
FIG. 37 is a view showing entry/exit information stored on an in/out person information recording medium.

FIG. 37 shows entry/exit information stored on the in/out person information recording medium.

The in/out person information recording medium 301 has memory areas B in which in/out person identification information representing an in/out person and information at the time of entry/exit are written. This memory area B represents entry/exit type and entry/exit time.

Referring to FIG. 37, the in/out person identification information is an employee number or the like which specifies an in person. The entry/exit type indicates entry or exit, and the entry/exit time indicates time in entry/exit.

When in/out identification information cannot be read, it is determined that no in/out person is present, and in/out person identification information is repeatedly read (steps 501 and 502). When the in/out person identification information can be read, the presence of an in/out person is determined, and the entry/exit type is then determined (step 503).

More specifically, when the latest entry/exit type indicates an exit record, entry is determined. When the latest entry/exit type indicates an entry record, exit is determined. Unnatural determination such as different date and time is made as an error, and an error process such as alarm generation is performed (step 508).

When entry is determined in the above determination step, time information is extracted from a timepiece module or the like, and entry/exit type and entry time are added to the in person identification information (step 504). The resultant information is notified as entry record information to the entry/exit recording unit 305 (step 505).

When exit is determined in the above determination step, time information is extracted from the timepiece module or the like, and entry/exit type and exit time are added to the out person identification information (step 506). The resultant information is notified as exit record information to the entry/exit recording unit 305 (step 507).

The entry record information and the exit record information are written on the in/out person information recording medium 301 using the information recording medium write device 304 (step 509).

According to the entry/exit management apparatus of this embodiment, therefore, entry/exit management, which has been manually performed in the conventional case, can be electronically performed, thereby preventing operation errors in entry/exit selection and input errors such as unfilled input columns.

<12th Embodiment>

Figure 38:
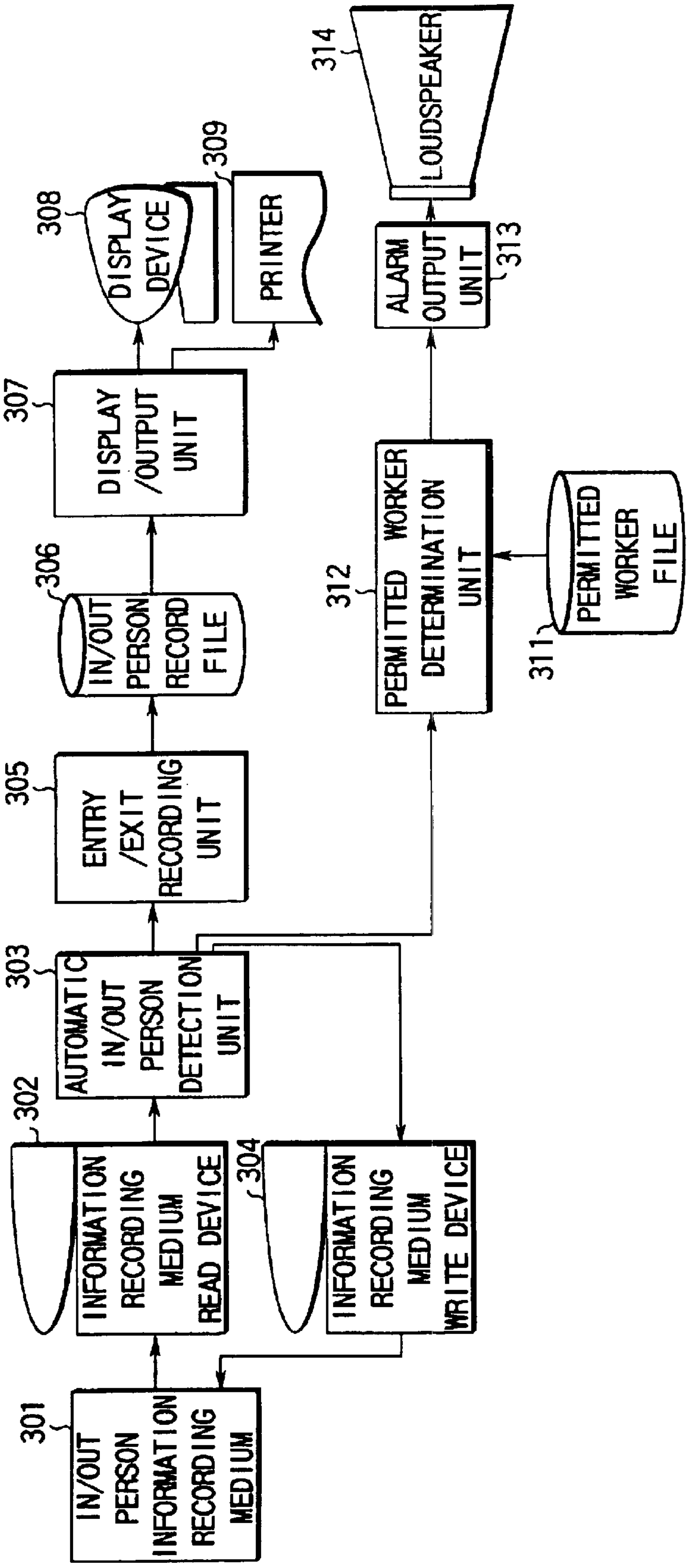
FIG. 38 is a block diagram showing an entry/exit management apparatus according to the 12th embodiment of the present invention.

FIG. 38 is a block diagram showing an entry/exit management apparatus according to the 12th embodiment of the present invention. The same reference numerals as in FIG. 34 denote the same parts in FIG. 34, and a detailed description thereof will be omitted. Only different parts will be described below.

The entry/exit management apparatus of this embodiment additionally comprises a permitted worker file 311, a permitted worker determination unit 312, an alarm output unit 313, and a loudspeaker 314 in addition to the components of the entry/exit management apparatus of the 11th embodiment.

The permitted worker file 311 stores information representing the worker attributes such as an identification number, company name, and name of the worker permitted in advance to enter/leave.

The permitted worker determination unit 312 compares entry/exit information read by an information recording medium read device 302 and notified from an automatic in/out person detection unit 303 with the worker attribute information stored in the permitted worker file 311 to determine whether an in/out person is a person permitted to enter/leave.

When the permitted worker determination unit 312 determines that the in/out person is not permitted to enter/leave, the unit 312 notifies the alarm output unit 313 of this. Upon reception of the notification representing that the in/out person is not permitted to enter/leave from the permitted worker determination unit 312, the loudspeaker 314 generates an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether an in/out person is permitted to enter/leave is automatically determined. The entry/exit of an unauthorized worker due to an oversight can be prevented, thereby more reliably assuring security.

<13th Embodiment>

Figure 39:
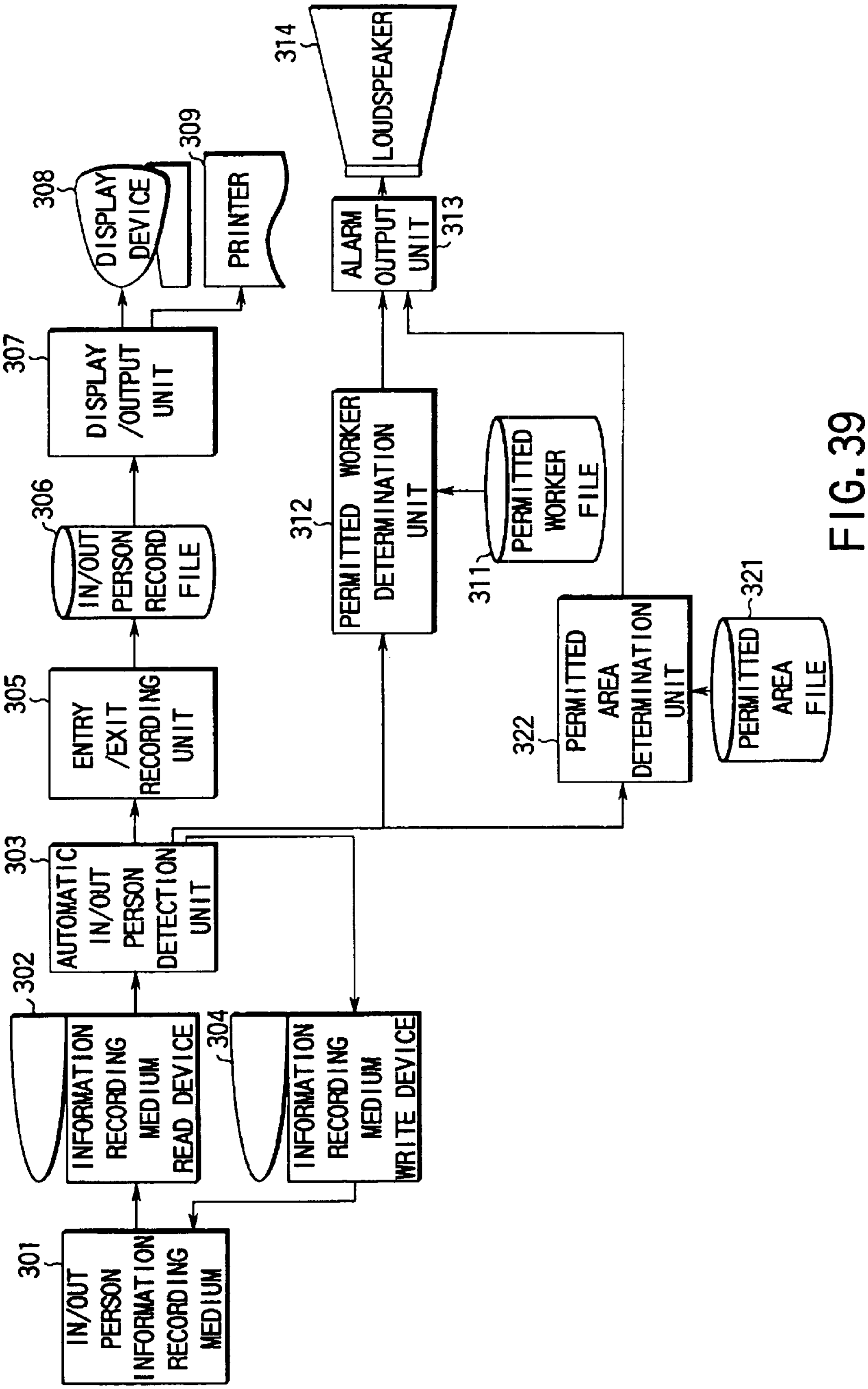
FIG. 39 is a block diagram showing an entry/exit management apparatus according to the 13th embodiment of the present invention.

FIG. 39 is a block diagram showing an entry/exit management apparatus according to the 13th embodiment of the present invention. The same reference numerals as in FIG. 38 denote the same parts in FIG. 39, and a detailed description thereof will be omitted. Only different parts will be described below.

The entry/exit management apparatus of this embodiment additionally comprises a permitted area file 321 and a permitted area determination unit 322 in addition to the components of the entry/exit management apparatus of the 12th embodiment.

The permitted area file 321 stores information representing the identification number, area number, and the like of a permitted or authorized worker.

The permitted area determination unit 322 compares the entry/exit information read by an information recording medium read device 302 and notified from an automatic in/out person detection unit 303 with the information stored in the permitted area file 321 to determine whether the in/out person is permitted to enter/leave.

When the permitted area determination unit 322 determines that the in/out person is not permitted to enter/leave, an alarm output unit 313 is notified of this. Upon reception of the notification that the in/out person is not permitted to enter/leave from the permitted area determination unit 322, the alarm output unit 313 causes a loudspeaker 314 to generate an alarm.

More specifically, when one of the permitted worker determination unit 312 and the permitted area determination unit 322 determines that the in/out person is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether an in/out person is permitted to enter/leave is automatically determined. The entry/exit of an unauthorized worker due to an oversight can be prevented, thereby more reliably assuring security.

<14th Embodiment>

Figure 40:
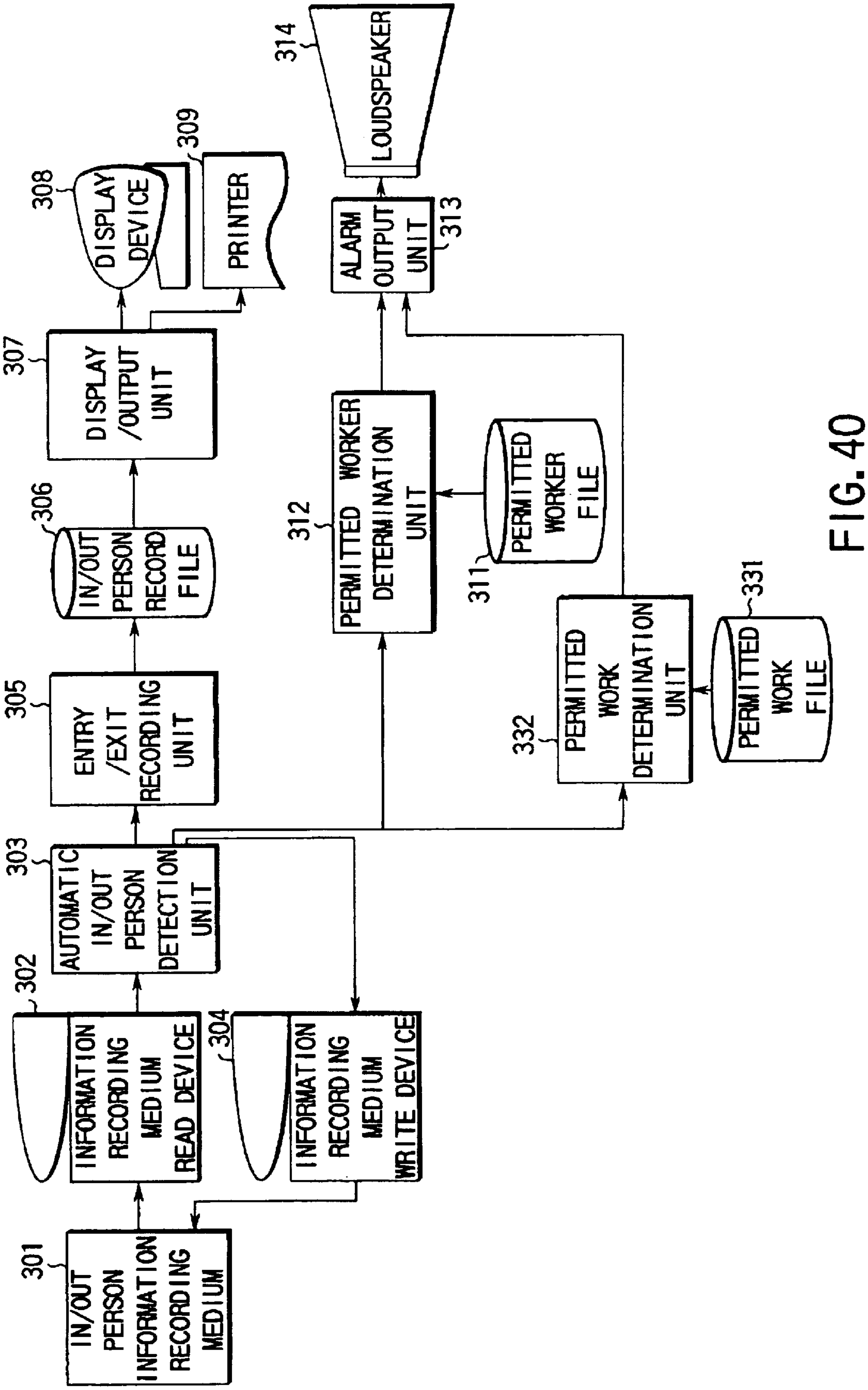
FIG. 40 is a block diagram showing an entry/exit management apparatus according to the 14th embodiment of the present invention.

FIG. 40 is a block diagram showing an entry/exit management apparatus according to the 14th embodiment of the present invention. The same reference numerals as in FIG. 38 denote the same parts in FIG. 40, and a detailed description thereof will be omitted. Only different parts will be described below.

The entry/exit management apparatus of this embodiment additionally comprises a permitted work file 331 and a permitted work determination unit 332 in addition to the components of the entry/exit management apparatus of the 12th embodiment.

The permitted work file 331 stores information representing the identification number, work name, and the like of an authorized worker.

The permitted area determination unit 322 compares the entry/exit information read by an information recording medium read device 302 and notified from an automatic in/out person detection unit 303 with the information stored in the permitted work file 331 to determine whether an in/out person is permitted to enter/leave.

When the permitted work determination unit 332 determines that the in/out person is not permitted to enter/leave, an alarm output unit 313 is notified of this. Upon reception of the notification that the in/out person is not permitted to enter/leave from the permitted worker determination unit 332, the alarm output unit 313 causes a loudspeaker 314 to generate an alarm.

More specifically, when one of permitted worker determination unit 312 and the permitted period determination unit 342 determines that the in/out person is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the work is permitted to an in/out person is automatically determined. The entry/exit of an unauthorized worker due to an oversight can be prevented, thereby more reliably assuring security.

<15th Embodiment>

Figure 41:
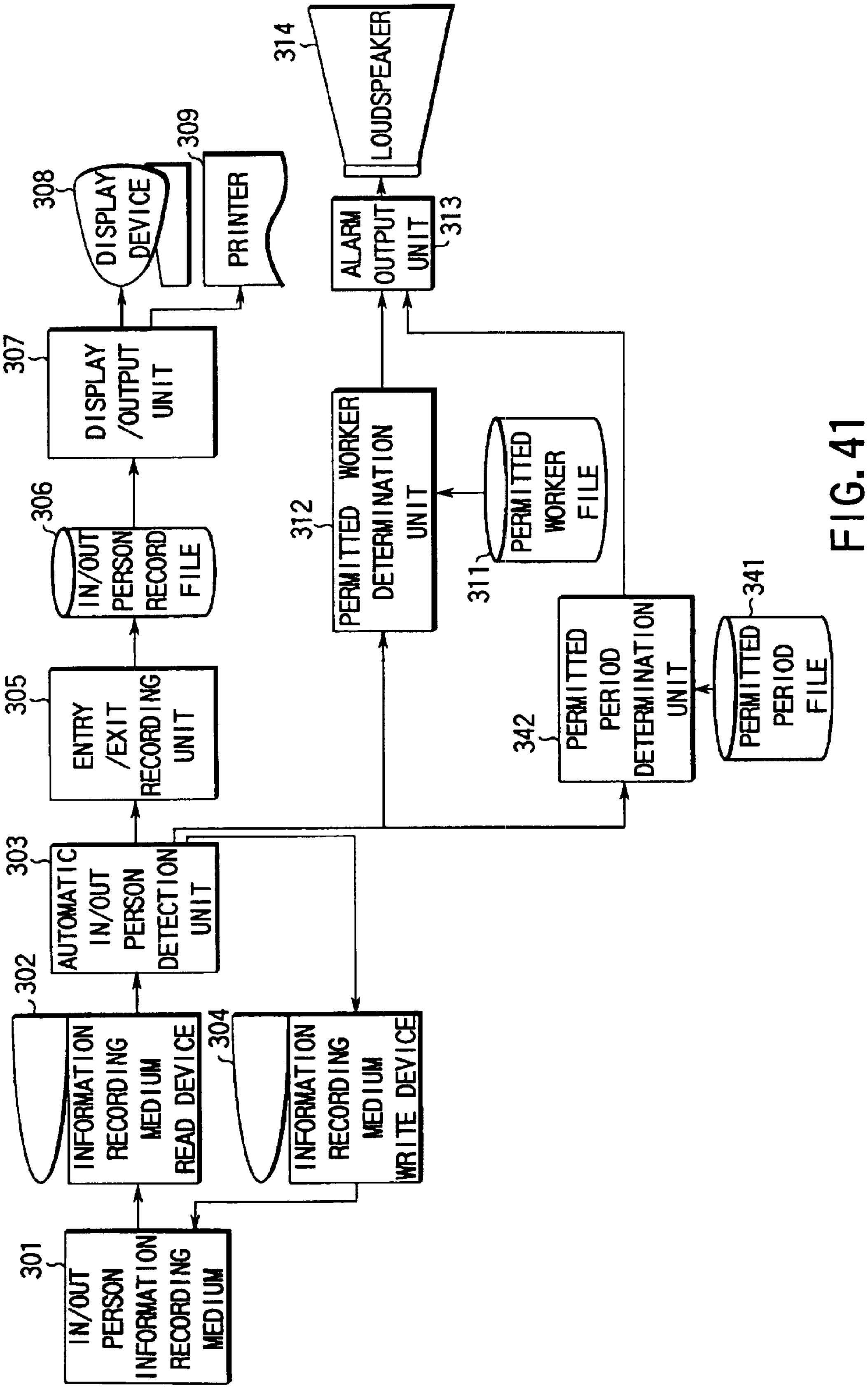
FIG. 41 is a block diagram showing an entry/exit management apparatus according to the 15th embodiment of the present invention.

FIG. 41 is a block diagram showing an entry/exit management apparatus according to the 15th embodiment of the present invention. The same reference numerals as in FIG. 38 denote the same parts in FIG. 41, and a detailed description thereof will be omitted. Only different parts will be described below.

The entry/exit management apparatus of this embodiment additionally comprises a permitted period file 341 and a permitted period determination unit 342 in addition to the components of the entry/exit management apparatus of the 12th embodiment.

The permitted period file 341 stores information representing the identification number, permitted period, and the like of the authorized worker.

The permitted period determination unit 342 compares the entry/exit information read by an information recording medium read device 302 and notified to an automatic in/out person detection unit 303 with the information stored in the permitted period file 341 to determine whether an in/out person is permitted to enter/leave.

When the permitted period determination unit 342 determines that the in/out person is not permitted to enter/leave, an alarm output unit 313 is notified of this. Upon reception of the notification that the in/out person is not permitted to enter/leave from the permitted period determination unit 342, the alarm output unit 313 causes a loudspeaker 314 to generate an alarm.

More specifically, when one of the permitted worker determination unit 312 and the permitted period determination unit 342 determines that the in/out person is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether a period is permitted to an in/out person is automatically determined. The entry/exit of an unauthorized worker due to an oversight can be prevented, thereby more reliably assuring security.

<16th Embodiment>

Figure 42:
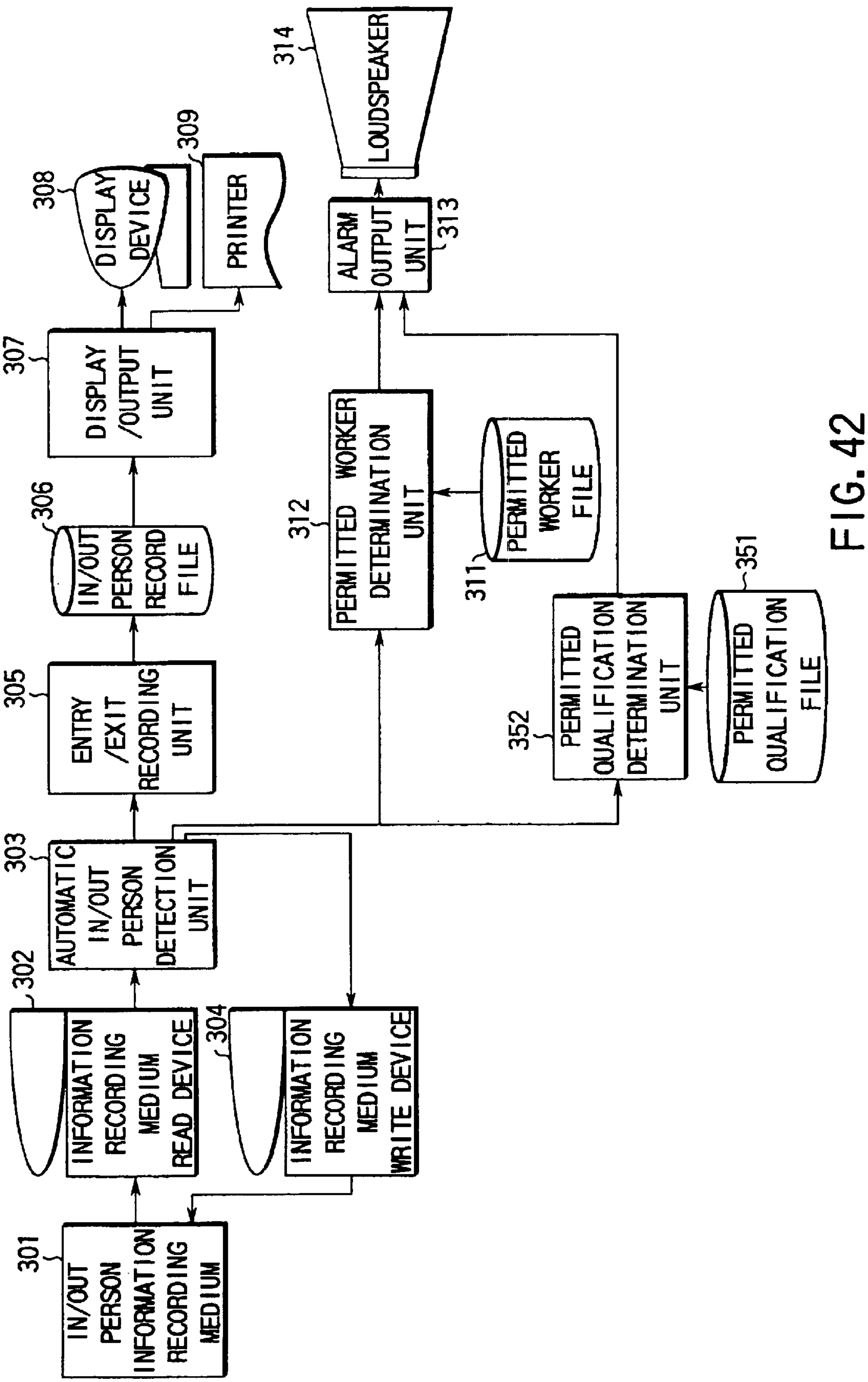
FIG. 42 is a block diagram showing an entry/exit management apparatus according to the 16th embodiment of the present invention.

FIG. 42 is a block diagram showing an entry/exit management apparatus according to the 16th embodiment of the present invention. The same reference numerals as in FIG. 38 denote the same parts in FIG. 42, and a detailed description thereof will be omitted. Only different parts will be described below.

The entry/exit management apparatus of this embodiment additionally comprises a permitted qualification file 351 and a permitted qualification determination unit 352 in addition to the components of the entry/exit management apparatus of the 12th embodiment.

The permitted qualification file 351 stores information representing the identification number, permitted qualification, and the like of the worker permitted in advance in units of monitor areas.

The permitted qualification determination unit 352 compares the entry/exit information read by an information recording medium read device 302 and notified from an automatic in/out person detection unit 303 with the information stored in the permitted qualification file 351 to determine whether an in/out person is a qualified worker.

When the permitted qualification determination unit 352 determines that the in/out person is not the qualified worker, an alarm output unit 313 is notified of this. Upon reception of the notification that the in/out person is not the qualified worker from the permitted qualification determination unit 352, the alarm output unit 313 causes a loudspeaker 314 to generate an alarm.

More specifically, when one of a permitted worker determination unit 312 and the permitted qualification determination unit 352 determines that the in/out person is not the qualified worker, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the in/out person is the qualified worker is automatically determined. The entry/exit of an unauthorized worker due to an oversight can be prevented, thereby more reliably assuring security.

<17th Embodiment>

Figure 43:
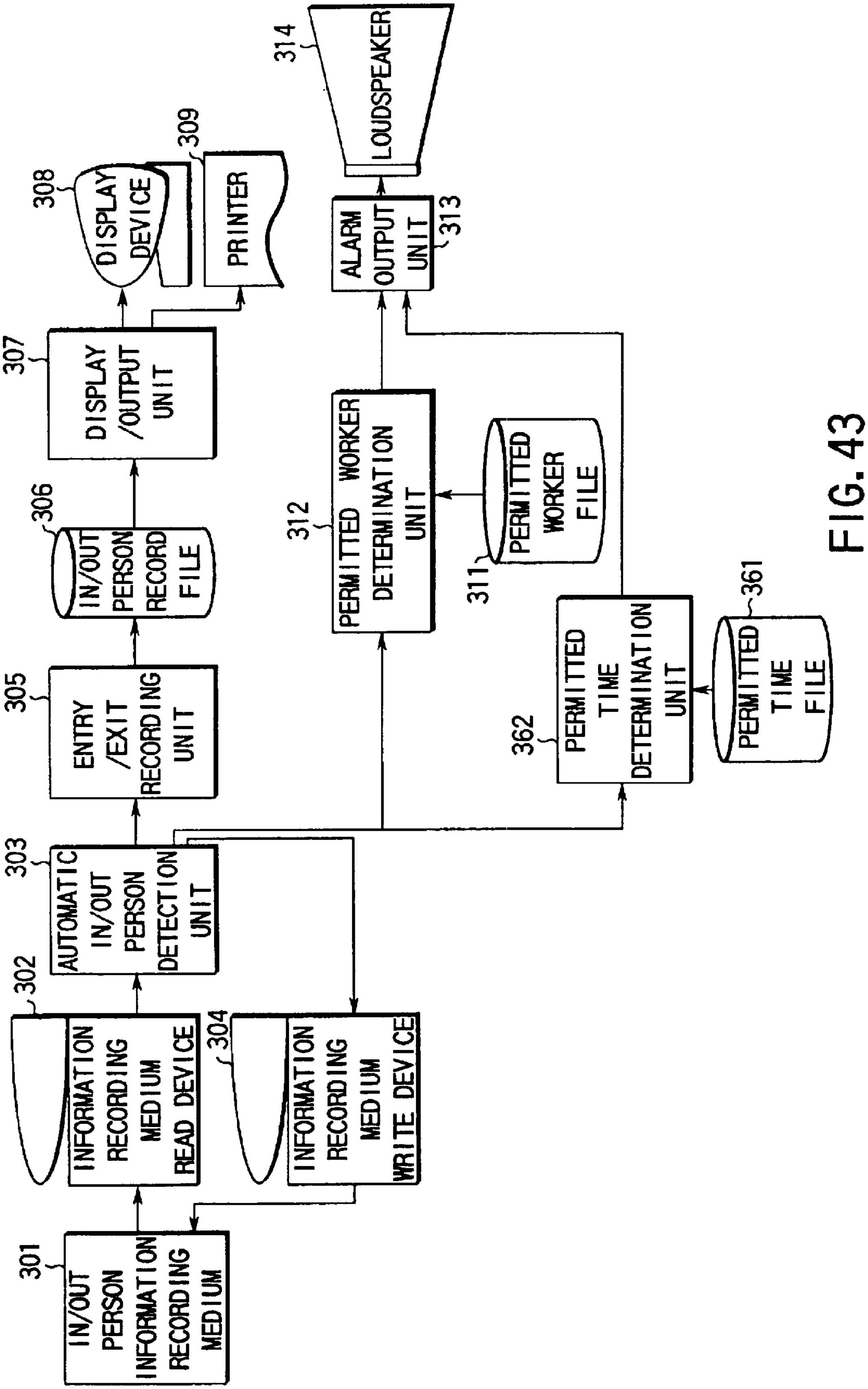
FIG. 43 is a block diagram showing an entry/exit management apparatus according to the 17th embodiment of the present invention.

FIG. 43 is a block diagram showing an entry/exit management apparatus according to the 17th embodiment of the present invention. The same reference numerals as in FIG. 38 denote the same parts in FIG. 43, and a detailed description thereof will be omitted. Only different parts will be described below.

The entry/exit management apparatus of this embodiment additionally comprises a permitted time file 361 and a permitted time determination unit 362 in addition to the components of the entry/exit management apparatus of the 12th embodiment.

The permitted time file 361 stores information representing the identification number, permitted time, and the like of a worker permitted in advance.

The permitted time determination unit 362 compares the entry/exit information read by an information recording medium read device 302 and notified from an automatic in/out person detection unit 303 with the information stored in the permitted time file 361 to determine whether the in/out person is permitted to enter or exit.

When the permitted time determination unit 362 determines that the in/out person is not permitted to enter/leave, an alarm output unit 313 is notified of this. Upon reception of the notification that the in/out person is not permitted to enter/leave from the permitted time determination unit 362, the alarm output unit 313 causes a loudspeaker 314 to generate an alarm.

More specifically, when one of the permitted worker determination unit 312 and the permitted time determination unit 362 determines that the in/out person is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the in/out person is a qualified worker is automatically determined. The entry/exit of an unauthorized worker due to an oversight can be prevented, thereby more reliably assuring security.

<18th Embodiment>

Figure 44:
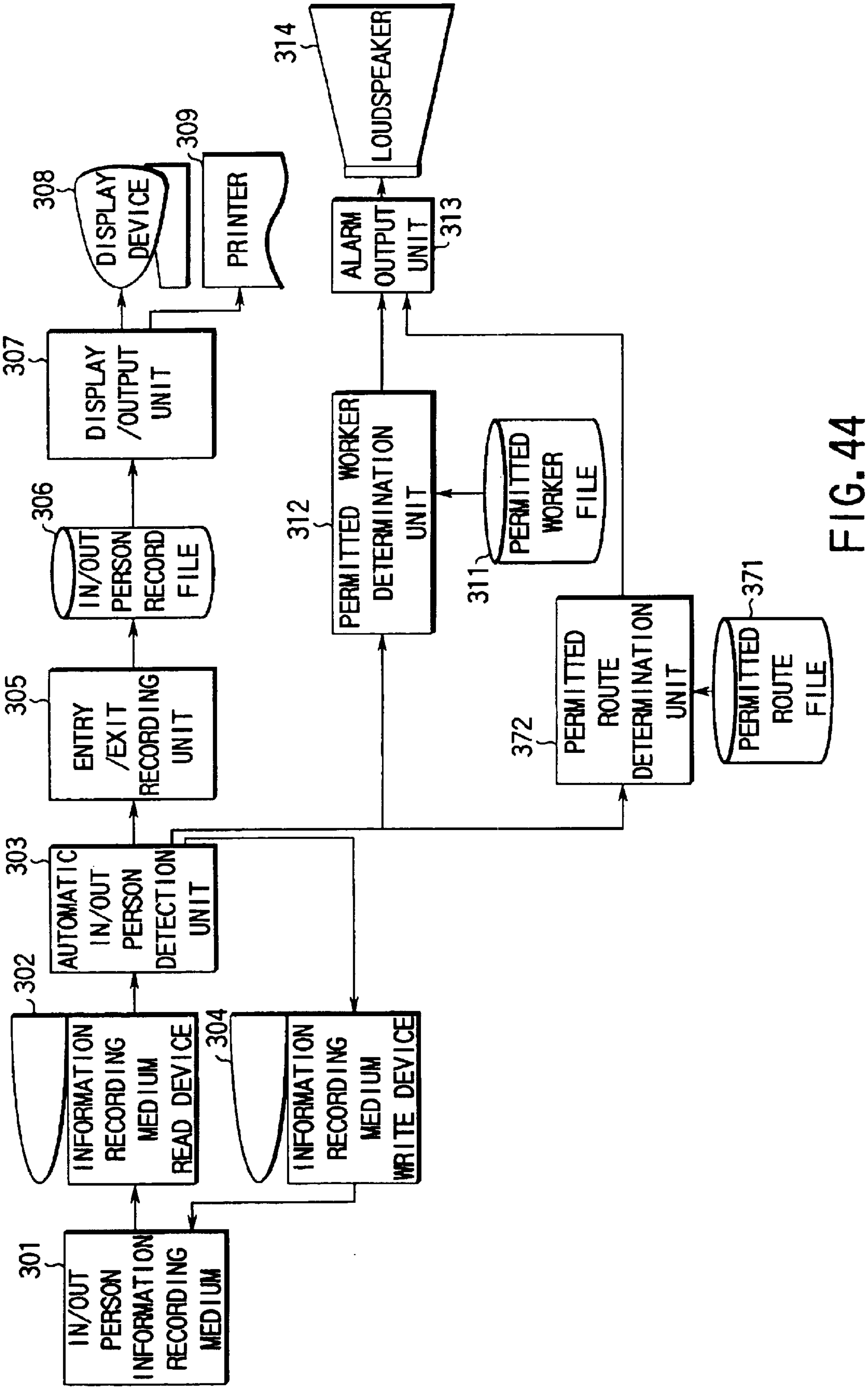
FIG. 44 is a block diagram showing an entry/exit management apparatus according to the 18th embodiment of the present invention.

FIG. 44 is a block diagram showing an entry/exit management apparatus according to the 18th embodiment of the present invention. The same reference numerals as in FIG. 38 denote the same parts in FIG. 44, and a detailed description thereof will be omitted. Only different parts will be described below.

The entry/exit management apparatus of this embodiment additionally comprises a permitted route file 371 and a permitted route determination unit 372 in addition to the components of the entry/exit management apparatus of the 12th embodiment.

The permitted route file 371 stores information representing the identification number, permitted route, and the like of a worker permitted in advance.

The permitted route determination unit 372 compares the entry/exit information read by an information recording medium read device 302 and notified from an automatic in/out person detection unit 303 with the information stored in the permitted route file 371 to determine whether an in/out person is permitted to enter/leave.

When the permitted route determination unit 372 determines that the in/out person is not permitted to enter/leave, an alarm output unit 313 is notified of this. Upon reception of the notification that the in/out person is not permitted to enter/leave from the permitted route determination unit 372, the alarm output unit 313 causes a loudspeaker 314 to generate an alarm.

More specifically, when one of the permitted worker determination unit 312 and the permitted route determination unit 372 determines that the in/out person is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the in/out person is an authorized worker is automatically determined. The entry/exit of an unauthorized worker due to an oversight can be prevented, thereby more reliably assuring security.

<19th Embodiment>

Figure 45:
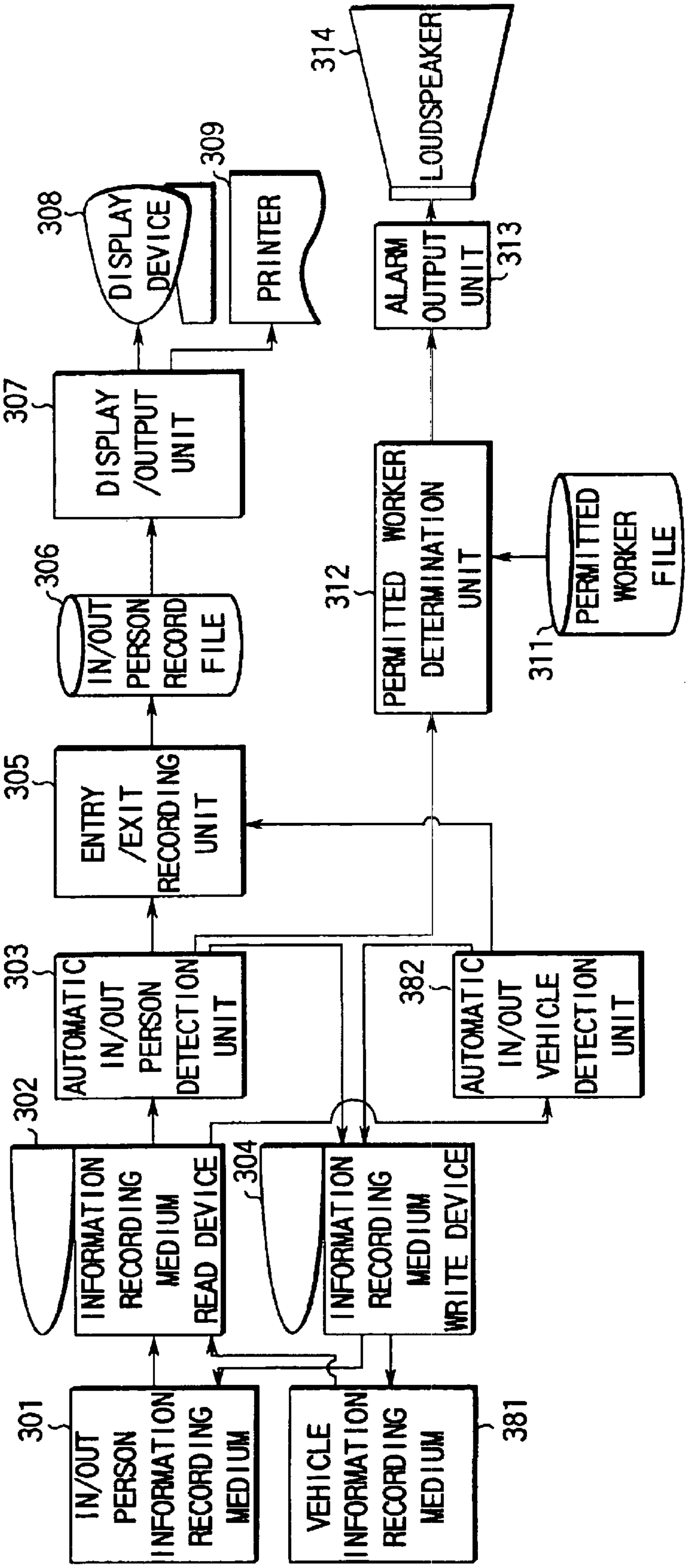
FIG. 45 is a block diagram showing an entry/exit management apparatus according to the 19th embodiment of the present invention.

FIG. 45 is a block diagram showing an entry/exit management apparatus according to the 19th embodiment of the present invention. The same reference numerals as in FIG. 38 denote the same parts in FIG. 44, and a detailed description thereof will be omitted. Only different parts will be described below.

The entry/exit management apparatus of this embodiment additionally comprises a vehicle information recording medium 381 and an automatic in/out vehicle detection unit 382 in addition to the components of the entry/exit management apparatus of the 12th embodiment.

The vehicle information recording medium 381 stores vehicle information having vehicle attribute information and vehicle entry/exit time information. The vehicle information recording medium 381 is a recording medium which requires no power supply and can perform read/write access in a noncontact manner using infrared rays or the like as in the in/out person information recording medium 301.

The automatic in/out vehicle detection unit 382 reads vehicle information from the vehicle information recording medium 381 using an information recording medium read device 302 in a noncontact manner. If this vehicle information has an entry record, the unit 382 determines exit. If the vehicle information has an exit record, the unit 382 determines entry.

The automatic in/out vehicle detection unit 382 adds entry/exit type information and entry/exit time information to the vehicle information read from the vehicle information recording medium 381 and supplies the resultant information to an entry/exit recording unit 305. The entry/exit recording unit 305 stores the vehicle information added with the entry/exit type information and notified from the automatic in/out vehicle detection unit 382 in an in/out person record file 306.

The automatic in/out vehicle detection unit 382 updates the vehicle information on the vehicle information recording medium 381 using an information recording medium write device 304.

The operation of the automatic in/out vehicle detection unit of the entry/exit management apparatus of this embodiment will be described below.

When an in vehicle is detected, the automatic in/out vehicle detection unit 382 reads the vehicle information from the vehicle information recording medium 381 by the information recording medium read device 302 in a noncontact manner using radio waves or infrared rays.

When the latest entry/exit type information has an exit record, the automatic in/out vehicle detection unit 382 determines the vehicle as an in vehicle. When the information has an entry record, the unit 382 determines the vehicle as an out vehicle. Unnatural determination such as different date and time is made as an error, and an error process such as alarm generation is performed.

When entry is determined in the above determination step, time information is extracted from a timepiece module or the like, and the entry/exit type information and the entry time information are added to the vehicle attribute information. The resultant information is notified as entry record information to the entry/exit recording unit 305.

When exit is determined in the above determination step, time information is extracted from a timepiece module or the like, and the entry/exit type information and the exit time information are added to the vehicle attribute information. The resultant information is notified as exit record information to the entry/exit recording unit 305.

Note that the entry record information and exit record information are written on the vehicle information recording medium 381 by the information recording medium write device 304.

According to this embodiment, therefore, a work for visually checking entry/exit is electronically managed. The entry/exit of an unauthorized vehicle due to an oversight can be prevented, thereby more reliably assuring security.

<20th Embodiment>

Figure 46:
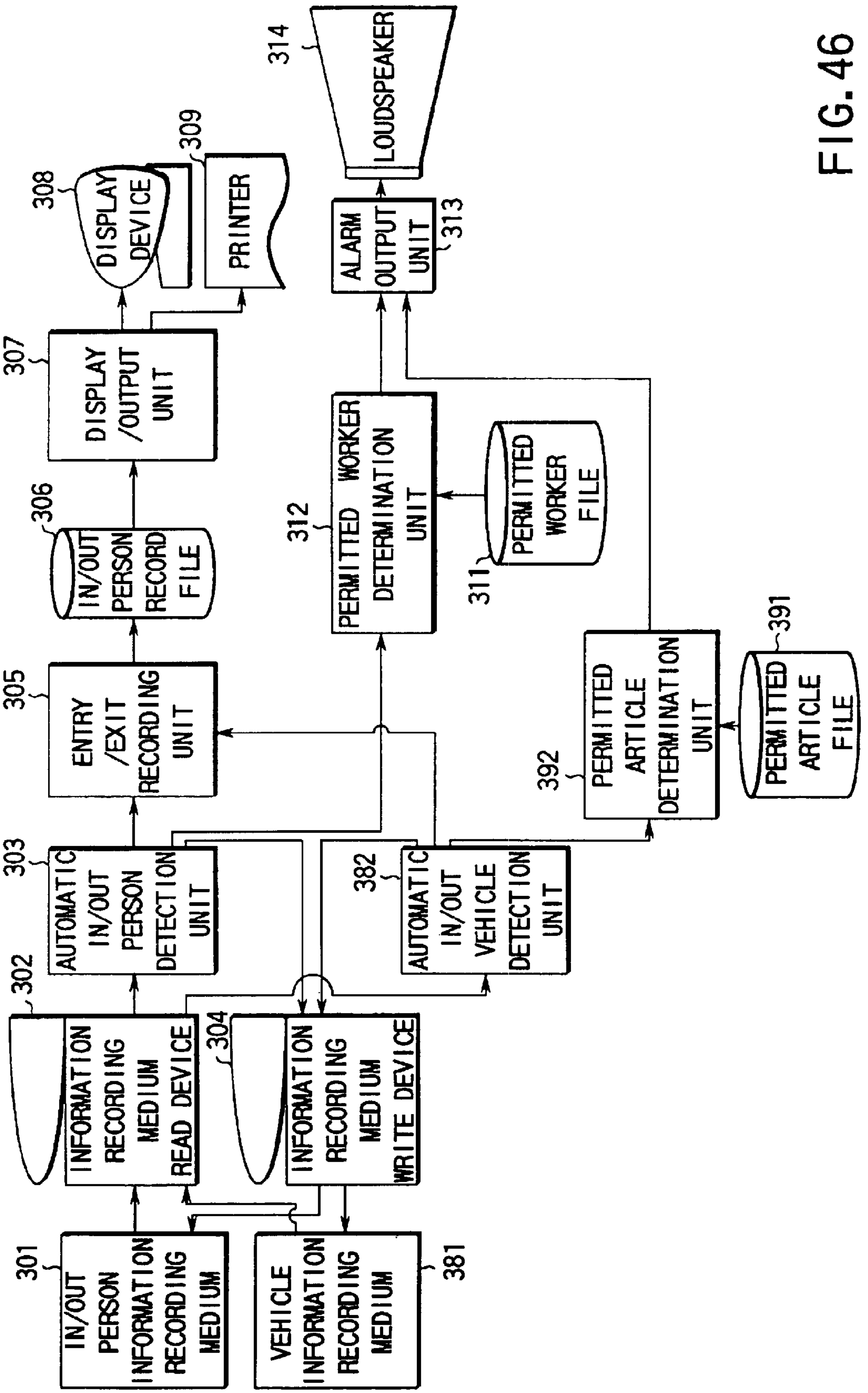
FIG. 46 is a block diagram showing an entry/exit management apparatus according to the 20th embodiment of the present invention.

FIG. 46 is a block diagram showing an entry/exit management apparatus according to the 20th embodiment of the present invention. The same reference numerals as in FIG. 45 denote the same parts in FIG. 46, and a detailed description thereof will be omitted. Only different parts will be described below.

The entry/exit management apparatus of this embodiment additionally comprises a permitted article file 391 and a permitted article determination unit 392 in addition to the components of the entry/exit management apparatus according to the 19th embodiment.

The vehicle information stored in a vehicle information recording medium 381 contains vehicle article information representing an article loaded on a vehicle in addition to the information explained in the 19th embodiment.

The permitted article file 391 stores information representing a vehicle article loaded on a vehicle permitted to enter/leave.

The permitted article determination unit 392 compares the vehicle information read by an information recording medium read device 302 and notified from an automatic in/out person detection unit 303 with the information stored in the permitted article file 391 to determine whether a vehicle is permitted to enter/leave.

When the permitted article determination unit 392 determines that the in/out vehicle is not permitted to enter/leave, an alarm output unit 313 is notified of this. Upon reception of the notification that the in/out person is not permitted to enter/leave from the permitted article determination unit 392, the alarm output unit 313 causes a loudspeaker 314 to generate an alarm.

More specifically, when one of the permitted worker determination unit 312 and the permitted article determination unit 392 determines that the in/out vehicle is not permitted to enter/leave, the alarm output unit 313 outputs an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the in/out person is an authorized worker and the article loaded on the vehicle is an authorized article is automatically determined. The entry/exit of unauthorized worker and vehicle due to an oversight can be prevented, thereby more reliably assuring security.

<21st Embodiment>

Figure 47:
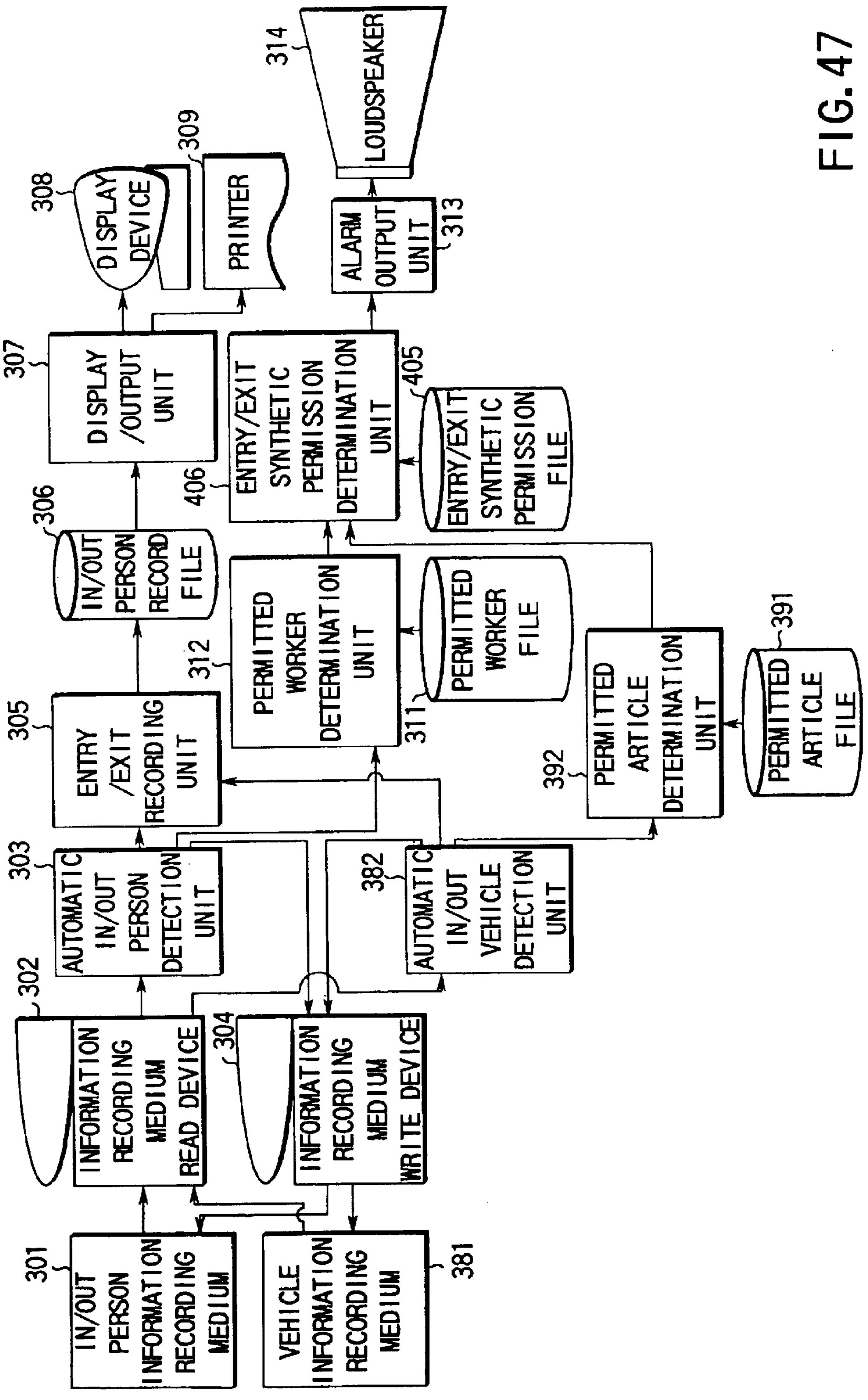
FIG. 47 is a block diagram showing an entry/exit management apparatus according to the 21st embodiment of the present invention.

FIG. 47 is a block diagram showing an entry/exit management apparatus according to the 21st embodiment of the present invention. The same reference numerals as in FIG. 46 denote the same parts in FIG. 47, and a detailed description thereof will be omitted. Only different parts will be described below.

The entry/exit management apparatus of this embodiment additionally comprises an entry/exit synthetic permission file 405 and an entry/exit synthetic permission determination unit 406 in addition to the components of the entry/exit management apparatus of the 20th embodiment.

The entry/exit synthetic permission file 405 stores information representing the relationship between in/out person permitted to enter/leave and an article permitted to be loaded on a vehicle.

The entry/exit synthetic permission determination unit 406 synthetically determines on the basis of the permitted or authorized worker notified from a permitted worker determination unit 312, the permitted article notified from a permitted article determination unit 392, and the information stored in the entry/exit synthetic permission file 405 whether the in/out person and vehicle are permitted to enter/leave.

More specifically, although the worker is determined by the permitted worker determination unit 312 as the authorized worker and the article is determined by the permitted article determination unit 392 as the permitted article, unless the worker (in/out person) and the article loaded on the vehicle do not satisfy the relationship represented by the information stored in the entry/exit synthetic permission file 405, the worker and vehicle are not permitted to enter or exit.

When the worker is not determined by the permitted worker determination unit 312 as the authorized worker and the article is not determined by the permitted article determination unit 392 as the permitted article, the worker and the vehicle are not permitted to enter/leave by the entry/exit synthetic permission determination unit 406.

When the entry/exit synthetic permission determination unit 406 determines that the in/out person and vehicle are not permitted to enter/leave, an alarm output unit 313 is notified of this. Upon reception of the notification that the in/out person and vehicle are not permitted to enter/leave, the alarm output unit 313 causes a loudspeaker 314 to generate an alarm.

In this embodiment, the alarm is generated from the loudspeaker 314. However, a door may be locked using an existing safety facility, or a notification may be automatically sent to a security company or police station.

According to this embodiment, therefore, a work for visually checking entry/exit is electronically managed, and whether the in/out person is an authorized worker and the article loaded on the vehicle is an authorized article is automatically determined. The entry/exit of unauthorized worker and vehicle due to an oversight can be prevented, thereby more reliably assuring security.

<22nd Embodiment>

Figure 48:
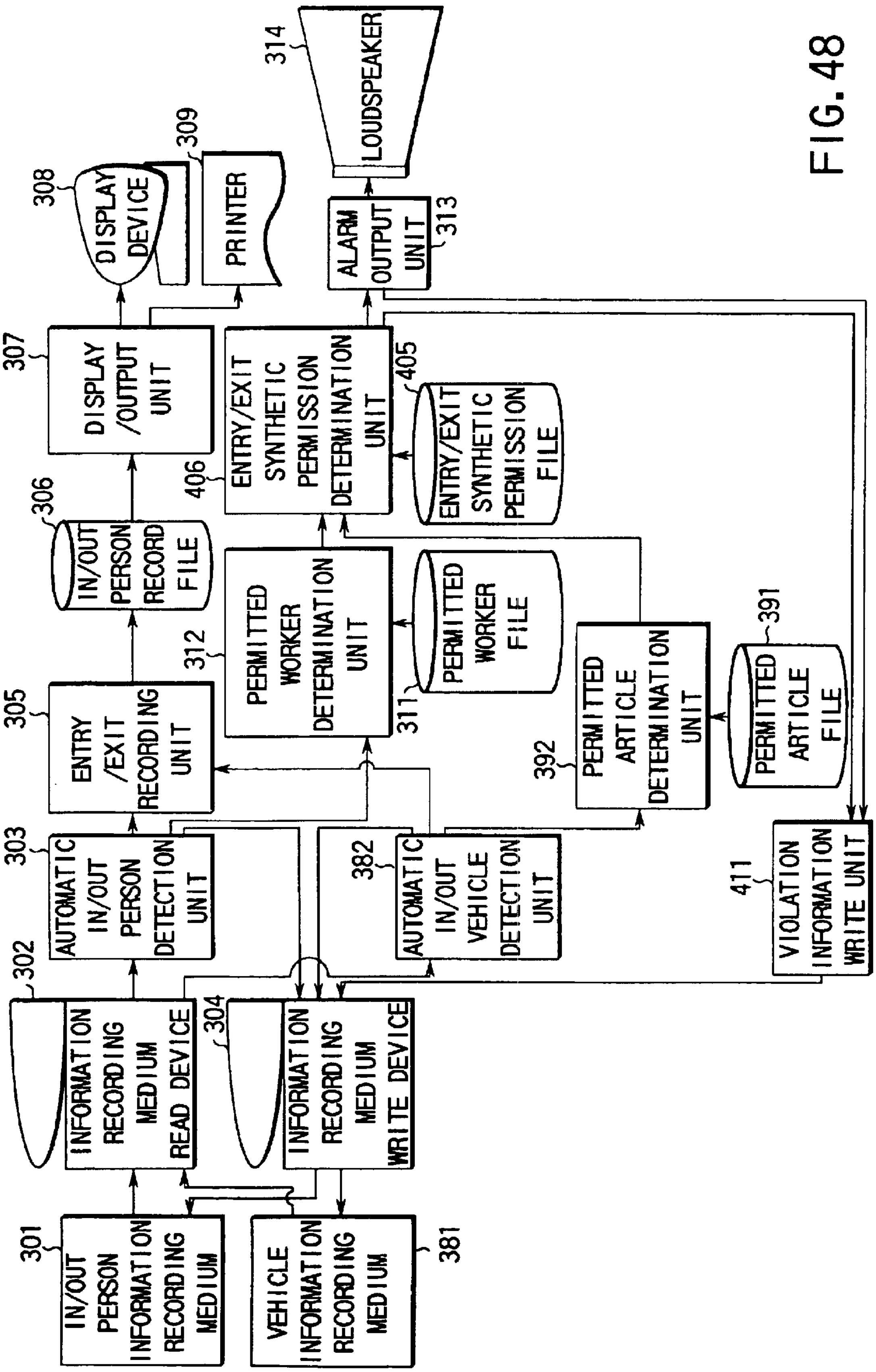
FIG. 48 is a block diagram showing an entry/exit management apparatus according to the 22nd embodiment of the present invention.

FIG. 48 is a block diagram showing an entry/exit management apparatus according to the 22nd embodiment of the present invention. The same reference numerals as in FIG. 47 denote the same parts in FIG. 48, and a detailed description thereof will be omitted. Only different parts will be described below.

The entry/exit management apparatus of this embodiment additionally comprises a violation information write unit 411 in addition to the components of the entry/exit management apparatus of the 21st embodiment.

When an alarm output unit 313 outputs an alarm, that is, when an entry/exit synthetic permission determination unit 406 does not output a permission, a violation information write unit 411 writes the determination result of the entry/exit synthetic permission determination unit 406 as violation information on an in/out person information recording medium 301 and a vehicle information recording medium 381.

According to this embodiment, since the violation information can be written on the in/out person information recording medium 301 and the vehicle information recording medium 381 by the violation information write unit 411, an in/out person and vehicle against the entry/exit condition can be managed.

In this embodiment, the alarm is generated from the loudspeaker 314. However, a door may be locked using an existing safety facility, or a notification may be automatically sent to a security company or police station.

In the above embodiment, files in which various kinds of information are recorded are separately prepared. However, these files may be integrated into one file. A program for determining a permission condition in each embodiment described above can be stored on an information recording medium such as a floppy disk.

The entry/exit management apparatuses of the 11th to 22nd embodiments can be arbitrarily combined, as a matter of course.

The entry/exit management apparatus of each embodiment described above can be used for management of entry/exit of a worker into/from a work area in each maintenance/inspection support apparatus.

Various means described in the above embodiments of the present invention can be incorporated in the above information recording medium (radio frequency tag) in addition to simple information recording. For example, each determination result output, alarm output, and display can be performed by a simple output means such as a buzzer or LED integrated with an information recording medium. Alternatively, a maintenance/inspection interval recheck means for rechecking the maintenance/inspection interval from the information recording medium side on the basis of the inspection/maintenance information stored on the information recording medium may be arranged.

As has been described above, according to the present invention, a work for preparing an operation tag for each maintenance/inspection operation and hanging it on an on-site equipment can be omitted, thereby improving the work efficiency.

Since instantaneously changing inspection information can be updated, more accurate inspection information can be provided to a worker, thereby improving the work efficiency.

When a non-qualified worker enters into a dangerous or restricted area, or when a worker works exceeding a work prescribed time set for a dangerous work, an alarm can be generated. Therefore, works in industrial plants can be safely performed.

An entry inhibition alarm is generated to a worker to assure safety of the work.

The entry/exit time of each worker can be recorded.

A worker can safely work in a work time limit area.

A sufficient and accurate inspection route is provided to a worker to improve the work efficiency.

Since a user himself need not input inspection information, inspection information can be more efficiently and accurately updated. As a result, work efficiency and work reliability can be improved.

Since an alarm is generated from an equipment to be inspected, a worker need not confirm the equipment to be inspected by referring to the inspection information of the equipment to be inspected. An equipment not to be inspected will not be inspected. As a result, work efficiency and work reliability can be improved.

Inspection result record information recording media are collected from the respective on-site equipments at the time of patrol and taken to an office. The information from all the recording media is simultaneously read at the office, thereby summing the data. Therefore, a report can be readily prepared.

According to an entry/exit management apparatus of the present invention, a work for visually checking entry/exit is electronically managed, and whether the in/out person (vehicle) is an authorized worker (authorized vehicle) is automatically determined. The entry/exit of an unauthorized worker (unauthorized vehicle) due to an oversight can be prevented, thereby more reliably assuring security.

According to an entry/exit management apparatus of the present invention, when entry/exit is not permitted, an alarm is generated to more reliably assure security.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A maintenance/inspection support apparatus comprising:

inspection information storage means for storing inspection information which is referred to when a user inspects a plurality of equipments serving as maintenance/inspection targets;

inspection information write means for writing, in a noncontact manner, the inspection information stored in said inspection information storage means on a plurality of radio frequency tags corresponding to the plurality of equipments;

inspection information read means for reading, in a noncontact manner, the inspection information written on said radio frequency tags by said inspection information write means; and display means for displaying the inspection information read by said inspection information read means.

2. An apparatus according to claim 1, further comprising inspection information updating means for performing at least one of updating and addition of the inspection information written on said radio frequency tags.

3. An apparatus according to claim 1, further comprising:

collection means for collecting process information about an equipment serving as a maintenance/inspection target; and process information write means for writing the process information collected by said collection means on said radio frequency tags.

* * * * *